US012563179B2

(12) United States Patent
Liu et al.

(10) Patent No.: US 12,563,179 B2
(45) Date of Patent: Feb. 24, 2026

(54) ENCODING METHOD, DECODING METHOD, AND DEVICE

(71) Applicants: HUAWEI TECHNOLOGIES CO., LTD., Shenzhen (CN); University of Science and Technology of China, Hefei (CN)

(72) Inventors: Dong Liu, Hefei (CN); Changyue Ma, Hefei (CN); Feng Wu, Hefei (CN); Haitao Yang, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 99 days.

(21) Appl. No.: 18/447,885

(22) Filed: Aug. 10, 2023

(65) Prior Publication Data

US 2023/0388490 A1 Nov. 30, 2023

Related U.S. Application Data

(63) Continuation of application No. PCT/CN2022/075237, filed on Jan. 30, 2022.

(30) Foreign Application Priority Data

Feb. 10, 2021 (CN) .......................... 202110185642.3

(51) Int. Cl.
 H04N 19/105 (2014.01)
 H04N 19/159 (2014.01)
 (Continued)

(52) U.S. Cl.
 CPC ......... H04N 19/105 (2014.11); H04N 19/159 (2014.11); H04N 19/176 (2014.11); H04N 19/70 (2014.11)

(58) Field of Classification Search
 CPC ...... H04N 19/105; H04N 19/11; H04N 19/13; H04N 19/136; H04N 19/159; H04N 19/463; H04N 19/70; H04N 19/91
 See application file for complete search history.

(56) References Cited

U.S. PATENT DOCUMENTS

| | | | |
|---|---|---|---|
| 2019/0246102 A1* | 8/2019 | Cho ..................... | H04N 19/109 |
| 2020/0244955 A1 | 7/2020 | Pfaff et al. | |

(Continued)

FOREIGN PATENT DOCUMENTS

WO WO-2019111006 A1 * 6/2019 ............. H04N 19/96

OTHER PUBLICATIONS

"Enhanced Intra Prediction for Video Coding by Using Multiple Neural Networks"—Sun et al., IEEE Transactions on Multimedia, vol. 22, No. 11, Nov. 2020 (Year: 2020).*

(Continued)

*Primary Examiner* — Mainul Hasan

(74) *Attorney, Agent, or Firm* — Leydig, Voit & Mayer, Ltd.

(57) ABSTRACT

An encoding method, a decoding method, and a device are provided. The encoding method includes: determining an index of an intra prediction mode syntax element value set of a current picture block; performing, by using a neural network, probability estimation on input data that represents a feature of the current picture block, to obtain probability distribution of a plurality of candidate intra prediction mode syntax element value sets, wherein the probability distribution represents respective probability values of the plurality of candidate intra prediction mode syntax element value sets; and performing entropy encoding on a probability value related to the index of the intra prediction mode syntax element value set of the current picture block based on the probability distribution of the plurality of candidate intra prediction mode syntax element value sets, to obtain a bitstream.

27 Claims, 15 Drawing Sheets

10

(51) Int. Cl.
  *H04N 19/176*     (2014.01)
  *H04N 19/70*     (2014.01)

(56)              References Cited

U.S. PATENT DOCUMENTS

| | | | |
|---|---|---|---|
| 2021/0084290 A1* | 3/2021 | Cho | H04N 19/85 |
| 2021/0218997 A1* | 7/2021 | Rezazadegan Tavakoli | H04N 19/176 |
| 2022/0094977 A1* | 3/2022 | Kim | G06N 3/0464 |
| 2023/0239516 A1* | 7/2023 | Mao | H04N 19/30 375/240.12 |
| 2024/0306986 A1* | 9/2024 | Rezazadegan Tavakoli | H04N 19/177 |

OTHER PUBLICATIONS

"Convolutional Neural Network-Based Arithmetic Coding for HEVC Intra-Predicted Residues"—Ma et al., IEEE Transactions on Circuits and Systems for Video Technology, vol. 30, No. 7, Jul. 2020 (Year: 2020).*

"Neural Network-Based Arithmetic Coding for Inter Prediction Information in HEVC"—Ma et al., 978-1-7281-0397-6/19/$31.00 A © 2019 IEEE (Year: 2019).*

"Convolutional Neural Network-Based Arithmetic Coding of DC Coefficients for HEVC Intra Coding"—Ma et al., 978-1-4799-7061-2/18/$31.00 A © 2018 IEEE (Year: 2018).*

"Series H: Audiovisual and Multimedia Systems, Infrastructure of Audiovisual Services—Coding of Moving Video, Video Coding for Low Bit Rate Communication," ITU-T Telecommunication Standardization Sector of ITU, ITU-T Recommendation H.263, total 226 pages, International Union of Telecommunication, Geneva, Switzerland (Jan. 2005).

"Series H: Audiovisual and Multimedia Systems, Infrastructure of Audiovisual Services—Coding of Moving Video, Advance Video Coding for Generic Audiovisual Services," ITU-T Telecommunication Standardization Sector of ITU, Recommendation ITU-T H.264, total 790 pages, International Union of Telecommunication, Geneva, Switzerland (Feb. 2014).

Series H: Audiovisual and Multimedia Systems, Infrastructure of Audiovisual Services—Coding of Moving Video, High Efficiency Video Coding, ITU-T Telecommunication Standardization Sector of ITU, Recommendation ITU-T H.265, total 634 pages, International Union of Telecommunication, Geneva, Switzerland (Apr. 2015).

Song et al., "Neural Network-Based Arithmetic Coding of Intra Prediction Modes in HEVC," XP080821887, total 4 pages (Sep. 18, 2017).

* cited by examiner

400

Video coding device

410

420

Processor    430

Coding module

440

450

Receiver unit

Transmitter unit

470

460    Memory

Downlink port

Uplink port

500

502    Processor

518    Display

512

Data — 506

Application: 1 ...
Application: video coding
Application: ... N

510

Operating system — 508

504

Three 35x1 one-hot vectors

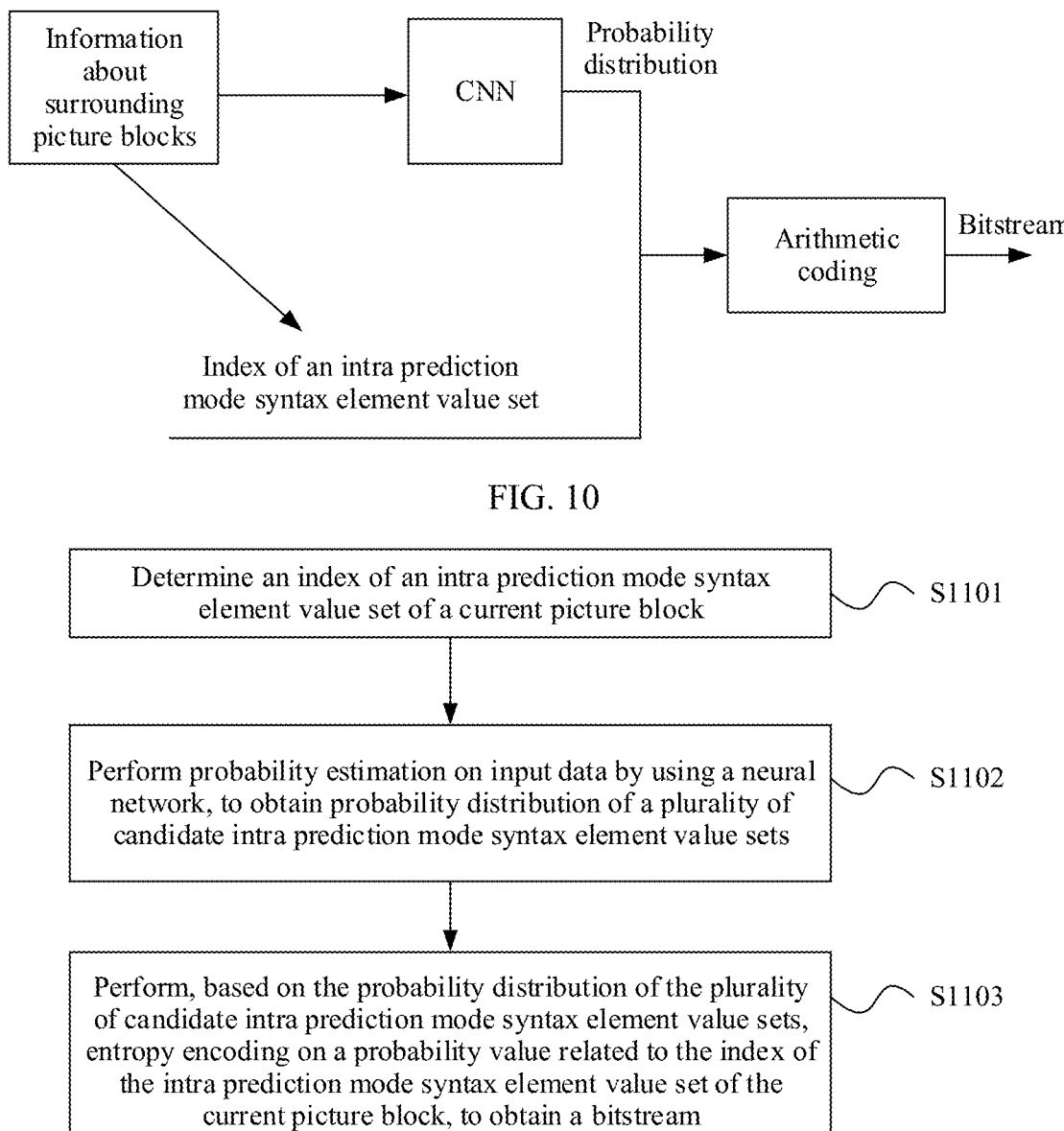

FIG. 10

Determine an index of an intra prediction mode syntax element value set of a current picture block — S1101

Perform probability estimation on input data by using a neural network, to obtain probability distribution of a plurality of candidate intra prediction mode syntax element value sets — S1102

Perform, based on the probability distribution of the plurality of candidate intra prediction mode syntax element value sets, entropy encoding on a probability value related to the index of the intra prediction mode syntax element value set of the current picture block, to obtain a bitstream — S1103

FIG. 11

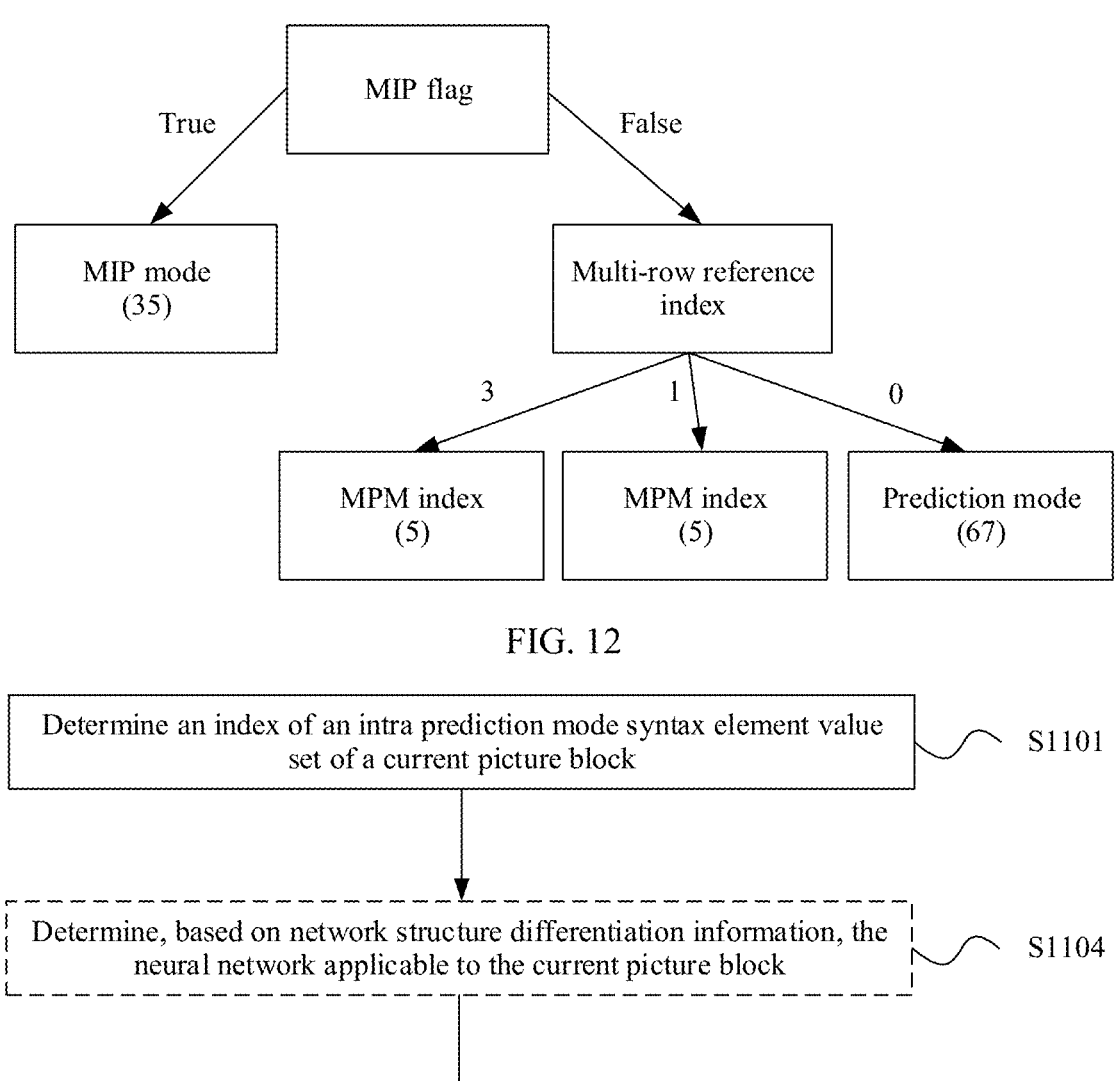

FIG. 12

Determine an index of an intra prediction mode syntax element value set of a current picture block — S1101

Determine, based on network structure differentiation information, the neural network applicable to the current picture block — S1104

Perform probability estimation on input data by using a neural network, to obtain probability distribution of a plurality of candidate intra prediction mode syntax element value sets — S1102

Perform, based on the probability distribution of the plurality of candidate intra prediction mode syntax element value sets, entropy encoding on a probability value related to the index of the intra prediction mode syntax element value set of the current picture block, to obtain a bitstream — S1103

FIG. 13

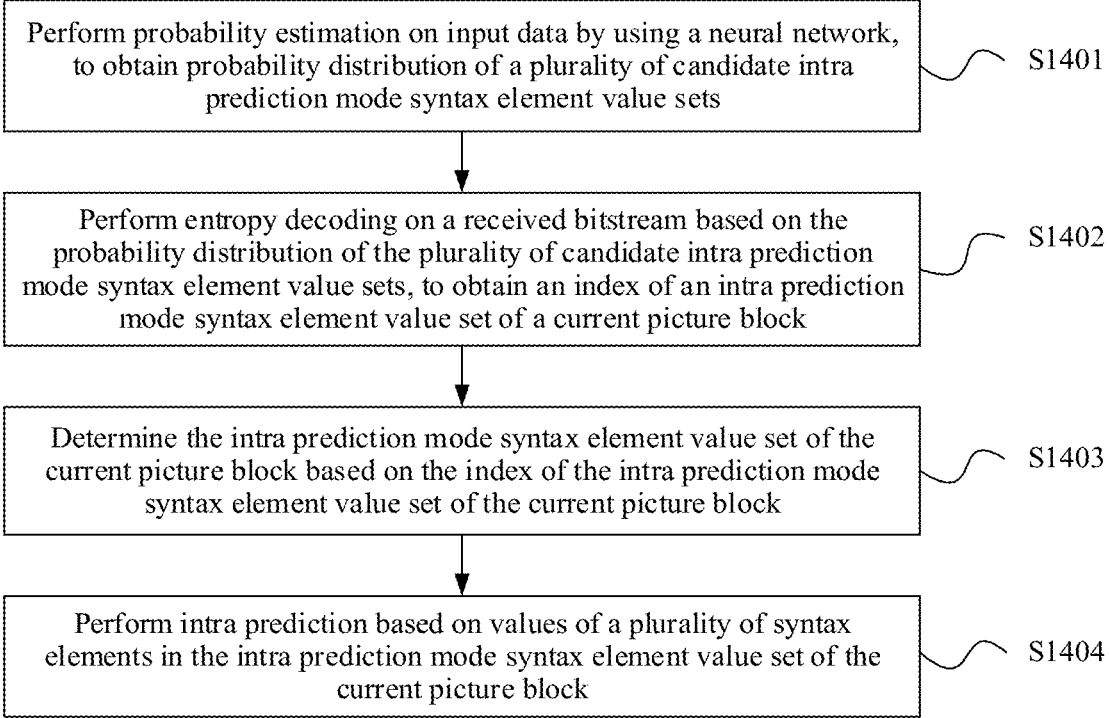

Perform probability estimation on input data by using a neural network, to obtain probability distribution of a plurality of candidate intra prediction mode syntax element value sets          S1401

Perform entropy decoding on a received bitstream based on the probability distribution of the plurality of candidate intra prediction mode syntax element value sets, to obtain an index of an intra prediction mode syntax element value set of a current picture block          S1402

Determine the intra prediction mode syntax element value set of the current picture block based on the index of the intra prediction mode syntax element value set of the current picture block          S1403

Perform intra prediction based on values of a plurality of syntax elements in the intra prediction mode syntax element value set of the current picture block          S1404

FIG. 14

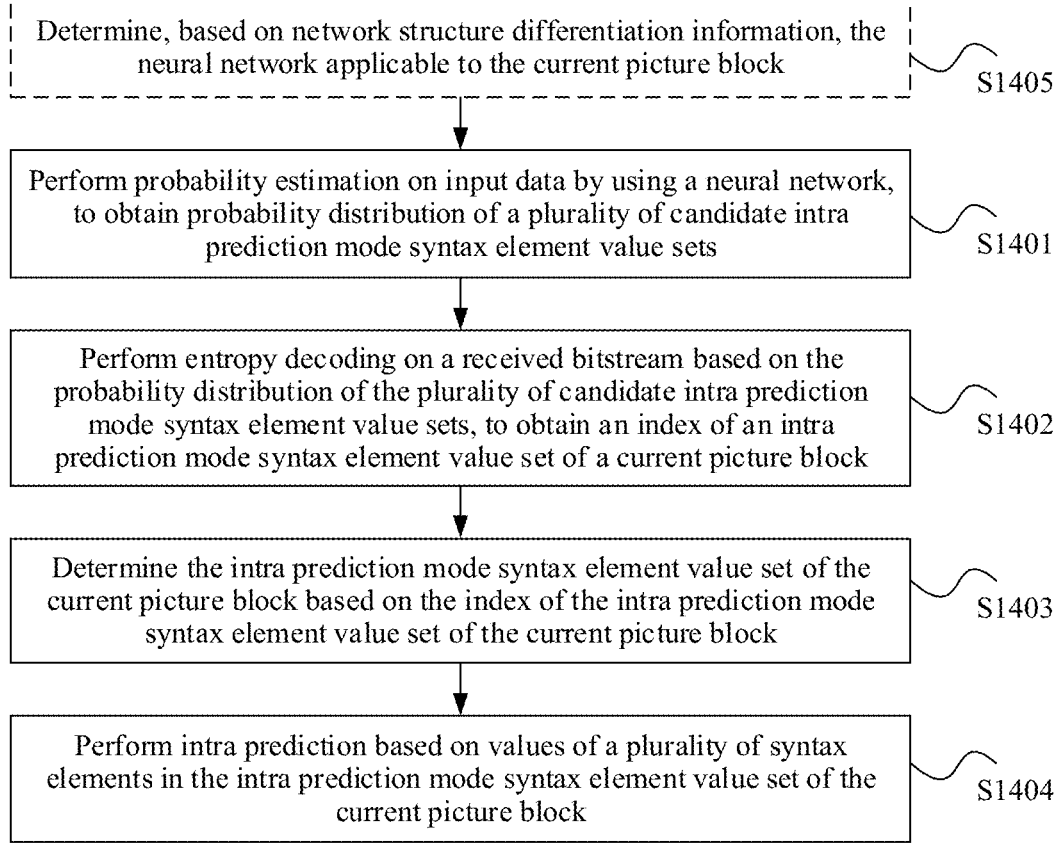

Determine, based on network structure differentiation information, the neural network applicable to the current picture block    S1405

Perform probability estimation on input data by using a neural network, to obtain probability distribution of a plurality of candidate intra prediction mode syntax element value sets    S1401

Perform entropy decoding on a received bitstream based on the probability distribution of the plurality of candidate intra prediction mode syntax element value sets, to obtain an index of an intra prediction mode syntax element value set of a current picture block    S1402

Determine the intra prediction mode syntax element value set of the current picture block based on the index of the intra prediction mode syntax element value set of the current picture block    S1403

Perform intra prediction based on values of a plurality of syntax elements in the intra prediction mode syntax element value set of the current picture block    S1404

FIG. 15

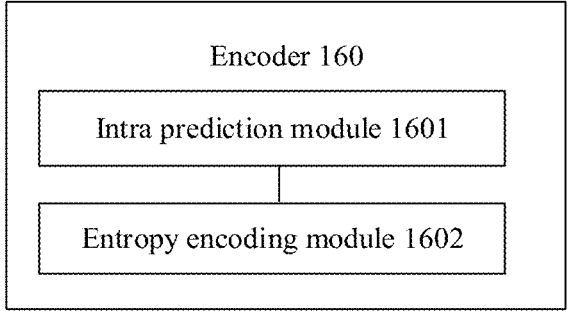

Encoder 160

Intra prediction module 1601

Entropy encoding module 1602

FIG. 16

ENCODING METHOD, DECODING METHOD, AND DEVICE

CROSS-REFERENCE TO RELATED APPLICATIONS

This application is a continuation of International Application No. PCT/CN2022/075237, filed on Jan. 30, 2022, which claims priority to Chinese Patent Application No. 202110185642.3, filed on Feb. 10, 2021. The disclosures of the aforementioned applications are hereby incorporated by reference in their entireties.

TECHNICAL FIELD

Embodiments of this application relate to the video processing field, and in particular, to an encoding method, a decoding method, and a device.

BACKGROUND

Video coding (video encoding and/or decoding) is used in a wide range of digital video applications, for example, broadcast digital televisions, video transmission over the internet and mobile networks, real-time conversational applications such as video chat, video conferencing, digital versatile discs (DVDs) and Blu-ray discs, video content acquisition and editing systems, and camcorders of security applications.

The amount of video data needed to depict even a relatively short video can be substantial, which may result in difficulties when the data is to be streamed or otherwise communicated across a communications network with a limited bandwidth capacity. Thus, the video data is generally compressed before being communicated across modern day telecommunications networks. A size of a video could also be an issue when the video is stored on a storage device because memory resources may be limited. Video compression devices often use software and/or hardware at a source to code the video data prior to transmission or storage, thereby decreasing a quantity of data needed to represent digital video pictures. The compressed data is then received at a destination by a video decompression device that decodes the video data. With limited network resources and ever increasing demands of higher video quality, improved compression and decompression techniques that improve a compression ratio with little to no sacrifice in picture quality are desirable.

Currently, a plurality of video coding standards are proposed in the industry to guide video encoding/decoding, for example, H.264/AVC, the high efficiency video coding (HEVC) standard, and the versatile video coding (VVC) standard. In each of these standards, a hybrid architecture encoding and decoding scheme based on block splitting, transform, and quantization is used, and continuous iteration is performed by using technical modules such as block splitting, prediction, transform, entropy encoding/entropy decoding, and loop filtering modules, to continuously improve compression efficiency.

In video encoding and decoding, entropy coding is performed on prediction mode information that indicates a prediction mode used in a prediction operation of a picture block, and then entropy-coded prediction mode information is written into a bitstream. When syntax elements related to an intra prediction mode include a plurality of pieces of information, entropy coding is sequentially performed on the syntax elements related to the intra prediction mode. For example, the syntax elements related to the intra prediction mode may include a matrix-based intra prediction (MIP) flag, an MIP mode, a multi-row reference index, an intra sub-partition (ISP) mode, a most probable mode (MPM) flag, an MPM index, and an index of the intra prediction mode. When entropy coding is performed on the syntax elements related to the intra prediction mode, based on a procedure of a VVC intra prediction mode coding method shown in FIG. 1a, the MIP flag is first coded, and the MIP mode is further coded if the MIP flag is true. If the MIP flag is false, the multi-row reference index, the ISP mode, and the MPM flag are further sequentially coded. If the MPM flag is true, the MPM index is further coded. If the MPM flag is false, the intra prediction mode is coded. However, sequentially performing entropy coding on the syntax elements related to the intra prediction mode requires high hardware implementation complexity.

Therefore, how to reduce hardware implementation complexity of performing entropy coding on the syntax elements related to the intra prediction mode is a key to implementing entropy encoding or entropy decoding.

SUMMARY

This application provides an encoding method, a decoding method, and a device, to reduce hardware implementation complexity of entropy encoding or entropy decoding performed on syntax elements related to an intra prediction mode.

To achieve the foregoing objective, this application uses the following technical solutions.

According to a first aspect, an encoding method is provided. The method may include: determining an index of an intra prediction mode syntax element value set of a current picture block, where the syntax element value set includes values of a plurality of syntax elements related to an intra prediction mode of the current picture block, and the plurality of syntax elements include an index of the intra prediction mode used by the current picture block; performing probability estimation on input data by using a neural network, to obtain probability distribution of a plurality of candidate intra prediction mode syntax element value sets, where the probability distribution represents respective probability values of the plurality of candidate intra prediction mode syntax element value sets, and the input data is used to represent a feature of the current picture block (for example, a texture feature of the current picture block); and performing entropy encoding on a probability value related to the index of the intra prediction mode syntax element value set of the current picture block based on the probability distribution of the plurality of candidate intra prediction mode syntax element value sets, to obtain a bitstream. It should be understood that the neural network is a neural network obtained through training and having a probability estimation function.

According to the encoding method provided in this embodiment of this application, the values of the plurality of syntax elements (for example, all syntax elements) related to the intra prediction mode of the current picture block are used as the intra prediction mode syntax element value set, and the intra prediction mode syntax element value set corresponds to the index. The index of the intra prediction mode syntax element value set is understood as one syntax element, in other words, performing entropy encoding on the values of the plurality of syntax elements is replaced with performing entropy encoding on a value of the syntax element. The syntax element may represent a status of the intra prediction mode of the current picture block (for example, the syntax element may indicate values of a plurality of syntax elements related to an intra prediction mode actually used by the current picture block). During entropy encoding, entropy encoding needs to be performed only once on the index of the intra prediction mode syntax element value set, to replace entropy encoding performed on values of syntax elements related to many intra prediction modes, thereby reducing hardware implementation complexity, and further improving encoding performance.

In a possible implementation, the values of the plurality of syntax elements included in the intra prediction mode syntax element value set of the current picture block are the values of the plurality of syntax elements related to the intra prediction mode actually used by the current picture block. There is a dependency relationship between the values of the plurality of syntax elements, and the values of the plurality of syntax elements are not discrete. For example, the current picture block actually uses an intra prediction mode a, and the intra prediction mode a belongs to an A class of intra prediction modes. The intra prediction mode syntax element value set of the current picture block may include a flag of the A class of intra prediction modes is true, and an intra prediction mode index is a.

In another possible implementation, one intra prediction mode syntax element value set includes values of a plurality of syntax elements related to one intra prediction mode, and the intra prediction mode syntax element value set may represent or reflect a dependency relationship between values of the plurality of syntax elements included in the intra prediction mode syntax element value set. Values of a plurality of syntax elements included in each of the plurality of candidate intra prediction mode syntax element value sets refers to values of a plurality of syntax elements related to an intra prediction mode that can be used when intra prediction is performed on the current picture block. There is a dependency relationship between values of a plurality of syntax elements included in one candidate intra prediction mode syntax element value set. An intra prediction mode syntax element value set actually used by the current picture block may be one of the plurality of candidate intra prediction mode syntax element value sets.

For example, when an intra prediction mode information encoding process is represented by using a tree diagram structure, a tree diagram includes a plurality of chain structure examples from top to bottom, a chain structure example corresponds to a candidate intra prediction mode syntax element value set, and different chain structure examples correspond to different candidate intra prediction mode syntax element value sets. It should be understood that each chain structure example represents or reflects a dependency relationship between values of a plurality of syntax elements.

In another possible implementation, the determining an index of an intra prediction mode syntax element value set of a current picture block includes: determining the index of the intra prediction mode syntax element value set of the current picture block based on the index of the intra prediction mode used by the current picture block.

In another possible implementation, the determining the index of the intra prediction mode syntax element value set of the current picture block based on the index of the intra prediction mode used by the current picture block includes: determining a sum of the index of the intra prediction mode used by the current picture block and an additional value of a first class of intra prediction modes as the index of the intra prediction mode syntax element value set of the current picture block. The intra prediction mode used by the current picture block belongs to the first class of intra prediction modes, and there is no intersection between intervals formed by sums of minimum index values of different classes of intra prediction modes and corresponding additional values and sums of maximum index values of the different classes of intra prediction modes and the corresponding additional values. There are correspondences between the different classes of intra prediction modes and different additional values, and there is no intersection between the intervals formed by the sums of the minimum index values of the different classes of intra prediction modes and the corresponding additional values and the sums of the maximum index values of the different classes of intra prediction modes and the corresponding additional values. In this way, the additional values corresponding to different classes of intra prediction modes can be properly configured, so that after entropy encoding is performed on the index of the intra prediction mode syntax element value set of the current picture block determined based on the additional value, the index of the intra prediction mode used by the current picture block can be quickly and effectively determined at a decoder side based on a value range of the index of the intra prediction mode syntax element value set of the current picture block.

For example, the A class of intra prediction modes includes five intra prediction modes, an index range of the A class of intra prediction modes is 1 to 5, an additional value corresponding to the A class of intra prediction modes is X, a B class of intra prediction modes includes three intra prediction modes, an index range of the B class of intra prediction modes is 1 to 3, and an additional value corresponding to the B class of intra prediction modes is Y. In this case, there is no intersection between an interval $[1+X, 5+X]$ and an interval $[1+Y, 3+Y]$. "[" and "]" is a closed interval symbol.

In another possible implementation, an additional value of an $N^{th}$ class of intra prediction modes includes a sum of label values of all classes of intra prediction modes before the $N^{th}$ class of intra prediction modes in a preset order. The $N^{th}$ class of intra prediction modes is any class of intra prediction modes.

A label value of an intra prediction mode may be a parameter configured for the intra prediction mode. Optionally, a specific value of the label value of the intra prediction mode may be configured based on an actual requirement. Label values of different classes of intra prediction modes may be the same or may be different.

In another possible implementation, the label value of each class of intra prediction modes may include a total quantity of a plurality of intra prediction modes in each class of intra prediction modes.

In another possible implementation, the intra prediction mode used by the current picture block belongs to the first class of intra prediction modes. The values of the plurality of syntax elements included in the intra prediction mode syntax element value set further include a flag of the first class of intra prediction modes is true, a flag of a second class of intra prediction modes is false, and a flag of a third class of intra prediction modes is false. A total quantity of a plurality of intra prediction modes in the second class of intra prediction modes is B, and a total quantity of a plurality of intra prediction modes in the third class of intra prediction modes is C. The preset order is an order of the second class of intra prediction modes, the third class of intra prediction modes, and the first class of intra prediction modes. The determining a sum of the index of the intra prediction mode used by the current picture block and an additional value of a first class of intra prediction modes as the index of the intra prediction mode syntax element value set of the current picture block includes: determining a sum of the index of the intra prediction mode used by the current picture block. B, and C as the index of the intra prediction mode syntax element value set of the current picture block.

In another possible implementation, before the performing probability estimation on input data by using a neural network, to obtain probability distribution of a plurality of candidate intra prediction mode syntax element value sets, the encoding method provided in this application may further include: determining, based on network structure differentiation information, the neural network applicable to the current picture block, where the network structure differentiation information includes a size of the current picture block, or the network structure differentiation information depends on a size of the current picture block. The performing probability estimation on input data by using a neural network, to obtain probability distribution of a plurality of candidate intra prediction mode syntax element value sets includes: performing probability estimation on the input data by using the determined neural network, to obtain the probability distribution of the plurality of candidate intra prediction mode syntax element value sets. In this way, different neural networks may be designed for different picture blocks (for example, different sizes), to improve encoding performance to a maximum extent.

In another possible implementation, the input data may include information about neighboring picture blocks of the current picture block, or the input data may include preprocessed information about neighboring picture blocks of current picture block. The neighboring picture blocks include an upper left neighboring picture block, an upper neighboring picture block, and a left neighboring picture block. The information about the neighboring picture block includes a reconstruction value of the neighboring picture block. Correlation between the neighboring picture blocks of the current picture block and the current picture block is fully used. Because the neighboring picture blocks have been reconstructed, the information about the neighboring picture blocks may represent a feature of the current picture block, and the probability distribution obtained by inputting the information about the neighboring picture blocks into the neural network has higher accuracy.

In another possible implementation, the preprocessed information about the neighboring picture blocks of the current picture block may include: an M-channel data block obtained by concatenating the information about the neighboring picture blocks and information about the current picture block, where M is greater than or equal to 1.

For example, M may be less than or equal to a class of information included in the information about the picture block.

In a possible implementation, the preprocessed information about the neighboring picture blocks of the current picture block may include a one-dimensional vector obtained by concatenating vectors converted from the information about the neighboring picture blocks and information about the current picture block.

The vector converted from the information about the picture block may be a one-dimensional valid one-hot vector.

It should be noted that the information about the current picture block in the input data may be a padded default value. Content of the default value is not limited in this embodiment of this application.

In another possible implementation, the information about the neighboring picture block may further include one or more items of the following information: a predictor, a residual value, an index of an intra prediction mode syntax element value set, and partition information. In this way, available information about the neighboring picture block can be fully utilized, and a plurality of different information combinations can be used as an input of the neural network, so that accuracy of probability distribution output by the neural network is improved, and available coding information can be used to a maximum extent.

In another possible implementation, the neural network may include a convolutional network, a fully connected layer, and a normalized exponential function Softmax layer. The convolutional network includes a plurality of dense blocks and a pooling layer between the dense blocks. The dense block includes a convolutional layer, an excitation ReLU layer, and a batch normalization (BN) layer. The performing probability estimation on input data by using a neural network, to obtain probability distribution of a plurality of candidate intra prediction mode syntax element value sets includes: extracting feature information in the input data by using the convolutional network; and performing, by using the fully connected layer and the Softmax layer, probability estimation on the feature information extracted by using the convolutional network, to output the probability distribution of the plurality of candidate intra prediction mode syntax element value sets.

For example, the neural network may be used to perform probability estimation on input data of a 4×4 coding block, to obtain probability distribution of a plurality of candidate intra prediction mode syntax element value sets of the 4×4 coding block.

In another possible implementation, the neural network may include a fully connected network, a convolutional network, a concat layer, a first fully connected layer, and a Softmax layer. The fully connected network includes a plurality of second fully connected layers and activation PReLU layers connected to the second fully connected layers one by one. The convolutional network includes a plurality of dense blocks and a pooling layer between the dense blocks, and the dense block includes a convolutional layer, an excitation ReLU layer, and a BN layer. The performing probability estimation on input data by using a neural network, to obtain probability distribution of a plurality of candidate intra prediction mode syntax element value sets includes: extracting feature information of first-class information in the input data by using the convolutional network; extracting feature information of information other than the first-class information in the input data by using the fully connected network; and concatenating, by using the concat layer, the feature information extracted by using the fully connected network and the feature information extracted by using the convolutional network, and performing, by using the first fully connected layer and the Softmax layer, probability estimation on feature information concatenated by using the concat layer, to output the probability distribution of the plurality of candidate intra prediction mode syntax element value sets. The first-class information is picture block pixel-level information.

In a possible implementation, the picture block pixel-level information may be information related to a pixel value of the picture block, for example, a reconstruction value, a predictor, and a residual value.

The first-class information in the input data may be multi-channel data obtained through concatenation. The information other than the first-class information in the input data may be a one-dimensional vector obtained by concatenating converted vectors.

For example, the neural network may be used to perform probability estimation on input data of a coding block with a size other than 4×4, to obtain probability distribution of a plurality of candidate intra prediction mode syntax element value sets of the coding block with a size other than 4×4.

For example, the feature information may be texture topology information.

In another possible implementation, the neural network may be the neural network obtained through training and having the probability estimation function.

In another possible implementation, the neural network is used to receive a training data set, and the neural network is obtained through training based on the training data set.

In another possible implementation, the training data set may be information about a plurality of neighboring picture blocks of the picture block.

In another possible implementation, the probability value related to the index of the intra prediction mode syntax element value set of the current picture block may be any probability value in a probability interval that corresponds to the index of the intra prediction mode syntax element value set of the current picture block and that is in a plurality of probability intervals constructed through arithmetic coding based on the probability distribution.

In another possible implementation, entropy encoding described in this application may include binary arithmetic encoding or multi-level arithmetic encoding.

According to a second aspect, a decoding method is provided. The method may include: performing probability estimation on input data by using a neural network, to obtain probability distribution of a plurality of candidate intra prediction mode syntax element value sets, where the probability distribution represents respective probability values of the plurality of candidate intra prediction mode syntax element value sets, and the input data is used to represent a feature of a current picture block (for example, a texture feature of the current picture block); performing entropy decoding on a received bitstream based on the probability distribution, to obtain an index of an intra prediction mode syntax element value set of the current picture block; determining the intra prediction mode syntax element value set of the current picture block based on the index of the intra prediction mode syntax element value set of the current picture block, where the syntax element value set includes values of a plurality of syntax elements related to an intra prediction mode used by the current picture block, and the plurality of syntax elements include an index of the intra prediction mode used by the current picture block; and performing intra prediction based on the values of the plurality of syntax elements. It should be understood that the neural network is a neural network obtained through training and having a probability estimation function.

According to the decoding method provided in this embodiment of this application, the values of the plurality of syntax elements (for example, all syntax elements) related to the intra prediction mode of the current picture block are used as the intra prediction mode syntax element value set, and the intra prediction mode syntax element value set corresponds to the index. The index of the intra prediction mode syntax element value set is understood as one syntax element, in other words, performing entropy decoding on the values of the plurality of syntax elements is replaced with performing entropy decoding on a value of the syntax element. The syntax element may represent a decoding status of the intra prediction mode of the current picture block (for example, the syntax element may indicate values of a plurality of syntax elements related to an intra prediction mode actually used by the current picture block). During entropy decoding, entropy decoding needs to be performed only once on the index of the intra prediction mode syntax element value set, to replace entropy decoding performed on values of syntax elements related to many intra prediction modes, thereby reducing hardware implementation complexity, and further improving decoding performance.

In a possible implementation, the determining the intra prediction mode syntax element value set of the current picture block based on the index of the intra prediction mode syntax element value set of the current picture block may specifically include: determining an intra prediction mode syntax element value set corresponding to a first numerical interval as the intra prediction mode syntax element value set of the current picture block. A start value of the first numerical interval is a sum of a minimum index value of a first class of intra prediction modes and an additional value of the first class of intra prediction modes, and an end value of the first numerical interval is a sum of a maximum index value of the first class of intra prediction modes and the additional value of the first class of intra prediction modes. The intra prediction mode used by the current picture block belongs to the first class of intra prediction modes, and there is no intersection between intervals formed by sums of minimum index values of different classes of intra prediction modes and corresponding additional values and sums of maximum index values of the different classes of intra prediction modes and the corresponding additional values. In this implementation, an encoder side determines the index of the intra prediction mode syntax element value set of the current picture block based on the index of the intra prediction mode used by the current picture block. A decoder side can simply and quickly determine the index of the intra prediction mode used by the current picture block based on a value range of the index of the intra prediction mode syntax element value set of the current picture block.

In another possible implementation, an additional value of an $N^{th}$ class of intra prediction modes includes a sum of label values of all classes of intra prediction modes before the $N^{th}$ class of intra prediction modes in a preset order.

A label value of an intra prediction mode may be a parameter configured for the intra prediction mode. Optionally, a specific value of the label value of the intra prediction mode may be configured based on an actual requirement. Label values of different classes of intra prediction modes may be the same or may be different.

In another possible implementation, the label value of each class of intra prediction modes may include a total quantity of a plurality of intra prediction modes in each class of intra prediction modes.

In another possible implementation, if the preset order is an order of a second class of intra prediction modes, a third class of intra prediction modes, and the first class of intra prediction modes, a total quantity of a plurality of intra prediction modes in the first class of intra prediction modes is A, a total quantity of a plurality of intra prediction modes in the second class of intra prediction modes is B, and a total quantity of a plurality of intra prediction modes in the third class of intra prediction modes is C. The determining a syntax element value set corresponding to a first numerical interval as the intra prediction mode syntax element value set of the current picture block includes: if the first numerical interval is [0, B), the intra prediction mode syntax element value set of the current picture block includes: a flag of the second class of intra prediction modes is true, the index of the intra prediction mode used by the current picture block is the index of the intra prediction mode syntax element value set of the current picture block, a flag of the first class of intra prediction modes is false, and a flag of the third class of intra prediction modes is false. If the first numerical interval is [B, B+C), the intra prediction mode syntax element value set of the current picture block includes: a flag of the third class of intra prediction modes is true, the index of the intra prediction mode used by the current picture block is the index of the intra prediction mode syntax element value set of the current picture block minus B, a flag of the first class of intra prediction modes is false, and a flag of the second class of intra prediction modes is false. If the first numerical interval is [B+C, A+B+C), the intra prediction mode syntax element value set of the current picture block includes, a flag of the first class of intra prediction modes is true, the index of the intra prediction mode used by the current picture block is the index of the intra prediction mode syntax element value set of the current picture block minus (B+C), a flag of the second class of intra prediction modes is false, and a flag of the third class of intra prediction modes is false.

In another possible implementation, before the performing probability estimation on input data by using a neural network, to obtain probability distribution of a plurality of candidate intra prediction mode syntax element value sets, the decoding method provided in this application may further include: determining, based on network structure differentiation information, the neural network applicable to the current picture block, where the network structure differentiation information includes a size of the current picture block, or the network structure differentiation information depends on a size of the current picture block. The performing probability estimation on input data by using a neural network, to obtain probability distribution of a plurality of candidate intra prediction mode syntax element value sets includes: performing probability estimation on the input data by using the determined neural network, to obtain the probability distribution of the plurality of candidate intra prediction mode syntax element value sets. In this way, different neural networks may be designed for different picture blocks (for example, different sizes), to improve decoding performance to a maximum extent.

In another possible implementation, the input data may include information about neighboring picture blocks of the current picture block, or the input data may include preprocessed information about neighboring picture blocks of current picture block. The neighboring picture blocks include an upper left neighboring picture block, an upper neighboring picture block, and a left neighboring picture block. The information about the neighboring picture block includes a reconstruction value of the neighboring picture block. Correlation between the neighboring picture blocks of the current picture block and the current picture block is fully used. Because the neighboring picture blocks have been reconstructed, the information about the neighboring picture block may represent a feature of the current picture block, and the probability distribution obtained by inputting the information about the neighboring picture blocks into the neural network has higher accuracy.

In another possible implementation, the preprocessed information about the neighboring picture blocks of the current picture block may include: an M-channel data block obtained by concatenating the information about the neighboring picture blocks and information about the current picture block, where M is greater than or equal to 1.

For example, M may be less than or equal to a class of information included in the information about the picture block.

In a possible implementation, the preprocessed information about the neighboring picture blocks of the current picture block may include a one-dimensional vector obtained by concatenating vectors converted from the information about the neighboring picture blocks and information about the current picture block.

The vector converted from the information about the picture block may be a one-dimensional valid one-hot vector.

It should be noted that the information about the current picture block in the input data may be a padded default value. Content of the default value is not limited in this embodiment of this application.

In another possible implementation, the information about the neighboring picture block may further include one or more items of the following information: a predictor, a residual value, an index of an intra prediction mode syntax element value set, and partition information. In this way, available information about the neighboring picture block can be fully utilized, and a plurality of different information combinations can be used as an input of the neural network, so that accuracy of probability distribution output by the neural network is improved, and available decoding information can be used to a maximum extent.

In another possible implementation, the neural network may include a convolutional network, a fully connected layer, and a normalized exponential function Softmax layer. The convolutional network includes a plurality of dense blocks and a pooling layer between the dense blocks, and the dense block includes a convolutional layer, an excitation ReLU layer, and a BN layer. The performing probability estimation on input data by using a neural network, to obtain probability distribution of a plurality of candidate intra prediction mode syntax element value sets includes: extracting feature information in the input data by using the convolutional network; and performing, by using the fully connected layer and the Softmax layer, probability estimation on the feature information extracted by using the convolutional network, to output the probability distribution of the plurality of candidate intra prediction mode syntax element value sets.

For example, the neural network may be used to perform probability estimation on input data of a 4×4 coding block, to obtain probability distribution of a plurality of candidate intra prediction mode syntax element value sets of the 4×4 coding block.

In another possible implementation, the neural network may include a fully connected network, a convolutional network, a concat layer, a first fully connected layer, and a Softmax layer. The fully connected network includes a plurality of second fully connected layers and activation PReLU layers connected to the second fully connected layers one by one. The convolutional network includes a plurality of dense blocks and a pooling layer between the dense blocks, and the dense block includes a convolutional layer, an excitation ReLU layer, and a BN layer. The performing probability estimation on input data by using a neural network, to obtain probability distribution of a plurality of candidate intra prediction mode syntax element value sets includes: extracting feature information of first-class information in the input data by using the convolutional network; extracting feature information of information other than the first-class information in the input data by using the fully connected network; and concatenating, by using the concat layer, the feature information extracted by using the fully connected network and the feature information extracted by using the convolutional network, and performing, by using the first fully connected layer and the Softmax layer, probability estimation on feature information concatenated by using the concat layer, to output the probability distribution of the plurality of candidate intra prediction mode syntax element value sets. The first-class information is picture block pixel-level information.

In a possible implementation, the picture block pixel-level information may be information related to a pixel value of the picture block, for example, a reconstruction value, a predictor, and a residual value.

The first-class information in the input data may be multi-channel data obtained through concatenation. The information other than the first-class information in the input data may be a one-dimensional vector obtained by concatenating converted vectors.

For example, the neural network may be used to perform probability estimation on input data of a coding block with a size other than 4×4, to obtain probability distribution of a plurality of candidate intra prediction mode syntax element value sets of the coding block with a size other than 4×4.

The feature information may be texture topology information.

In another possible implementation, the neural network may be the neural network obtained through training and having the probability estimation function.

In another possible implementation, the neural network is used to receive a training data set, and the neural network is obtained through training based on the training data set.

In another possible implementation, the training data set may be information about a plurality of neighboring picture blocks of the picture block.

In another possible implementation, entropy decoding described in this application may include binary arithmetic decoding or multi-level arithmetic decoding.

According to a third aspect, an encoder is provided, including an intra prediction module and an entropy encoding module.

The intra prediction module is configured to determine an index of an intra prediction mode syntax element value set of a current picture block, where the syntax element value set includes values of a plurality of syntax elements related to an intra prediction mode of the current picture block, and the plurality of syntax elements include an index of the intra prediction mode used by the current picture block.

The entropy encoding module is configured to perform probability estimation on input data by using a neural network, to obtain probability distribution of a plurality of candidate intra prediction mode syntax element value sets, where the probability distribution represents respective probability values of the plurality of candidate intra prediction mode syntax element value sets, and the input data is used to represent a feature of the current picture block; and perform, based on the probability distribution of the plurality of candidate intra prediction mode syntax element value sets, entropy encoding on a probability value related to the index of the intra prediction mode syntax element value set of the current picture block, to obtain a bitstream. It should be understood that the neural network is a neural network obtained through training and having a probability estimation function.

It should be noted that the encoder provided in the third aspect is configured to perform the method according to any one of the first aspect, and may achieve same effect as the solution described in the first aspect. Specific implementations of the third aspect are not described again.

According to a fourth aspect, a decoder is provided, including an entropy decoding module and an intra prediction module.

The entropy decoding module is configured to perform probability estimation on input data by using a neural network, to obtain probability distribution of a plurality of candidate intra prediction mode syntax element value sets, where the probability distribution represents respective probability values of the plurality of candidate intra prediction mode syntax element value sets, and the input data is used to represent a feature of a current picture block; and perform entropy decoding on a received bitstream based on the probability distribution, to obtain an index of an intra prediction mode syntax element value set of the current picture block. It should be understood that the neural network is a neural network obtained through training and having a probability estimation function.

The intra prediction module is configured to: determine the intra prediction mode syntax element value set of the current picture block based on the index of the intra prediction mode syntax element value set of the current picture block, where the syntax element value set includes values of a plurality of syntax elements related to an intra prediction mode of the current picture block, and the plurality of syntax elements include an index of the intra prediction mode used by the current picture block; and perform intra prediction based on the values of the plurality of syntax elements.

It should be noted that the decoder provided in the fourth aspect is configured to perform the method according to any one of the second aspect, and may achieve same effect as the solution described in the second aspect. Specific implementations of the fourth aspect are not described again.

According to a fifth aspect, this application provides an encoder, including a processing circuit, configured to perform the method according to any one of the first aspect.

According to a sixth aspect, this application provides a decoder, including a processing circuit, configured to perform the method according to any one of the second aspect.

According to a seventh aspect, this application provides a computer program product, including program code. When the program code is executed on a computer or a processor, the method according to any one of the first aspect or the second aspect is performed.

According to an eighth aspect, this application provides an encoder, including: one or more processors; and a non-transitory computer-readable storage medium, coupled to the processor and storing a program executed by the processor. When the program is executed by the processor, the encoder is enabled to perform the method according to any one of the first aspect.

According to a ninth aspect, this application provides a decoder, including: one or more processors; and a non-transitory computer-readable storage medium, coupled to the processor and storing a program executed by the processor. When the program is executed by the processor, the decoder is enabled to perform the method according to any one of the second aspect.

According to a tenth aspect, this application provides a non-transitory computer-readable storage medium, including program code. When the program code is executed by a computer device, the method according to any one of the first aspect or the second aspect is performed.

It should be noted that various possible implementations in any one of the foregoing aspects may be combined on a premise that the solutions are not contradictory.

BRIEF DESCRIPTION OF DRAWINGS

FIG. 10 is a schematic flowchart of an encoding method according to an embodiment of this application;

FIG. 11 is a schematic flowchart of another encoding method according to an embodiment of this application;

FIG. 12 is a schematic diagram of a tree structure according to an embodiment of this application;

FIG. 13 is a schematic flowchart of still another encoding method according to an embodiment of this application;

FIG. 14 is a schematic flowchart of a decoding method according to an embodiment of this application;

FIG. 15 is a schematic flowchart of another decoding method according to an embodiment of this application;

FIG. 16 is a schematic diagram of a structure of an encoder according to an embodiment of this application.

DESCRIPTION OF EMBODIMENTS

Figure 1A:
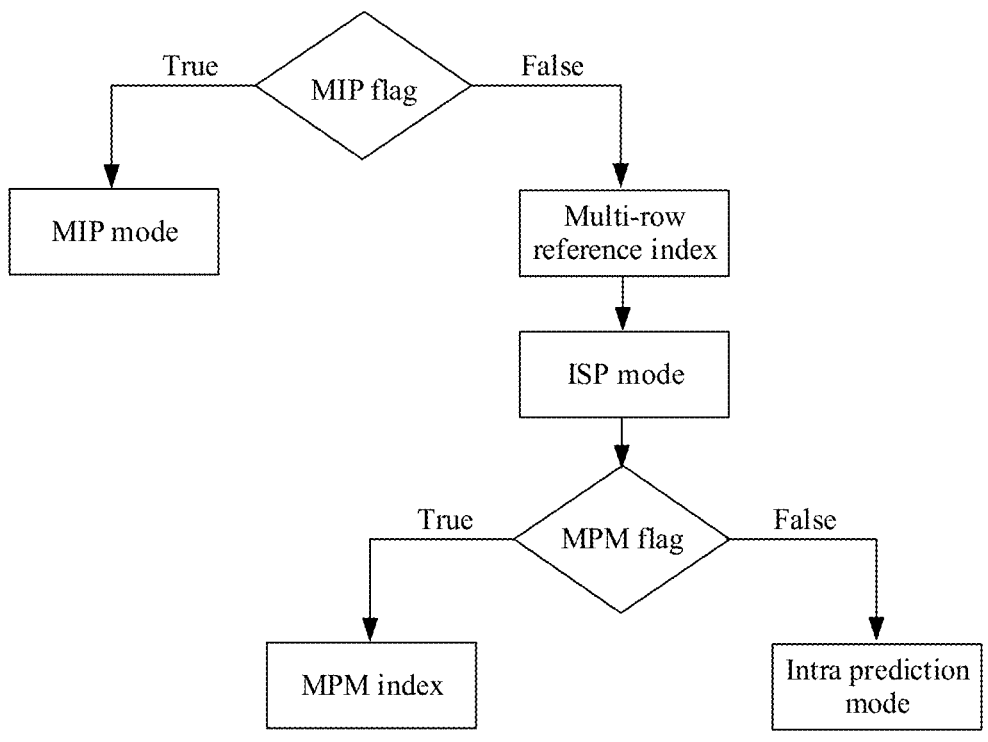
FIG. 1a is a schematic flowchart of a versatile video coding (VVC) intra prediction mode coding method according to an embodiment of this application.

Embodiments of this application provide a video compression technology based on AI, and in particular, provide a neural network-based video compression technology, and specifically provide encoding and decoding technologies, to improve a hybrid video encoding and decoding system.

Video coding typically refers to processing of a sequence of pictures, where the sequence of pictures forms a video or a video sequence. In the field of video coding, the terms "picture", "frame", or "image" may be used as synonyms. Video coding (or referred to as CODEC in general) include two parts, video encoding and video decoding. Video encoding is performed on a source side, and typically includes processing (for example, compressing) original video pictures to reduce an amount of data required for representing the video pictures (for more efficient storage and/or transmission). Video decoding is performed on a destination side, and typically includes inverse processing in comparison with processing of an encoder to reconstruct the video picture. Embodiments referring to "coding" of video pictures (or referred to as pictures in general) shall be understood to relate to "encoding" or "decoding" of the video pictures or video sequences. A combination of an encoding part and a decoding part is also referred to as CODEC (encoding and decoding).

In a case of lossless video coding, an original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side. In other words, quality of a reconstructed video picture is lower or poorer than that of the original video picture.

Several video coding standards are used for "lossy hybrid video coding" (that is, spatial and temporal prediction in a sample domain is combined with 2D transform coding for applying quantization in a transform domain). Each picture of a video sequence is typically partitioned into a set of non-overlapping blocks, and coding is typically performed at a block level. To be specific, at an encoder side, a video is usually processed, that is, encoded, at a block (video block, which may also be referred to as a picture block or a coding block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to the encoder is applied to an encoded block or a compressed block to reconstruct the current block for representation. Furthermore, the encoder needs to repeat processing steps of the decoder so that the encoder and decoder generate same prediction (for example, intra prediction and inter prediction) and/or reconstruct pixels for processing (that is, encoding) subsequent blocks.

In the following embodiments of a coding system 10, an encoder 20 and a decoder 30 are described based on FIG. 1b to FIG. 3.

Figure 1B:
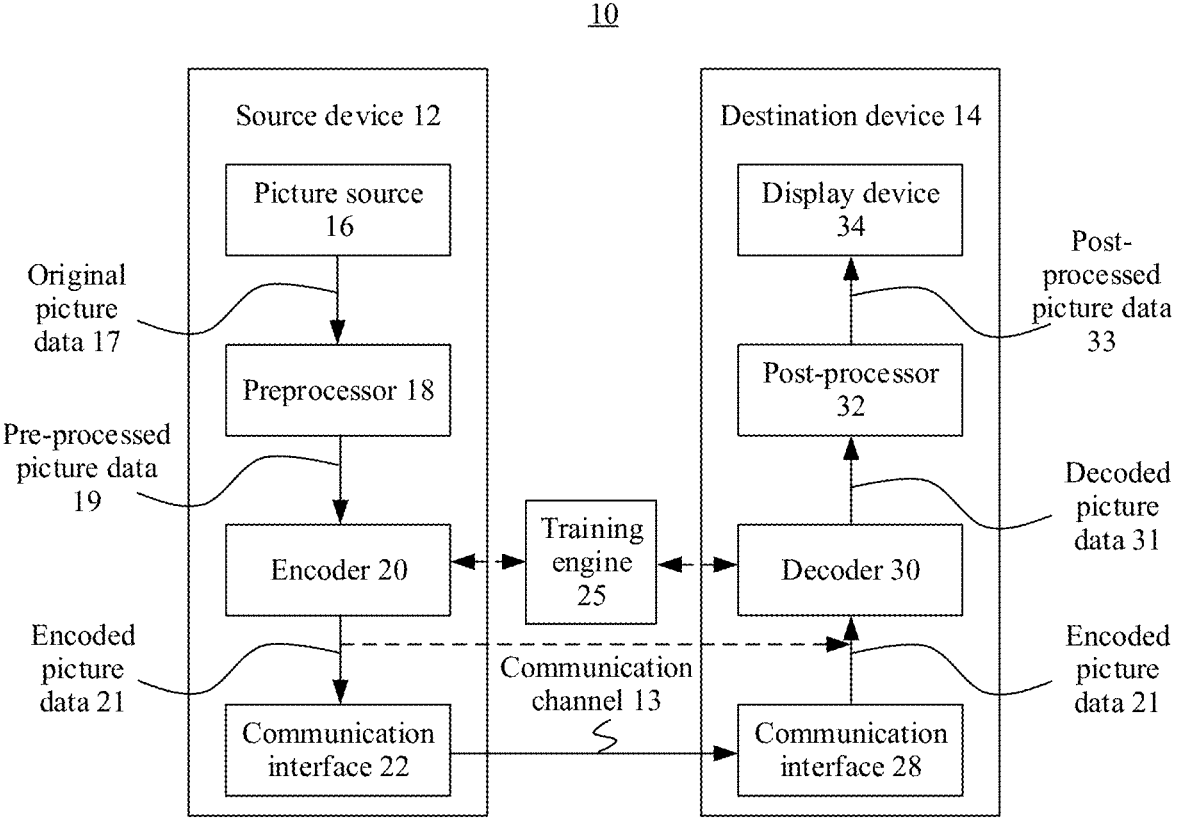
FIG. 1b is an example block diagram of a coding system according to an embodiment of this application.

FIG. 1b is a schematic block diagram of the coding system 10 according to an embodiment of this application, for example, a video coding system 10 (or the coding system 10 for short) that may utilize techniques of this application. The video encoder 20 (or the encoder 20 for short) and the video decoder 30 (or the decoder 30 for short) of the video coding system 10 represent devices that may be configured to perform techniques in accordance with various examples described in this application.

As shown in FIG. 1b, the coding system 10 includes a source device 12 configured to provide encoded picture data 21 such as an encoded picture to a destination device 14 for decoding the encoded picture data 21.

The source device 12 includes the encoder 20, and may additionally, that is, optionally, include a picture source 16, a pre-processor (or pre-processing unit) 18, for example, a picture pre-processor, and a communication interface (or communication unit) 22.

The picture source 16 may include or be any kind of picture capturing device such as a camera for capturing a real-world picture, and/or any type of picture generation device such as a computer graphics processing unit for generating a computer animated picture or any type of device for obtaining and/or providing the real-world picture, a computer generated picture (for example, screen content, a virtual reality (VR) picture, and/or any combination thereof (for example, an augmented reality (AR) picture)). The picture source 16 may be any class of memory or storage storing any of the foregoing pictures.

In order to distinguish processing performed by the pre-processor (or preprocessing unit) 18, a picture (or picture data) 17 may also be referred to as an original picture (or original picture data) 17.

The preprocessor 18 is configured to receive the original picture data 17, and preprocess the original picture data 17, to obtain a preprocessed picture (or preprocessed picture data) 19. Pre-processing performed by the pre-processor 18 may, for example, include trimming, color format conversion (for example, from RGB to YCbCr), color correction, or de-noising. It may be understood that the pre-processing unit 18 may be optional component.

The video encoder (or encoder) 20 is configured to receive the pre-processed picture data 19 and provide the encoded picture data 21 (further details are described below, for example, based on FIG. 2).

The communication interface 22 of the source device 12 may be configured to receive the encoded picture data 21 and to transmit the encoded picture data 21 (or any further processed version thereof) over a communication channel 13 to another device, for example, the destination device 14 or any other device, for storage or direct reconstruction.

The destination device 14 includes the decoder 30, and may additionally, that is, optionally, include a communication interface (or communication unit) 28, a post-processor (or post-processing unit) 32, and a display device 34.

The communication interface 28 of the destination device 14 is configured to receive the encoded picture data 21 (or any further processed version thereof), for example, directly from the source device 12 or from any other source, for example, a storage device, for example, an encoded picture data storage device, and provide the encoded picture data 21 to the decoder 30.

The communication interface 22 and the communication interface 28 may be configured to transmit or receive the encoded picture data (encoded data) 21 via a direct communication link between the source device 12 and the destination device 14, for example, a direct wired or wireless connection, or via any kind of network, for example, a wired or wireless network or any combination thereof, or any kind of private and public network, or any kind of combination thereof.

The communication interface 22 may be, for example, configured to package the encoded picture data 21 into an appropriate format, for example, packets, and/or process the encoded picture data using any kind of transmission encoding or processing for transmission over a communication link or communication network.

The communication interface 28, forming the counterpart of the communication interface 22, may be, for example, configured to receive the transmitted data and process the transmission data using any class of corresponding transmission decoding or processing and/or de-packaging to obtain the encoded picture data 21.

Both the communication interface 22 and the communication interface 28 may be configured as unidirectional communication interfaces as indicated by an arrow for the communication channel 13 in FIG. 1b pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or decoded picture data) 31 (further details will be described below, for example, based on FIG. 3).

The post-processor 32 is configured to post-process the decoded picture data 31 (also referred to as reconstructed picture data), for example, the decoded picture, to obtain post-processed picture data 33, for example, a post-processed picture. Post-processing performed by the post-processor 32 may include, for example, color format conversion (for example, conversion from YCbCr to RGB), color correction, trimming, or re-sampling, or any other processing, for example, for preparing the decoded picture data 31 for display, for example, by the display device 34.

The display device 34 is configured to receive the post-processed picture data 33 for displaying the picture, for example, to a user or viewer. The display device 34 may be or include any type of display for representing the reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any class of other display.

The coding system 10 further includes a training engine 25, configured to train the encoder 20 (in particular, a neural network that is in an entropy encoding unit in the encoder 20 and that is used to predict or estimate probability distribution of a plurality of candidate intra prediction mode syntax element value sets, or a neural network that is invoked by an entropy encoding unit and that is used to predict or estimate probability distribution of a plurality of candidate intra prediction mode syntax element value sets) or the decoder 30 (in particular, a neural network that is in an entropy decoding unit in the decoder 30 and that is used to predict or estimate probability distribution of a plurality of candidate intra prediction mode syntax element value sets, or a neural network that is invoked by an entropy decoding unit and that is used to predict or estimate probability distribution of a plurality of candidate intra prediction mode syntax element value sets), to predict or estimate probability distribution or an intra coding status of a plurality of candidate intra prediction mode syntax element value sets of a current input picture, a current picture area, or a current picture block, so as to perform entropy coding based on the probability distribution. The intra coding status may indicate the plurality of candidate intra prediction mode syntax element value sets.

One intra prediction mode syntax element value set includes values of a plurality of syntax elements related to one intra prediction mode, and the intra prediction mode syntax element value set may represent or reflect a dependency relationship between values of the plurality of syntax elements included in the intra prediction mode syntax element value set. Values of a plurality of syntax elements included in each of the plurality of candidate intra prediction mode syntax element value sets refers to values of a plurality of syntax elements related to an intra prediction mode that can be used when intra prediction is performed on the current picture block. There is a dependency relationship between values of a plurality of syntax elements included in one candidate intra prediction mode syntax element value set. An intra prediction mode syntax element value set actually used by the current picture block may be one of the plurality of candidate intra prediction mode syntax element value sets.

For example, when an intra prediction mode information encoding process is represented by using a tree diagram structure, a tree diagram includes a plurality of chain structure examples from top to bottom, a chain structure example corresponds to a candidate intra prediction mode syntax element value set, and different chain structure examples correspond to different candidate intra prediction mode syntax element value sets. It should be understood that each chain structure example represents or reflects a dependency relationship between values of a plurality of syntax elements.

For example, the current picture block actually uses an intra prediction mode a, and the intra prediction mode a belongs to an A class of intra prediction modes. The intra prediction mode syntax element value set of the current picture block may include a flag of the A class of intra prediction modes is true, and an intra prediction mode index is a.

For example, in VCC, syntax elements related to an intra prediction mode include an MIP flag, an MIP mode, a multi-row reference index, an ISP mode, an MPM flag, an MPM index, and an intra prediction mode. Values of syntax elements related to an intra prediction mode of a picture block that uses intra prediction include an MIP flag, an MIP mode, a multi-row reference index, an ISP mode, an MPM flag, an MPM index, and a value of the intra prediction mode form an intra prediction mode syntax element value set of the picture block.

The training engine 25 may train, by using a training data set, the invoked neural network that is used to predict or estimate the probability distribution of the plurality of candidate intra prediction mode syntax element value sets.

Optionally, in this embodiment of this application, the training data set may include information about neighboring picture blocks. The information about the neighboring picture blocks includes but is not limited to one or more items of the following information: respective reconstruction values, predictors, residual values, indexes of intra prediction mode syntax element value sets, and partition information of the reconstructed neighboring picture blocks. The neural network is obtained by training the training data set. Input data of the neural network includes at least the information about the neighboring picture blocks of the current picture block, and output data includes the probability distribution of the plurality of candidate intra prediction mode syntax element value sets used by the current picture block. The probability distribution represents respective probability values of the plurality of candidate intra prediction mode syntax element value sets.

In a process of training the neural network by the training engine 25, in the output probability distribution of the plurality of candidate intra prediction mode syntax element value sets used by the current picture block, a probability value of the intra prediction mode syntax element value set actually used by the current picture block is as maximum as possible. The following describes the neural network in detail with reference to FIG. 8 and FIG. 9.

The training data set in this embodiment of this application may be stored in a database (not shown in the figure), and the training engine 25 obtains a target model (for example, the target model may be the neural network that is used to predict or estimate the probability distribution of the plurality of candidate intra prediction mode syntax element value sets) through training based on the training data set. It should be noted that a source of the training data set is not limited in this embodiment of this application. For example, the training data set may be obtained from a cloud or another place to perform model training.

The target model obtained through training by the training engine 25 may be applied to the coding system 10, for example, applied to the source device 12 (for example, the encoder 20) or the destination device 14 (for example, the decoder 30) shown in FIG. 1b. The training engine 25 may obtain the target model through training on the cloud, and the coding system 10 downloads the target model from the cloud and uses the target model. Alternatively, the training engine 25 may obtain the target model through training on the cloud and use the target model, and the coding system 10 directly obtains a processing result from the cloud. For example, the training engine 25 obtains, through training, the target model that has a function of predicting or estimating the probability distribution of the plurality of candidate intra prediction mode syntax element value sets, and the coding system 10 downloads the target model from the cloud. Then, an entropy encoding unit 270 in the encoder 20 or an entropy decoding unit 304 in the decoder 30 may perform entropy encoding or entropy decoding on intra prediction mode syntax elements of an input picture or picture block based on the output result of the target model. For another example, the training engine 25 obtains, through training, the target model that has the function of predicting or estimating the probability distribution of the plurality of candidate intra prediction mode syntax element value sets, and the coding system 10 does not need to download the target model from the cloud. The encoder 20 or the decoder 30 transmits a picture or picture block to the cloud. The cloud predicts or estimates probability distribution of a plurality of candidate intra prediction mode syntax element value sets for the picture or picture block by using the target model, and transmits the probability distribution to the encoder 20 or the decoder 30. Then, the entropy encoding unit 270 in the encoder 20 or the entropy decoding unit 304 in the decoder 30 may perform entropy encoding or entropy decoding on intra prediction mode syntax elements of the input picture or picture block based on the probability distribution.

Although FIG. 1b shows the source device 12 and the destination device 14 as separate devices, embodiments of devices may also include both or both functionalities, the source device 12 or corresponding functionality and the destination device 14 or corresponding functionality. In these embodiments, the source device 12 or corresponding functionality and the destination device 14 or corresponding functionality may be implemented using same hardware and/or software or by separate hardware and/or software or any combination thereof.

As will be apparent for a skilled person based on the descriptions, existence and (exact) division into different units or functionalities in the source device 12 and/or the destination device 14 shown in FIG. 1b may vary depending on an actual device and application.

Figure 1C:
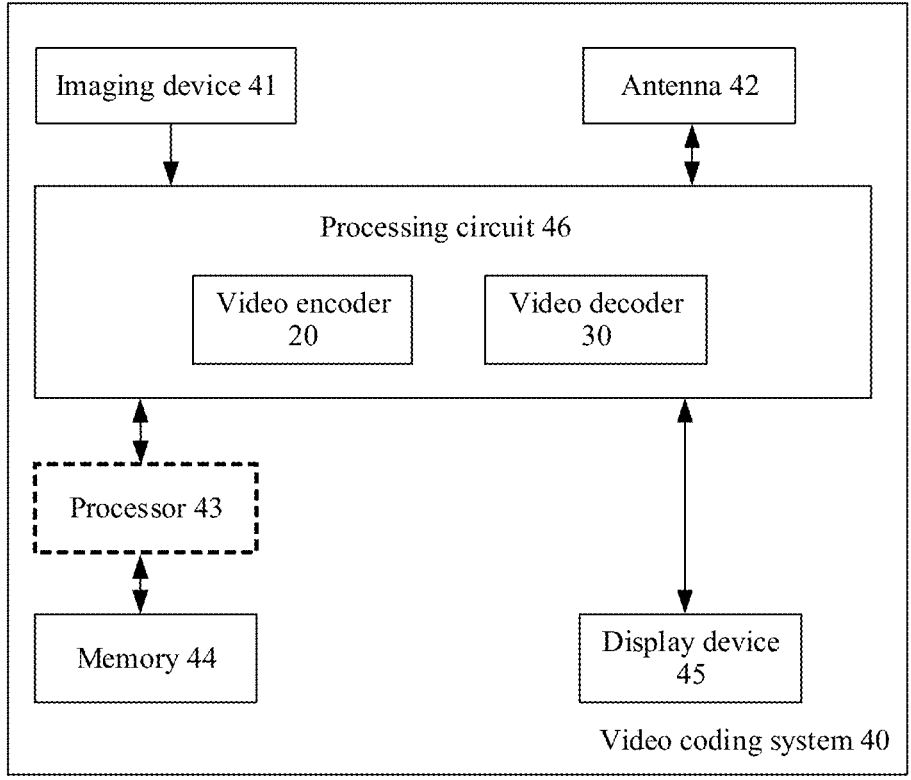
FIG. 1c is a schematic diagram of another coding system according to an embodiment of this application.
Figure 5:
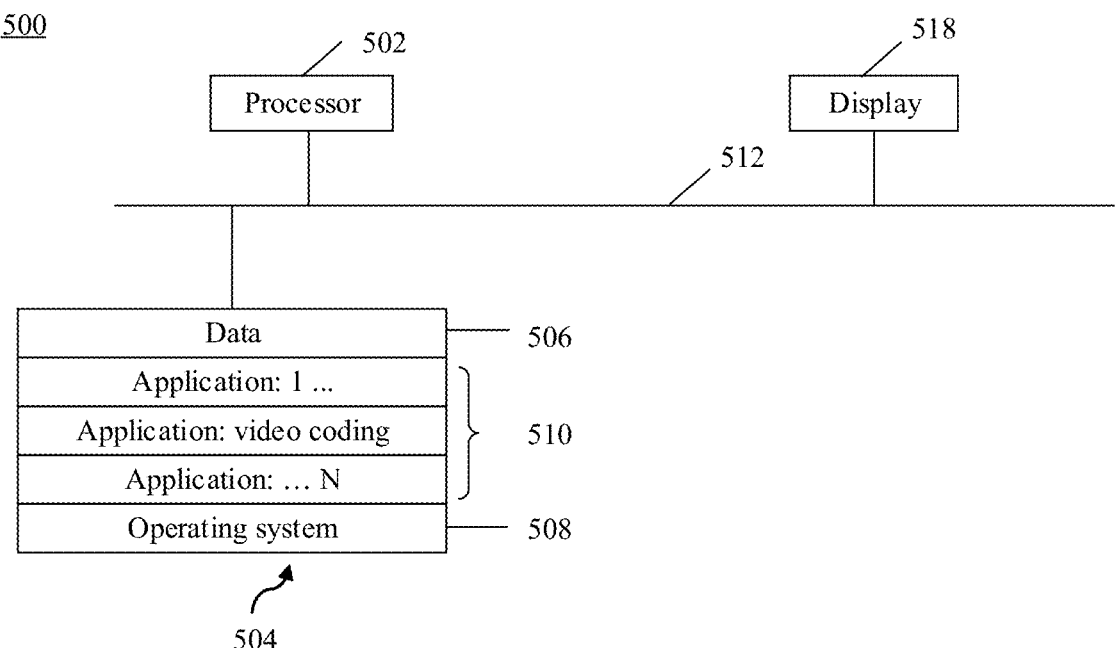
FIG. 5 is a schematic diagram of a structure of a video coding device according to an embodiment of this application.

The encoder 20 (for example, the video encoder 20) or the decoder 30 (for example, the video decoder 30) or both the encoder 20 and the decoder 30 may be implemented by using a processing circuit as shown in FIG. 1c, for example, one or more microprocessors, digital signal processors (DSPs), application-specific integrated circuits (ASICs), field-programmable gate arrays (FPGAs), discrete logic, hardware, dedicated processors for video coding, or any combination thereof. The encoder 20 may be implemented by using a processing circuit 46 to embody the various modules as discussed with respect to the encoder 20 in FIG. 2 and/or any other encoder system or subsystem described in the specification. The decoder 30 may be implemented by using the processing circuit 46 to embody the various modules as discussed with respect to the decoder 30 in FIG. 3 and/or any other decoder system or subsystem described in the specification. The processing circuit 46 may be configured to perform the various operations as discussed below. As shown in FIG. 5, if the techniques are implemented partially in software, a device may store instructions for the software in a suitable non-transitory computer-readable storage medium and may execute the instructions in hardware using one or more processors to perform the techniques of this application. Either of the video encoder 20 and the video decoder 30 may be integrated as part of a combined encoder/decoder (CODEC) in a single device, as shown in FIG. 1c.

The source device 12 and the destination device 14 may include any of a wide range of devices, including any class of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content service servers or content delivery servers), broadcast receiver devices, broadcast transmitter devices, or the like, and may use no or any class of operating systems. In some cases, the source device 12 and the destination device 14 may be equipped with components wireless communication. Therefore, the source device 12 and the destination device 14 may be wireless communication devices.

In some cases, the video coding system 10 shown in FIG. 1b is merely an example and the techniques of this application may apply to video coding devices (for example, video encoding devices or video decoding devices) that do not necessarily include any data communication between the encoding and decoding devices. In other examples, data is retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply encode data into a memory and/or retrieve data from the memory and decode the data.

FIG. 1c is an example block diagram of a video coding system 40 according to an embodiment of this application. As shown in FIG. 1c, the video coding system 40 may include an imaging device 41, a video encoder 20, and a video decoder 30 (and/or a video encoder/decoder implemented by a processing circuit 46), an antenna 42, one or more processors 43, one or more memories 44, and/or a display device 45.

As shown in FIG. 1c, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit

46 may include application-specific integrated circuit (ASIC) logic, a graphics processing unit, a general-purpose processor, or the like. The video coding system 40 may further include the optional processor 43. The optional processor 43 may similarly include application-specific integrated circuit (ASIC) logic, a graphics processing unit, a general-purpose processor, or the like. In addition, the memory 44 may be a memory of any class, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by using a logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may be included in the video encoder 20 implemented by the processing circuit 46, to embody the various modules discussed with reference to FIG. 2 and/or any other encoder system or subsystem described in the specification. The logic circuit may be configured to perform various operations described in this specification.

In some examples, the video decoder 30 may be implemented by the processing circuit 46 in a similar manner, to embody various modules described with reference to the video decoder 30 in FIG. 3 and/or any other decoder system or subsystem described in the specification. In some examples, the video decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may be included in the video decoder 30 implemented by the processing circuit 46, to embody various modules described with reference to FIG. 3 and/or any other decoder system or subsystem described in the specification.

In some examples, the antenna 42 may be configured to receive the encoded bitstream of the video data. As discussed, the encoded bitstream may include an index of an intra prediction mode syntax element value set of a picture block discussed in the specification. Optionally, the encoded bitstream may further include data, an indicator, and the like associated with an encoded video frame. The video coding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may perform entropy encoding on the syntax element (for example, the index of the intra prediction mode syntax element value set of the picture block discussed in the specification) into an encoded video bitstream. In such examples, the video decoder 30 may parse such syntax element and correspondingly decode the associated video data.

For ease of description, embodiments of this application are described by referring to versatile video coding (VVC) reference software or high efficiency video coding (HEVC) developed by the joint collaboration team on video coding (JCT-VC) of the ITU-T video coding experts group (VCEG) and the ISO/IEC motion picture experts group (MPEG). A person of ordinary skill in the art understands that embodiments of this application are not limited to the HEVC or the VVC.

Encoder and Encoding Method

Figure 2:
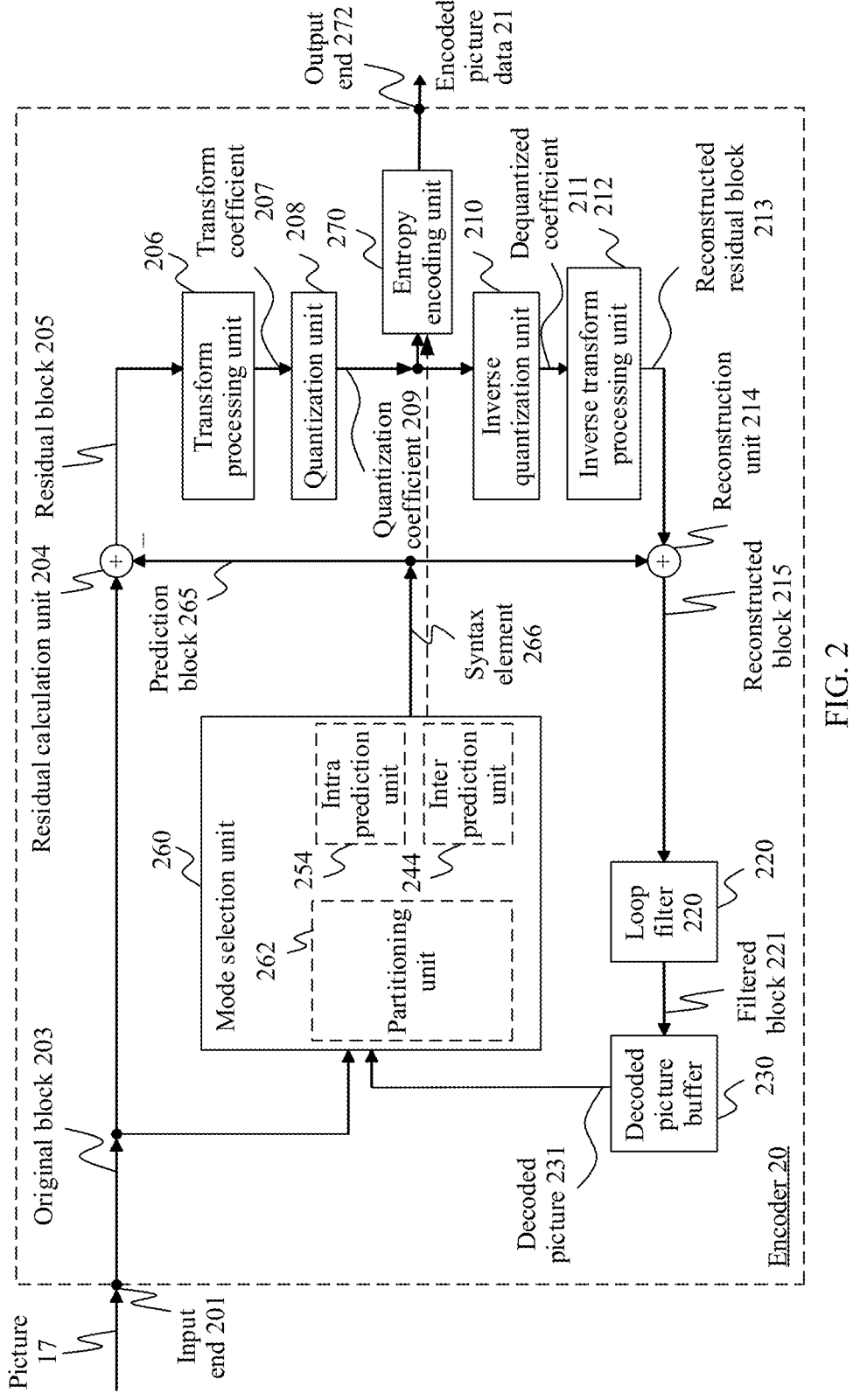
FIG. 2 is a schematic diagram of a structure of an encoder according to an embodiment of this application.

FIG. 2 is an example block diagram of the video encoder 20 according to an embodiment of this application. As shown in FIG. 2, the video encoder 20 includes an input end (or input interface) 201, a residual calculation unit 204, a transform processing unit 206, a quantization unit 208, an inverse quantization unit 210, an inverse transform processing unit 212, a reconstruction unit 214, a loop filter 220, a decoded picture buffer (DPB) 230, a mode selection unit 260, an entropy encoding unit 270, and an output end (or output interface) 272. The mode selection unit 260 may include an inter prediction unit 244, an intra prediction unit 254, and a partitioning unit 262. The inter prediction unit 244 may include a motion estimation unit and a motion compensation unit (which are not shown). The video encoder 20 shown in FIG. 2 may also be referred to as a hybrid video encoder or a video encoder based on a hybrid video codec.

Refer to FIG. 2. The inter prediction unit 244 is configured to process an input picture, picture area, or picture block, to generate a predictor of the input picture block. For example, the inter prediction unit 244 is configured to receive the input picture, picture area or picture block, and generate the predictor of the input picture, picture area, or picture block.

Figure 3:
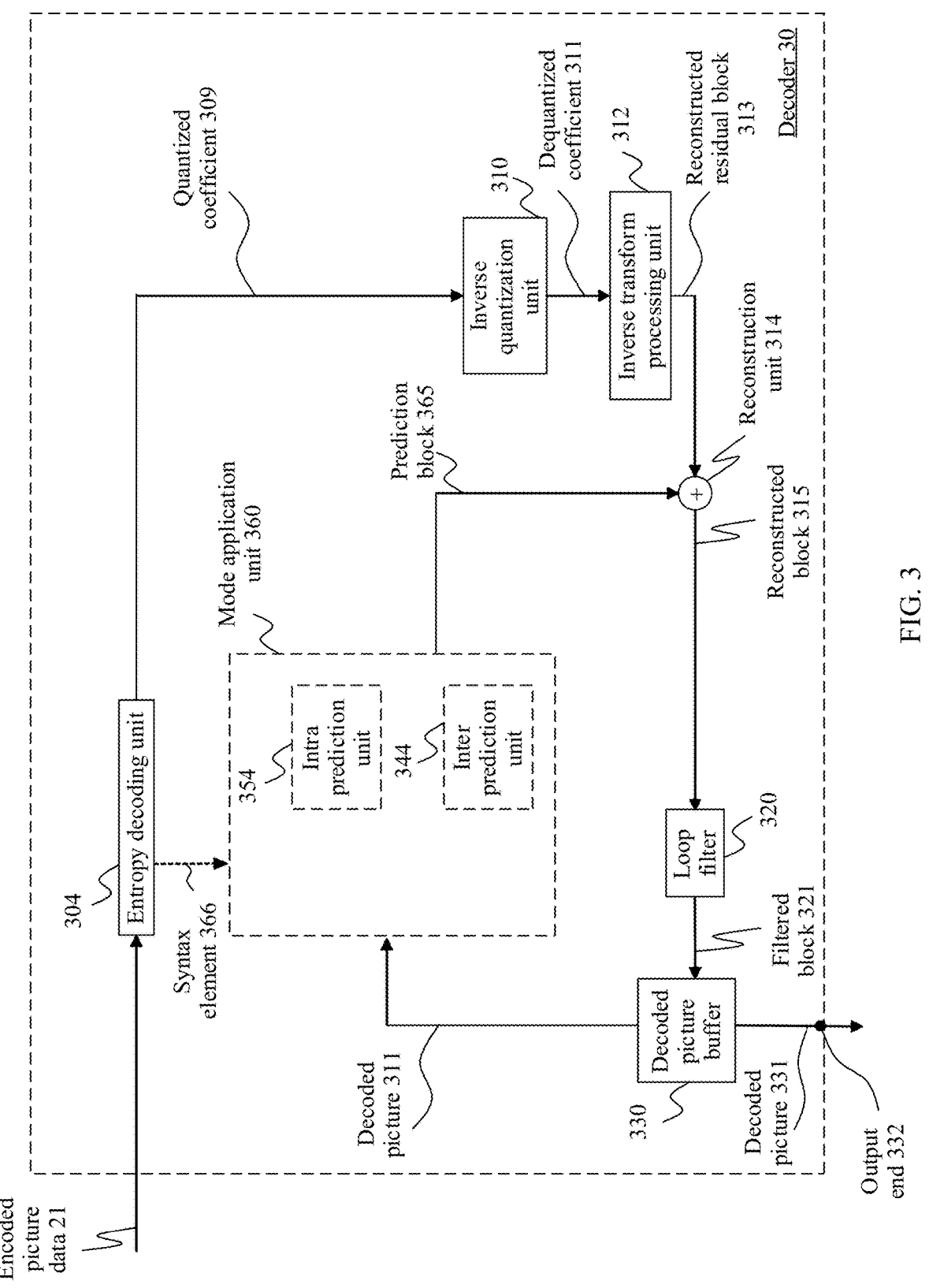
FIG. 3 is a schematic diagram of a structure of a decoder according to an embodiment of this application.

The residual calculation unit 204, the transform processing unit 206, the quantization unit 208, and the mode selection unit 260 are referred to forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244, and the intra prediction unit 254 are referred to forming a backward signal path of the encoder, where the backward signal path of the encoder 20 corresponds to the signal path of the decoder (refer to the decoder 30 in FIG. 3). The inverse quantization unit 210, the inverse transform processing unit 212, the reconstruction unit 214, the loop filter 220, the decoded picture buffer 230, the inter prediction unit 244 and the intra prediction unit 254 are further referred to forming a "built-in decoder" of the video encoder 20.

Pictures&Picture Partitioning (Pictures&Blocks)

The encoder 20 may be configured to receive, for example, via the input end 201, a picture (or picture data) 17, for example, a picture in a sequence of pictures forming a video or video sequence. The received picture or picture data may also be a pre-processed picture (or pre-processed picture data) 19. For ease of simplicity, the following description refers to a picture 17. The picture 17 may also be referred to as a current picture or to-be-coded picture (in particular in video coding to distinguish the current picture from other pictures, for example, previously encoded and/or decoded pictures of a same video sequence, that is, a video sequence which also includes the current picture).

A (digital) picture is or can be regarded as a two-dimensional array or matrix of samples with intensity values. A sample in the array may also be referred to as pixel or pel (short form of a picture element). A quantity of samples in a horizontal and vertical direction (or axis) of the array or picture defines a size and/or resolution of the picture. For representation of color, three color components are usually used, to be specific, the picture may be represented as or include three sample arrays. In an RBG format or color space, a picture includes a corresponding red, green, and blue sample array. However, in video coding, each pixel is typically represented in a luminance and chrominance format or color space, for example, YCbCr, which includes a luminance component indicated by Y (sometimes also L is used instead) and two chrominance components indicated by Cb and Cr. The luminance (luma) component Y represents luminance or gray level intensity (for example, like in a gray-scale picture), while the two chrominance (chrominance, chroma for short) components Cb and Cr represent chrominance or color information components. Accordingly, a picture in an YCbCr format includes a luminance sample array of luminance sample values (Y), and two chrominance sample arrays of chrominance values (Cb and Cr). An RGB format of a picture may be converted or transformed into the YCbCr format and vice versa, the process is also known as color transformation or conversion. If a picture is monochrome, the picture may include only a luminance sample array. Accordingly, a picture may be, for example, an array of luminance samples in a monochrome format or an array of luminance samples and two corresponding arrays of chrominance samples in 4:2:0, 4:2:2, and 4:4:4 color formats.

In an embodiment, embodiments of the video encoder 20 may include a picture partitioning unit (not shown in FIG. 2) configured to partition the picture 17 into a plurality of (typically non-overlapping) picture blocks 203. These blocks may also be referred to as root blocks, macro blocks (H.264/AVC), coding tree blocks (CTBs), or coding tree units (CTUs) in the H.265/HEVC and VVC standards. The partitioning unit may be configured to use a same block size for all pictures of a video sequence and a corresponding grid defining the block size, or to change a block size between pictures or picture subsets or groups of pictures, and partition each picture into corresponding blocks.

In other embodiments, the video encoder may be configured to directly receive the picture block 203 of the picture 17, for example, one, several or all picture blocks forming the picture 17. The picture block 203 may also be referred to as a current picture block or to-be-coded picture block.

Like the picture 17, the picture block 203 is also or may be considered as a two-dimensional array or matrix of samples with intensity values (sample values), although of a smaller dimension than the picture 17. In other words, the picture block 203 may include one sample array (for example, a luma array in case of a monochrome picture 17, or a luma or chroma array in case of a color picture), three sample arrays (for example, a luma array and two chroma arrays in case of a color picture 17), or any other quantity and/or class of arrays depending on a color format used. Quantities of pixels in a horizontal direction and a vertical direction (or an axis) of the picture block 203 define dimensions (which may also be referred to as a size) of the picture block 203. Accordingly, a block may, for example, an M×N (M-column by N-row) array of samples, or an M×N array of transform coefficients.

In an embodiment, the video encoder 20 shown in FIG. 2 may be configured to encode the picture 17 block by block, for example, encoding and prediction are performed per picture block 203.

In an embodiment, the video encoder 20 shown in FIG. 2 may be further configured to partition and/or encode the picture by using slices (also referred to as video slices), where a picture may be partitioned into or encoded using one or more slices (typically non-overlapping). Each slice may include one or more blocks (for example, coding tree units CTUs) or one or more groups of blocks (for example, tiles in the H.265/HEVC/VVC standard and bricks in the VVC standard).

In an embodiment, the video encoder 20 shown in FIG. 2 may be further configured to partition and/or encode the picture by using slices/tile groups (also referred to as video tile groups) and/or tiles (also referred to as video tiles). A picture may be partitioned into or encoded using one or more slices/tile groups (typically non-overlapping), and each slice/tile group may include, for example, one or more blocks (for example, CTUs) or one or more tiles. Each tile, for example, may be of rectangular shape and may include one or more blocks (for example, CTUs), for example, complete or fractional blocks.

Residual Calculation

The residual calculation unit 204 may be configured to calculate a residual block 205 based on the picture block (an original block) 203 and a prediction block 265 (further details about the prediction block 265 are provided later), for example, by subtracting sample values of the prediction block 265 from sample values of the picture block 203, sample by sample (pixel by pixel) to obtain the residual block 205 in a sample domain.

Transform

The transform processing unit 206 is configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in H.265/HEVC. Compared with an orthogonal DCT transform, such integer approximations are usually scaled based on a factor. To preserve a norm of a residual block which is processed by using forward and inverse transforms, an additional scale factor is applied as a part of a transform process. The scale factor is usually selected based on some constraints, for example, the scale factor being a power of two for a shift operation, a bit depth of the transform coefficient, and a tradeoff between accuracy and implementation costs. A specific scaling factor is, for example, specified for an inverse transform, for example, by the inverse transform processing unit 212 on the encoder side 20 (and the corresponding inverse transform, for example, by the inverse transform processing unit 312 on the decoder side 30), and a corresponding scaling factor for the forward transform, for example, by the transform processing unit 206 on the encoder side 20 may be specified accordingly.

In an embodiment, the video encoder 20 (respectively the transform processing unit 206) may be configured to output transform parameters, for example, a class of transform or transforms, for example, directly or encoded or compressed via the entropy encoding unit 270, so that, for example, the video decoder 30 may receive and use the transform parameters for decoding.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by using a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and a corresponding and/or the inverse dequantization, for example, by the inverse quantization unit 210, may include multiplication by the quantization step. Embodiments according to some standards such as the HEVC, may be configured to use a quantization parameter to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, the scaling of the inverse transform and dequantization may be combined. Alternatively, customized quantization tables may be used and signaled from the encoder to the decoder, for example, in a bitstream. The quantization is a lossy operation, where a loss increases with an increase in the quantization step.

In an embodiment, the video encoder 20 (respectively the quantization unit 208) may be configured to output quantization parameters (QPs), for example, directly or encoded via the entropy encoding unit 270, so that, for example, the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, for example, by applying an inverse scheme of the quantization scheme applied by the quantization unit 208 based on or using the same quantization step as the quantization unit 208. The dequantized coefficients 211 may also be referred to as dequantized residual coefficients 211 and correspond to the transform coefficients 207. However, the dequantized residual coefficients 211 are typically not identical to the transform coefficients due to the loss by quantization.

Inverse Transform

The inverse transform processing unit 212 is configured to apply the inverse transform of the transform applied by the transform processing unit 206, for example, an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (for example, a summer 214) is configured to add the transform block 213 (namely, the reconstructed residual block 213) to the prediction block 265 to obtain a reconstructed block 215 in the sample domain, for example, by adding sample values of the reconstructed residual block 213 and the sample values of the prediction block 265.

Filtering

The loop filter unit 220 (or "loop filter" 220 for short), is configured to filter the reconstructed block 215 to obtain a filtered block 221, or in general, to filter reconstructed samples to obtain filtered sample values. The loop filter unit is, for example, configured to smooth pixel transitions, or otherwise improve video quality. The loop filter unit 220 may include one or more loop filters such as a de-blocking filter, a sample-adaptive offset (SAO) filter or one or more other filters, for example, an adaptive loop filter (ALF), a noise suppression filter (NSF), or any combination thereof. In an example, the loop filter unit 220 may include the de-blocking filter, the SAO filter, and the ALF filter. An order of a filtering process may be the de-blocking filter, the SAO filter, and the ALF filter. For another example, a process called luma mapping with chroma scaling (LMCS) (namely, an adaptive in-loop reshaper) is added. This process is performed before de-blocking. In another example, a de-blocking filter process may be also applied to internal sub-block edges, for example, affine sub-blocks edges, ATMVP sub-blocks edges, sub-block transform (SBT) edges, and intra sub-partition (ISP) edges. Although the loop filter unit 220 is shown in FIG. 2 as being a loop filter, in other configurations, the loop filter unit 220 may be implemented as a post loop filter. The filtered block 221 may also be referred to as a filtered reconstructed block 221.

In an embodiment, the video encoder 20 (respectively the loop filter unit 220) may be configured to output loop filter parameters (such as SAO filter parameters or ALF filter parameters or LMCS parameters), for example, directly or encoded via the entropy encoding unit 270, so that, for example, the decoder 30 may receive and apply the same or different loop filter parameters for decoding.

Decoded Picture Buffer

The decoded picture buffer (DPB) 230 may be a memory that stores reference pictures, or in general reference picture data, for encoding video data by the video encoder 20. The DPB 230 may be formed by any of a variety of memory devices, such as a dynamic random access memory (DRAM), including a synchronous DRAM (SDRAM), magnetoresistive RAM (MRAM), a resistive RAM (RRAM), or other classes of memory devices. The decoded picture buffer 230 may be configured to store one or more filtered blocks 221. The decoded picture buffer 230 may be further configured to store other previously filtered blocks, for example, previously reconstructed and filtered blocks 221, of the same current picture or of different pictures, for example, previously reconstructed pictures, and may provide complete previously reconstructed, for example, decoded, pictures (and corresponding reference blocks and samples) and/or a partially reconstructed current picture (and corresponding reference blocks and samples), for example for inter prediction. The decoded picture buffer 230 may be further configured to store one or more unfiltered reconstructed blocks 215, or in general unfiltered reconstructed samples, for example, if the reconstructed block 215 is not filtered by the loop filter unit 220, or any other further processed version of the reconstructed blocks or samples.

Mode Selection (Partitioning&Prediction)

The mode selection unit 260 includes the partitioning unit 262, the inter prediction unit 244, and the intra prediction unit 254, and is configured to receive or obtain original picture data, for example, the original block 203 (the current block 203 of the current picture 17), and reconstructed picture data, for example, filtered and/or unfiltered reconstructed samples or blocks of the same (current) picture and/or from one or a plurality of previously decoded pictures, for example, from decoded picture buffer 230 or other buffers (for example, a line buffer, not shown in the figure). The reconstructed picture data is used as reference picture data for prediction, for example, inter prediction or intra prediction, to obtain the prediction block 265 or predictor 265.

The mode selection unit 260 may be configured to determine or select a partitioning for a current block (including non-partitioning) and a prediction mode (for example, an intra or inter prediction mode) and generate a corresponding prediction block 265, which is used for calculation of the residual block 205 and for the reconstruction of the reconstructed block 215.

In an embodiment, the mode selection unit 260 may be configured to select the partitioning and the prediction mode (for example, from those supported by or available for the mode selection unit 260), which provides best matching or a minimum residual (the minimum residual means better compression for transmission or storage), or a minimum signaling overhead (the minimum signaling overhead means better compression for transmission or storage), or which considers or balances both. The mode selection unit 260 may be configured to determine the partitioning and the prediction mode based on rate distortion optimization (RDO), for example, select a prediction mode which provides minimum rate distortion. The terms "best", "lowest". "optimal" and the like in the specification do not necessarily mean "best". "lowest". "optimal" in general, but may also refer to situations in which termination or selection criteria are met. For example, values that exceed or fall below a threshold or other restrictions may result in "suboptimal selections" but reduce complexity and processing time.

In other words, the partitioning unit 262 may be configured to partition a picture of a video sequence into a sequence of coding tree units (CTUs), and the CTU 203 may be further partitioned into smaller block partitions or sub-blocks (which form the blocks again), for example, iteratively using quad-tree partitioning (QT), binary-tree partitioning (BT) or triple-tree partitioning (TT) or any combination thereof, and to perform, for example, prediction for each of the block partitions or sub-blocks, where mode selection includes selection of a tree structure of the partitioned block 203 and prediction modes applied to each of the block partitions or sub-blocks.

The following describes in detail partitioning (for example, by the partitioning unit 262) and prediction (by the inter prediction unit 244 and the intra prediction unit 254) that are performed by the video encoder 20

Partitioning

The partitioning unit 262 may partition (or split) a picture code (or a CTU) 203 into smaller partitions, for example, square or rectangular smaller blocks. For a picture that has three sample arrays, a CTU includes an NAN block of luma samples together with two corresponding blocks of chroma samples. A maximum allowed size of the luma block in the CTU is specified to be 128×128 in the developing versatile video coding (VVC) standard, but it may be specified to be a value rather than 128×128 in the future, for example, 256×256. The CTUs of a picture may be clustered/grouped as slices/tile groups, tiles or bricks. A tile covers a rectangular region of a picture, and a tile may be divided into one or more bricks. A brick includes a plurality of CTU rows in a tile. A tile that is not partitioned into a plurality of bricks may be referred to as a brick. However, a brick is a true subset of a tile and is not referred to as a tile. Two modes of tile groups are supported in the VVC: a raster-scan slice/tile group mode and a rectangular slice mode. In the raster-scan tile group mode, a slice/tile group includes a sequence of tiles in tile raster scan of a picture. In the rectangular slice mode, a slice includes a plurality of bricks of a picture that collectively form a rectangular region of the picture. The bricks within a rectangular slice are in an order of brick raster scan of the slice. These smaller blocks (also be referred to as sub-blocks) may be further partitioned into even smaller partitions. This is also referred to as tree-partitioning or hierarchical tree-partitioning, where a root block, for example, at a root tree-level 0) (a hierarchy-level 0 or a depth 0), may be recursively partitioned, for example, partitioned into two or more blocks of a next lower tree-level, for example, nodes at a tree-level 1 (a hierarchy-level 1 or a depth 1). These blocks may be partitioned into two or more blocks of a next lower level again, for example, a tree-level 2 (a hierarchy-level 2 or a depth 2), until partitioning is terminated (because a termination criterion is fulfilled, for example, a maximum tree depth or minimum block size is reached). Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

For example, a coding tree unit (CTU) may be or include a CTB of luma samples, two corresponding CTBs of chroma samples of a picture that has three sample arrays, or a CTB of samples of a monochrome picture or a picture that is coded using three separate color planes and syntax structures (used to code the samples). Correspondingly, a coding tree block (CTB) may be an N×N block of samples for some value of N such that the division of a component into CTBs is a partitioning. A coding unit (CU) may be or include a coding block of luma samples, two corresponding coding blocks of chroma samples of a picture that has three sample arrays, or a coding block of samples of a monochrome picture or a picture that is coded using three separate color planes and syntax structures (used to code the samples). Correspondingly a coding block (CB) may be an M×N block of samples for some values of M and N such that the division of a CTB into coding blocks is a partitioning.

In embodiments, for example, according to the HEVC, a coding tree unit (CTU) may be split into CUs by using a quad-tree structure denoted as a coding tree. Decision whether to code a picture area using inter (temporal) or intra (spatial) prediction is made at a leaf CU level. Each leaf CU may be further split into one, two or four PUs based on a PU splitting class. Inside one PU, a same prediction process is applied and relevant information is transmitted to the decoder on a PU basis. After obtaining the residual block by applying the prediction process based on the PU splitting class, a leaf CU may be partitioned into transform units (TUs) based on another quad-tree structure similar to a coding tree for the CU.

In embodiments, for example, according to the latest video coding standard (referred to as versatile video coding (VVC)) currently in development, a combined quad-tree nested multi-type tree (for example, a binary tree and a ternary tree) splits a segmentation structure used to partition a coding tree unit. In a coding tree structure within a coding tree unit, a CU can have either a square or rectangular shape. For example, the coding tree unit (CTU) is first partitioned by a quaternary tree. Then, quadtree leaf nodes are further partitioned by a multi-type tree structure. There are four splitting classes in the multi-type tree structure, vertical binary-tree splitting (SPLIT_BT_VER), horizontal binary-tree splitting (SPLIT_BT_HOR), vertical ternary-tree splitting (SPLIT_TT_VER), and horizontal ternary-tree splitting (SPLIT_TT_HOR). The multi-type tree leaf nodes are referred to as coding units (CUs), and unless the CU is too large for a maximum transform length, this segmentation is used for prediction and transform processing without any further partitioning. This means that, in most cases, the CU. PU and TU have the same block size in the quaternary tree with a nested multi-type tree coding block structure. An exception occurs when a maximum supported transform length is smaller than a width or height of a color component of the CU. The VVC develops a unique signaling mechanism of partition splitting information in the quaternary tree with the nested multi-type tree coding structure. In the signalling mechanism, a coding tree unit (CTU) is treated as the root of a quaternary tree and is first partitioned by a quaternary tree structure. Each quadtree leaf node (when sufficiently large to allow it) is then further partitioned by a multi-type tree structure. In the multi-type tree structure, a first flag (mtt_split_cu_flag) is signalled to indicate whether a node is further partitioned; when the node is further partitioned, a second flag (mtt_split_cu_vertical_flag) is signalled to indicate a splitting direction, and then a third flag (mtt_split_cu_binary_flag) is signalled to indicate whether the split is binary split or ternary split. Based on values of mtt_split_cu_vertical_flag and mtt_split_cu_binary_flag, a multi-type tree slitting mode (MttSplitMode) of a CU can be derived by the decoder according to a predefined rule or a table. It should be noted, for a specific design, for example, 64×64 luma block and 32×32 chroma pipelining design in VVC hardware decoders, TT split is forbidden when either a width or height of a luma coding block is larger than 64. TT split is also forbidden when either a width or height of a chroma coding block is larger than 32. The pipelining design divides a picture into virtual pipeline data units (VPDUs) which are defined as non-overlapping units in the picture. In hardware decoders, successive VPDUs are processed by a plurality of pipeline stages simultaneously. A VPDU size is roughly proportional to a buffer size in most pipeline stages, so it is important to keep the VPDU size small. In most hardware decoders, the VPDU size may be set to a maximum transform block (TB) size. However, in the VVC, ternary tree (TT) and binary tree (BT) partition may lead to an increase in the VPDU size.

In addition, it should be noted that, when a portion of a tree node block exceeds the bottom or a right picture boundary, the tree node block is forced to be split until all samples of every coded CU are located inside picture boundaries.

For example, an intra sub-partition (ISP) tool may divide luma intra-predicted blocks vertically or horizontally into 2 or 4 sub-partitions depending on a block size.

In an example, the mode selection unit 260 of the video encoder 20 may be configured to perform any combination of the partitioning techniques described above.

As described above, the video encoder 20 is configured to determine or select a best or optimum prediction mode from a (pre-determined) prediction mode set. The prediction mode set may include, for example, an intra prediction mode and/or an inter prediction mode.

Intra Prediction

An intra prediction mode set may include 35 different intra prediction modes, for example, non-directional modes such as a DC (or average) mode and a planar mode, or directional modes such as those defined in HEVC, or may include 67 different intra prediction modes, for example, non-directional modes such as a DC (or average) mode and a planar mode, or directional modes such as those defined in VVC. For example, several conventional angular intra prediction modes are adaptively replaced with wide-angle intra prediction modes for non-square blocks as defined in VVC. For another example, to avoid division operations for DC prediction, only a longer side is used to compute an average for the non-square blocks. In addition, results of intra prediction of the planar mode may be further modified by using a position dependent intra prediction combination (PDPC) method.

The intra prediction unit 254 is configured to use reconstructed samples of neighboring blocks of a same current picture to generate an intra prediction block 265 based on an intra prediction mode in the intra prediction mode set.

The intra prediction unit 254 (or in general the mode selection unit 260) is further configured to output intra prediction parameters (or in general information indicative of a selected intra prediction mode for the block or an index of an intra prediction mode syntax element value set described in this application) to the entropy encoding unit 270 in a form of syntax elements 266 for inclusion into the encoded picture data 21, so that, for example, the video decoder 30 may receive and use the prediction parameters for decoding.

The intra prediction unit 254 may perform the solution provided in this application, to determine the index (in the form of the syntax elements 266) of the intra prediction mode syntax element value set corresponding to the information about the selected intra prediction mode. For specific implementation, refer to descriptions in the method embodiments of this application.

It should be noted that determining the index of the intra prediction mode syntax element value set corresponding to the information about the selected intra prediction mode may be performed by the intra prediction unit 254, or may be performed by a unit separately deployed from the intra prediction unit 254. This is not limited in this embodiment of this application.

Intra prediction modes in HEVC include a direct current prediction mode, a planar prediction mode, and 33 angle prediction modes That is, there are 35 candidate prediction modes in total. A current block may use pixels of reconstructed picture blocks on left and upper sides as references to perform intra prediction. A picture block that is in a surrounding area of the current block and that is used to perform intra prediction on the current block becomes a reference block, and a pixel in the reference block is referred to as a reference pixel. Among the 35 candidate prediction modes, the direct current prediction mode is applicable to an area whose texture is flat in the current block, and all pixels in the area use an average value of reference pixels in the reference block as prediction. The planar prediction mode is applicable to a picture block whose texture changes smoothly. For the current block that meets the condition, bilinear interpolation is performed by using a reference pixel in a reference block as prediction of all pixels in the current block. In the angle prediction mode, a value of a reference pixel in a corresponding reference block is copied along an angle as prediction of all pixels in the current block by using a feature that texture of the current block is highly correlated with texture of a neighboring reconstructed picture block.

An HEVC encoder selects an optimal intra prediction mode from the 35 candidate prediction modes for the current block, and writes the optimal intra prediction mode into a video bitstream. To improve coding efficiency of intra prediction, the encoder/decoder derives three most probable modes from respective optimal intra prediction modes of reconstructed picture blocks that use intra prediction in the surrounding area. If the optimal intra prediction mode selected for the current block is one of the three most probable modes, a first index is encoded to indicate that the selected optimal intra prediction mode is one of the three most probable modes. If the selected optimal intra prediction mode is not one of the three most probable modes, a second index is encoded to indicate that the selected optimal intra prediction mode is one of the other 32 modes (modes other than the foregoing three most probable modes among the 35 candidate prediction modes). The HEVC standard uses a 5-bit fixed-length code as the foregoing second index.

A method for deriving the three most probable modes by the HEVC encoder includes: selecting optimal intra prediction modes of the left neighboring picture block and the upper neighboring picture block of the current block, and putting the optimal intra prediction modes into a set; and if the two optimal intra prediction modes are the same, retaining only one intra prediction mode in the set. If the two optimal intra prediction modes are the same and both are angle prediction modes, two angle prediction modes adjacent to an angle direction are further selected and added to the set. Otherwise, the planar prediction mode, the direct current prediction mode, and a vertical prediction mode are sequentially selected and added to the set until a quantity of modes in the set reaches 3.

After performing entropy decoding on the bitstream, the HEVC decoder obtains mode information of the current block. The mode information includes an identifier indicating whether the optimal intra prediction mode of the current block is in the three most probable modes, an index of the optimal intra prediction mode of the current block in the three most possible modes, or an index of the optimal intra prediction mode of the current block in the other 32 modes.

Inter Prediction

In a possible implementation, an inter prediction mode set depends on available reference pictures (that is, previous at least partially decoded pictures, for example, stored in the DPB 230) and other inter prediction parameters, for example, whether the whole reference picture or only a part, for example, a search window area around the area of the current block, of the reference picture is used for searching for a best matching reference block, and/or for example, whether pixel interpolation is applied, for example, half/ semi-pel, quarter-pel and/or $\frac{1}{16}$ pel interpolation, or not.

In addition to the foregoing prediction modes, a skip mode and/or a direct mode may further be applied.

For example, a merge candidate list of an extended merge prediction mode includes the following five classes of candidates in order: spatial MVP from spatial neighboring CUs, temporal MVP from collocated CUs, history-based MVP from an FIFO table, pairwise average MVP, and zero MVs. Bilateral matching-based decoder side motion vector refinement (DMVR) may be used to increase accuracy of the MVs of the merge mode. A merge mode with MVD (MMVD) comes from a merge mode with motion vector differences. An MMVD flag is sent right after a skip flag and a merge flag are sent, to specify whether the MMVD mode is used for a CU. A CU-level adaptive motion vector resolution (AMVR) scheme may be used. AMVR allows an MVD of the CU to be coded in different precision. An MVD of a current CU may be adaptively selected based on a prediction mode of the current CU. When a CU is coded in the merge mode, a combined inter/intra prediction (CIIP) mode may be applied to the current CU. Weighted averaging of inter and intra prediction signals is performed to obtain CIIP prediction. For affine motion compensation prediction, an affine motion field of a block is described by using motion information of two control point (4 parameters) or three control point motion vectors (6 parameters). Subblock-based temporal motion vector prediction (SbTMVP) is similar to temporal motion vector prediction (TMVP) in HEVC, but predicts a motion vector of a sub-CU in a current CU. A bi-directional optical flow (BDOF), previously referred to as BIO, is a simpler version that requires much less computation, especially in terms of a quantity of multiplications and a value of a multiplier. In a triangle partition mode, a CU is split evenly into two triangular portions through diagonal split and anti-diagonal split. In addition, a bi-prediction mode is extended beyond simple averaging to allow weighted averaging of two prediction signals.

The inter prediction unit 244 may include a motion estimation (ME) unit and a motion compensation (MC) unit (which not shown in FIG. 2). The motion estimation unit may be configured to receive or obtain the picture block 203 (the current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded picture 231, or in other words, the current picture and the previously decoded picture 231 may be part of or form a sequence of pictures forming the video sequence.

The encoder 20 may, for example, be configured to select a reference block from a plurality of reference blocks of a same picture or different pictures of a plurality of other pictures and provide a reference picture (or a reference picture index) and/or an offset (spatial offset) between a position (x and y coordinates) of the reference block and a position of the current block as inter prediction parameters to the motion estimation unit. This offset is also referred to as a motion vector (MV).

The motion compensation unit is configured to obtain, for example, receive, an inter prediction parameter and perform inter prediction based on or using the inter prediction parameter to obtain an inter prediction block 246. Motion compensation performed by the motion compensation unit may include extracting or generating a prediction block based on a motion/block vector determined through motion estimation, and may further include performing interpolation on sub-pixel precision. Interpolation filtering may generate additional pixel samples from known pixel samples, thus potentially increasing a quantity of candidate prediction blocks that may be used to code a picture block. Upon receiving a motion vector corresponding to a PU of the current picture block, the motion compensation unit may locate a prediction block to which the motion vector points in one of reference picture lists.

The motion compensation unit may further generate syntax elements associated with a block and a video slice for use by the video decoder 30 in decoding picture blocks of the video slice. In addition or as an alternative to slices and respective syntax elements, tile groups and/or tiles and respective syntax elements may be generated or used.

In a process of obtaining a candidate motion vector list of an advanced motion vector prediction (AMVP) mode, a motion vector (MV) that can be added to the candidate motion vector list as an alternative includes an MV of a spatially neighboring picture block of the current block and an MV of a temporally neighboring picture block of the current block. The MV of the spatially neighboring picture block may include an MV of a left candidate picture block of the current block and an MV of an upper candidate picture block of the current block.

After the candidate motion vector list is obtained, an optimal MV is determined from the candidate motion vector list by using a rate distortion cost (RD cost), and a candidate motion vector with a minimum RD cost is used as a motion vector predictor (MVP) of the current block. The rate distortion cost is calculated by using the following formula:

$$J = SAD + \lambda R$$

J represents the RD cost, SAD is a sum of absolute differences (SAD), obtained through motion estimation based on the candidate motion vector, between a pixel value of a prediction block and a pixel value of the current block, R represents a bit rate, and $\lambda$ represents a Lagrange multiplier.

The encoder side transfers an index of the determined MVP in the candidate motion vector list to the decoder side. Further, the encoder side may perform motion search in an MVP-centered neighboring domain, to obtain an actual motion vector of the current block. The encoder side calculates a motion vector difference (MVD) between the MVP and the actual motion vector, and transfers the MVD to the decoder side. The decoder side parses the index, finds the corresponding MVP in the candidate motion vector list based on the index, parses the MVD, and adds the MVD and the MVP to obtain the actual motion vector of the current block.

In a process of obtaining a candidate motion information list in a merge mode, motion information that can be added to the candidate motion information list as an alternative includes motion information of a spatially neighboring or temporally neighboring picture block of the current block. If the spatially neighboring block is unavailable or intra prediction is performed, motion information of the spatially neighboring block is not added to the candidate motion information list. Temporally candidate motion information of the current block is obtained after an MV of a block at a corresponding location in a reference frame is scaled based on a picture order count (POC) of the reference frame and a picture order count (POC) of a current frame. Whether a block at a location T in the reference frame is available is first determined. If not available, a block at a location C is selected. After the candidate motion information list is obtained, optimal motion information is determined from the candidate motion information list by using an RD cost as motion information of the current block. The encoder side transmits an index value (denoted as a merge index) of a location of the optimal motion information in the candidate motion information list to the decoder side.

Entropy Encoding

The entropy encoding unit 270 is configured to apply an entropy encoding algorithm or scheme (for example, a variable length coding (VLC) scheme, an context-adaptive VLC scheme (CAVLC), an arithmetic coding scheme, a binarization algorithm, context-adaptive binary arithmetic coding (CABAC), syntax-based context-adaptive binary arithmetic coding (SBAC), probability interval partitioning entropy (PIPE) coding or another entropy encoding method or technique) on the quantized residual coefficients 209, the inter prediction parameters, the intra prediction parameters (or in general the information indicative of the selected intra prediction mode for the block or the index of the intra prediction mode syntax element value set described in this application), the loop filter parameters, and/or other syntax elements to obtain the encoded picture data 21 which can be output via the output end 272, for example, in a form of an encoded bitstream 21, so that the video decoder 30 may receive and use the parameters for decoding. The encoded bitstream 21 may be transmitted to the video decoder 30, or stored in a memory for later transmission or retrieval by the video decoder 30.

For example, compared with the previous-generation international video coding standard HEVC, some new intra prediction technologies are introduced into VVC, including matrix-based intra prediction (MIP), a multiple reference line (MRL), and intra sub-partition (ISP). In addition, VVC extends a quantity of intra prediction directions from 33 in HEVC to 65, and a quantity of most probable modes (MPMs) from 3 in HEVC to 6.

In VVC, a context-adaptive binary arithmetic coder (CA-BAC) performs entropy coding on values of a plurality of syntax elements. A coding process may be divided into three steps: binarization, context modeling, and arithmetic coding. If a value of a syntax element is not binary, the value is binarized first. Then, for each bit, there are two coding modes, a conventional coding mode and a bypass coding mode. In the conventional coding mode, a probability of each bit is estimated based on a context model of the bit, a value of the bit and estimated probability distribution are sent to the arithmetic coder, and the context model of the bit is updated. In the bypass coding mode, each bit is coded with an equal probability to speed up a coding process.

In VCC, a syntax element value set related to an intra prediction mode includes an MIP flag, an MIP mode, a multi-row reference index, an ISP mode, an MPM flag, an MPM index, the intra prediction mode, and the like. FIG. 1a shows a flowchart of a VVC intra prediction mode coding method. For a prediction block, an MIP flag (conventional coding mode) of the prediction block is first coded. If the MIP flag is true, an MIP mode (bypass coding mode) continues to be coded. Otherwise, a multi-row reference index (conventional coding mode), an ISP mode (conventional coding mode), and an MPM flag (conventional coding mode) are sequentially coded. If the MPM flag is true, an MPM index (bypass coding mode) continues to be coded. Otherwise, an intra prediction mode (bypass coding mode) is coded.

In this embodiment of this application, VVC intra prediction mode coding is used as an example. The entropy encoding unit 270 may perform entropy encoding on an index (provided by the intra prediction unit 254) of a syntax element value set (including the MIP flag, the MIP mode, the multi-row reference index, the ISP mode, the MPM flag, the MPM index, the intra prediction mode, and the like) related to an intra prediction mode.

Other structural variations of the video encoder 20 may be used to encode a video stream. For example, a non-transform based encoder 20 may quantize a residual signal directly without the transform processing unit 206 for some blocks or frames. In another implementation, the encoder 20 can have the quantization unit 208 and the inverse quantization unit 210 combined into a single unit.

Decoder and Decoding Method

FIG. 3 is an example block diagram of the video decoder 30 according to an embodiment of this application. The video decoder 30 is configured to receive the encoded picture data 21 (for example, an encoded bitstream 21), for example, encoded by the encoder 20, to obtain a decoded picture 331. The encoded picture data or bitstream includes information for decoding the encoded picture data, for example, data representing a picture block of an encoded video slice (and/or a tile group or tile) and related syntax elements (for example, the index of the intra prediction mode syntax element value set described in this application).

In the example of FIG. 3, the decoder 30 includes an entropy decoding unit 304, an inverse quantization unit 310, an inverse transform processing unit 312, a reconstruction unit 314 (for example, a summer 314), a loop filter 320, a decoded picture buffer (DBP) 330, a mode application unit 360, an inter prediction unit 344, and an intra prediction unit 354. The inter prediction unit 344 may be or include a motion compensation unit. In some examples, the video decoder 30 may perform a decoding process generally opposite to the encoding process described with respect to the video encoder 20 in FIG. 2.

Refer to FIG. 3. The inter prediction unit 344 is configured to process an input picture, picture area, or picture block, to generate a predictor of the input picture block. For example, the inter prediction unit 344 is configured to receive the input picture, picture area, or picture block, and generate the predictor of the input picture, picture area, or picture block.

As described in the encoder 20, the inverse quantization unit 210, the inverse transform processing unit 212, the reconstruction unit 214, the loop filter 220, the decoded picture buffer DPB 230, the inter prediction unit 244, and the intra prediction unit 254 further form the "built-in encoder" of the video encoder 20. Accordingly, the inverse quantization unit 310, the inverse transform processing unit 312, the reconstruction unit 314, the loop filter 320, the decoded picture buffer 330, the inter prediction unit 344, and the intra prediction unit 354 also constitute a "built-in decoder" of the video decoder 30. The inverse quantization unit 310 may be identical in function to the inverse quantization unit 210, the inverse transform processing unit 312 may be identical in function to the inverse transform processing unit 212, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 apply correspondingly to the respective units and functions of the video decoder 30.

Entropy Decoding

The entropy decoding unit 304 is configured to parse the bitstream 21 (or in general the encoded picture data 21) and perform entropy decoding on the encoded picture data 21 to obtain, for example, quantized coefficients 309 and/or decoded coding parameters (not shown in FIG. 3), for example, any or all of an inter prediction parameter (for example, the reference picture index and the motion vector), an intra prediction parameter (for example, the intra prediction mode or index, or the index of the intra prediction mode syntax element value set described in this application), transform parameters, quantization parameters, loop filter parameters, and/or other syntax elements. The entropy decoding unit 304 may be configured to apply decoding algorithms or schemes corresponding to the encoding schemes as described with regard to the entropy encoding unit 270 of the encoder 20. The entropy decoding unit 304 may be further configured to: provide the mode application unit 360 with the inter prediction parameter and the intra prediction parameter (for example, the index of the intra prediction mode syntax element value set described in this application) and/or the other syntax elements; and provide other parameters to other units of the decoder 30. The video decoder 30 may receive syntax elements at a video slice level and/or a video block level. In addition or as an alternative to slices and respective syntax elements, tile groups and/or tiles and respective syntax elements may be received or used.

Further, the entropy decoding unit 304 provides the mode application unit 360 with the intra prediction parameter (for example, the index of the intra prediction mode syntax element value set described in this application). The intra prediction unit 354 may perform the solution in this application, determine the intra prediction mode syntax element value set based on the index of the intra prediction mode syntax element value set, and further perform inter prediction. For specific implementation, refer to descriptions in the method embodiments of this application.

It should be noted that the determining the intra prediction mode syntax element value set based on the index of the intra prediction mode syntax element value set may be performed by the intra prediction unit 354, or may be performed by a unit separately deployed from the intra prediction unit 354. This is not limited in this embodiment of this application.

Inverse Quantization

The inverse quantization unit 310 may be configured to receive quantization parameters (QP) (or in general information related to the inverse quantization) and quantized coefficients from the encoded picture data 21 (for example, by parsing and/or decoding, for example, by the entropy decoding unit 304) and to apply based on the quantization parameters inverse quantization on the decoded quantized coefficients 309 to obtain dequantized coefficients 311, which may also be referred to as transform coefficients 311. The inverse quantization process may include use of a quantization parameter used by the video encoder 20 for each video block in a video slice to determine a degree of quantization and, likewise, a degree of inverse quantization that should be applied.

Inverse Transform

The inverse transform processing unit 312 may be configured to receive dequantized coefficients 311, also referred to as the transform coefficients 311, and to apply a transform to the dequantized coefficients 311 to obtain reconstructed residual blocks 213 in the sample domain. The reconstructed residual block 213 may also be referred to as a transform block 313. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding, for example, by the entropy decoding unit 304) to determine the transform to be applied to the dequantized coefficients 311.

Reconstruction

The reconstruction unit 314 (for example, the summer 314) is configured to add a reconstructed residual block 313, to a prediction block 365 to obtain a reconstructed block 315 in the sample domain, for example, by adding sample values of the reconstructed residual block 313 and sample values of the prediction block 365.

Filtering

The loop filter unit 320 (either in a coding loop or after a coding loop) is configured to filter the reconstructed block 315 to obtain a filtered block 321, to smooth pixel transitions, or otherwise improve video quality. The loop filter unit 320 may include one or more loop filters such as a de-blocking filter, a sample-adaptive offset (SAO) filter or one or more other filters, for example, an adaptive loop filter (ALF), a noise suppression filter (NSF), or any combination thereof. For example, the loop filter unit 320 may include the de-blocking filter, the SAO filter, and the ALF filter. An order of a filtering process may be the de-blocking filter, the SAO filter, and the ALF filter. For another example, a process called the luma mapping with chroma scaling (LMCS) (namely, the adaptive in-loop reshaper) is added. This process is performed before de-blocking. For another example, the de-blocking filter process may be also applied to internal sub-block edges, for example, affine sub-blocks edges, ATMVP sub-blocks edges, sub-block transform (SBT) edges, and intra sub-partition (ISP) edges. Although the loop filter unit 320 is shown in FIG. 3 as being a loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output respectively display.

The decoder 30 is configured to output a decoded picture 311, for example, via output end 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (for example, by parsing and/or decoding, for example, by the entropy decoding unit 304). The mode application unit 360 may be configured to perform prediction (intra or inter prediction) per block based on reconstructed pictures, blocks or respective samples (filtered or unfiltered) to obtain the prediction block 365.

When the video slice is coded as an intra coded (I) slice, the intra prediction unit 354 of the mode application unit 360 is configured to generate the prediction block 365 for a picture block of the current video slice based on a signaled intra prediction mode and data from previously decoded blocks of the current picture. When the video picture is coded as an inter coded (for example, B, or P) slice, the inter prediction unit 344 (for example, the motion compensation unit) of the mode application unit 360 is configured to produce prediction blocks 365 for a video block of the current video slice based on the motion vectors and other syntax elements received from the entropy decoding unit 304. For inter prediction, the prediction blocks may be produced from one of the reference pictures within one of the reference picture lists. The video decoder 30 may construct reference frame lists, a list 0 and a list 1, using default construction techniques based on reference pictures stored in the DPB 330. The same or similar process may be applied for or by embodiments using tile groups (for example, video tile groups) and/or tiles (for example, video tiles) in addition or alternatively to slices (for example, video slices), for example, a video may be coded using I, P or B tile groups and/or tiles.

The mode application unit 360 is configured to determine prediction information for a video block of the current video slice by parsing the motion vectors and other syntax elements, and uses the prediction information to produce the prediction blocks for the current video block being decoded. For example, the mode application unit 360 uses some of the received syntax elements to determine a prediction mode (for example, intra or inter prediction) used to code the video blocks of the video slice, an inter prediction slice class (for example, B slice, P slice, or GPB slice), construction information for one or more of the reference picture lists for the slice, motion vectors for each inter-encoded video block of the slice, inter prediction status for each inter coded video block of the slice, and other information to decode the video blocks in the current video slice. The same or similar process may be applied for or by embodiments using tile groups (for example, video tile groups) and/or tiles (for example, video tiles) in addition or alternatively to slices (for example, video slices), for example, a video may be coded using I, P or B tile groups and/or tiles.

In an embodiment, the video decoder 30 in FIG. 3 may be further configured to partition and/or decode a picture by using slices (also referred to as video slices), where a picture may be partitioned into or decoded using one or more slices (typically non-overlapping). Each slice may include one or more blocks (for example, CTUs) or one or more groups of blocks (for example, tiles (H.265/HEVC/VVC) or bricks (VVC)).

In an embodiment, the video decoder 30 shown in FIG. 3 may be further configured to partition and/or decode a picture by using slices/tile groups (also referred to as video tile groups) and/or tiles (also referred to as video tiles), where a picture may be partitioned into or decoded using one or more slices/tile groups (typically non-overlapping), and each slice/tile group may include one or more blocks (for example, CTUs) or one or more tiles Each tile, for example, may be of a rectangular shape and may include one or more complete or fractional blocks (for example, CTUs).

Other variations of the video decoder 30 may be used to decode the encoded picture data 21. For example, the decoder 30 can produce an output video stream without the loop filter unit 320. For example, a non-transform based decoder 30 can inverse-quantize the residual signal directly without the inverse transform processing unit 312 for some blocks or frames. In another implementation, the video decoder 30 can have the inverse quantization unit 310 and the inverse transform processing unit 312 combined into a single unit.

It should be understood that, in the encoder 20 and the decoder 30, a processing result of a current step may be further processed and then output to a next step. For example, after interpolation filtering, motion vector derivation or loop filtering, a further operation, such as clip or shift, may be performed on a processing result of the interpolation filtering, motion vector derivation or loop filtering.

It should be noted that further operations may be applied to the derived motion vectors of the current block (including but not limit to control point motion vectors of an affine mode, sub-block motion vectors in affine, planar, ATMVP modes, temporal motion vectors, and so on). For example, a value of a motion vector is constrained to a predefined range based on a representing bit of the motion vector. If the representing bit of the motion vector is bitDepth, the range is $-2^\wedge(\text{bitDepth}-1)$ to $2^\wedge(\text{bitDepth}-1)-1$, where "^" means exponentiation. For example, if bitDepth is set as 16, the range is $-32768$ to $32767$; or if bitDepth is set as 18, the range is $-131072$ to $131071$. For example, the value of the derived motion vector (for example, MVs of four 4×4 sub-blocks within one 8×8 block) is constrained such that a max difference between integer parts of the Mvs of the four 4×4 sub-blocks is no more than N pixels, such as no more than 1 pixel. Herein provides two methods for constraining the motion vector based on the bitDepth.

It should be noted that both the encoder side and the decoder side process each picture block according to a pre-agreed order. Therefore, the encoder side does not need to transmit additional information about a coding block processing order to the decoder side.

Although embodiments have been primarily described based on video coding, it should be noted that embodiments of the coding system 10, the encoder 20 and the decoder 30 and the other embodiments described in the specification may also be configured for still picture processing or coding, that is, processing or coding of an individual picture independent of any preceding or consecutive picture as in video coding. In general, only the inter prediction units 244 (encoder) and the inter prediction unit 344 (decoder) may not be available in case picture processing coding is limited to a single picture 17. All other functionalities (also referred to as tools or technologies) of the video encoder 20 and video decoder 30 may equally be used for still picture processing, for example, residual calculation 204/304, transform 206, quantization 208, inverse quantization 210/310, (inverse) transform 212/312, partitioning 262/362, intra prediction 254/354, and/or loop filtering 220/320, and entropy encoding 270 and entropy decoding 304.

Figure 4:
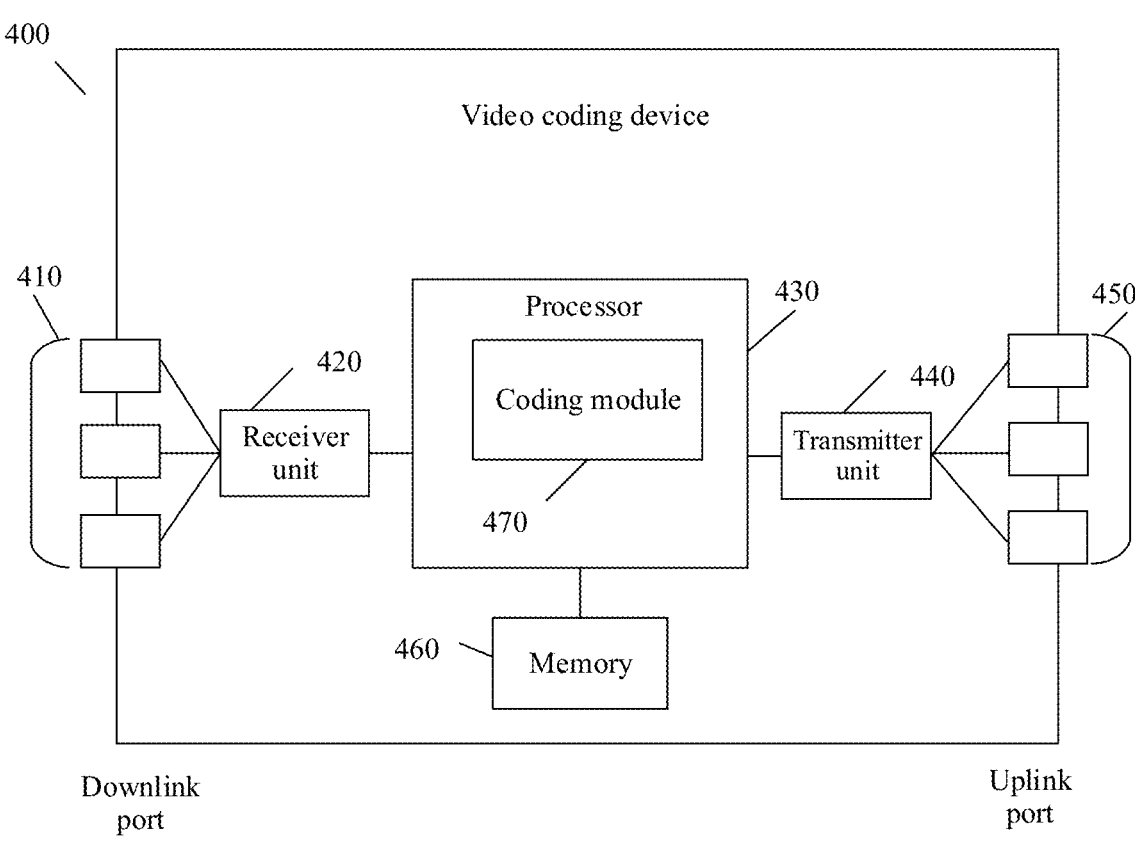
FIG. 4 is an example block diagram of a video coding device according to an embodiment of this application.

FIG. 4 is an example block diagram of a video coding device 400 according to an embodiment of this application. The video coding device 400 is suitable for implementing the disclosed embodiments as described in the specification. In an embodiment, the video coding device 400 may be a decoder such as the video decoder 30 in FIG. 1*b*, or may be an encoder such as the video encoder 20 in FIG. 1*b*.

The video coding device 400 includes ingress ports 410 (or input ports 410) and a receiver unit (Rx) 420 for receiving data; a processor, a logic unit, or a central processing unit (CPU) 430 for processing the data, for example, the processor 430 herein may be a neural network processing unit 430; a transmitter unit (Tx) 440 and egress ports 450 (or output ports 450) for transmitting the data; and a memory 460 for storing the data. The video coding device 400 may further include optical-to-electrical (OE) components and electrical-to-optical (EO) components coupled to the ingress ports 410, the receiver unit 420, the transmitter unit 440, and the egress ports 450 for egress or ingress of optical or electrical signals.

The processor 430 is implemented by hardware and software. The processor 430 may be implemented as one or more processor chips, cores (for example, a multi-core processor). FPGAs, ASICs, and DSPs. The processor 430 is in communication with the ingress ports 410, receiver unit 420, transmitter unit 440, egress ports 450, and memory 460. The processor 430 includes a coding module 470 (for example, a neural network-based coding module 470). The coding module 470 implements the embodiments disclosed above. For example, the coding module 470 implements, processes, prepares, or provides various coding operations. Therefore, the coding module 470 provides substantial improvement to functions of the video coding device 400 and affects switching of the video coding device 400 to a different state. Alternatively, the coding module 470 is implemented as instructions stored in the memory 460 and executed by the processor 430.

The memory 460 includes one or more disks, tape drives, and solid-state drives and may be used as an over-flow data storage device, to store programs when such programs are selected for execution, and to store instructions and data that are read during program execution. The memory 460 may be volatile and/or non-volatile and may be a read-only memory (ROM), a random access memory (RAM), a ternary content-addressable memory (TCAM), and/or a static random-access memory (SRAM).

FIG. 5 is an example block diagram of an apparatus 500 according to an embodiment of this application. The apparatus 500 may be used as any one or two of the source device 12 and the destination device 14 in FIG. 1b.

A processor 502 in the apparatus 500 may be a central processing unit. Alternatively, the processor 502 may be any other class of device, or a plurality of devices, capable of manipulating or processing information now-existing or hereafter developed. Although the disclosed implementations may be practiced with a single processor as shown, for example, the processor 502, advantages in speed and efficiency can be achieved using more than one processor.

A memory 504 in the apparatus 500 may be a read-only memory (ROM) device or a random access memory (RAM) device in an implementation. Any other suitable class of storage device can be used as the memory 504. The memory 504 can include code and data 506 that are accessed by the processor 502 through a bus 512. The memory 504 may further include an operating system 508 and applications 510, the applications 510 including at least one program that permits the processor 502 to perform the methods described in the specification. For example, the applications 510 may include applications 1 to N, and further include a video encoding application and a video decoding application that perform the methods described in the specification.

The apparatus 500 may further include one or more output devices, such as a display 518. The display 518 may be, in one example, a touch sensitive display that combines a display with a touch sensitive element that is operable to sense touch inputs. The display 518 may be coupled to the processor 502 through the bus 512.

Although depicted in the specification as a single bus, the bus 512 of the apparatus 500 may be composed of a plurality of buses. Further, a secondary storage may be directly coupled to other components of the apparatus 500 or may be accessed via a network and may include a single integrated unit such as a memory card or a plurality of units such as a plurality of memory cards. The apparatus 500 may thus be implemented in a wide variety of configurations.

Embodiments of this application relate to application of a neural network. For ease of understanding, the following first explains some nouns or terms used in embodiments of this application. The nouns or terms are also used as a part of content of the present invention.

(1) Neural Network

A neural network (NN) is a machine learning model. The neural network may include neurons. The neuron may be an operation unit that uses $x_s$ and an intercept of 1 as inputs, where an output of the operation unit may be as follows:

$$h_{W,b}(x)=f(w^T x)=f(\Sigma_{s=1}^{n} W_s x_s + b) \tag{1-1}$$

$s=1, 2, \ldots,$ or n, n is a natural number greater than 1. $W_s$ is a weight of $x_s$, and b is bias of the neuron, f is an activation function of the neuron, which is used to introduce a non-linear feature into the neural network, to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. There is no special metric for "a plurality of" herein. The DNN is divided based on locations of different layers, and a neural network in the DNN may be divided into three classes: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer. Although the DNN seems to be complex, the DNN is actually not complex in terms of work at each layer, and is simply expressed as the following linear relationship expression: $\vec{y}=\alpha(W\vec{x}+b)$, where $\vec{x}$ is an input vector, $\vec{y}$ is an output vector, b is a bias vector, W is a weight matrix (also referred to as a coefficient), and $\alpha(\ )$ is an activation function. At each layer, the output vector $\vec{x}$ is obtained by performing such a simple operation on the input vector $\vec{y}$. Because there are many layers in the DNN, there are also many coefficients W and bias vectors b. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^3$. The superscript 3 indicates a layer at which the coefficient W is located, and the subscript corresponds to an output third-layer index 2 and an input second-layer index 4. It is concluded that, a coefficient from a $k^{th}$ neuron at an $(L-1)^{th}$ layer to a $j^{th}$ neuron at an $L^{th}$ layer is defined as $W_{jk}^L$. It should be noted that there is no parameter w at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network

The convolutional neural network (CNN) is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input image. The convolutional neural network includes a feature extractor constituted by a convolutional layer and a pooling layer. The feature extractor may be considered as a filter. A convolution process may be considered as using a trainable filter to perform convolution on an input image or a convolutional feature map.

The convolutional layer is a neuron layer that is in the convolutional neural network and at which convolution processing is performed on an input signal. The convolutional layer may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix is usually used to process pixels at a granularity level of one pixel (or two pixels, depending on a value of a stride) in a horizontal direction on the input image, to extract a specific feature from the image. A size of the weight matrix should be related to a size of the picture. It should be noted that a depth dimension of the weight matrix is the same as a depth dimension of the input picture. During a convolution operation, the weight matrix extends to an entire depth of the input picture. Therefore, a convolutional output of a single depth dimension is generated through convolution with a single weight matrix. However, in most cases, a single weight matrix is not used, but a plurality of weight matrices with a same size (rows×columns), namely, a plurality of same-class matrices, are applied. Outputs of the weight matrices are stacked to form a depth dimension of a convolutional picture. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unnecessary noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation. Weight values in these weight matrices need to be obtained through a large amount of training in actual application. Each weight matrix including weight values obtained through training may be used to extract information from an input image, so that the convolutional neural network performs correct prediction. When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters often needs to be reduced. Therefore, a pooling layer often needs to be periodically introduced after a convolutional layer. One convolutional layer may be followed by one pooling layer, or a plurality of convolutional layers may be followed by one or more pooling layers. During picture processing, the pooling layer is only used to reduce a space size of the picture. The pooling layer may include an average pooling operator and/or a maximum pooling operator, to perform sampling on the input picture to obtain a picture with a relatively small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each pixel in the picture output from the pooling layer represents an average value or a maximum value of a corresponding sub-region of the picture input to the pooling layer.

After processing performed at the convolutional layer/pooling layer, the convolutional neural network is not ready to output required output information, because as described above, at the convolutional layer/pooling layer, only a feature is extracted, and parameters resulting from the input image are reduced. However, to generate final output information (required class information or other related information), the convolutional neural network needs to use the neural network layer to generate an output of one required class or a group of required classes. Therefore, the convolutional neural network layer may include a plurality of hidden layers. Parameters included in the plurality of hidden layers may be obtained through pre-training based on related training data of a specific task class. For example, the task class may include image recognition, image classification, and super-resolution image reconstruction.

Optionally, at the neural network layer, the plurality of hidden layers are followed by the output layer of the entire convolutional neural network. The output layer has a loss function similar to a categorical cross entropy, and the loss function is specifically used to calculate a prediction error. Once forward propagation of the entire convolutional neural network is completed, reverse propagation is started to update a weight value and a deviation of each layer mentioned above, to reduce a loss of the convolutional neural network and an error between a result output by the convolutional neural network by using the output layer and an ideal result.

(4) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined.

This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

This application relates to an entropy encoding/entropy decoding process in the foregoing encoding/decoding process. Currently, the industry provides a procedure of an HEVC intra prediction mode entropy coding scheme based on a neural network. In this scheme, entropy coding is implemented by using a convolutional neural network (CNN) module and a multi-level arithmetic coder (Multi-level Arithmetic Coding Engine). An input of the CNN module is reconstructed blocks on an upper left, an upper side, and a left side of a current coding block and three MPMs of the coding block, and an output of the CNN module is probability distribution of intra prediction modes of the current coding block. The probability distribution of the intra prediction modes is a 35×1 vector. The vector includes 35 probability values, and the probability value indicates a probability of obtaining a corresponding value of a prediction mode of the coding block. For example, the probability distribution of the intra prediction modes of the current coding block output by the convolutional neural network is P, where $P(5)=0.3$ indicates that a probability that a prediction mode 5 of the current coding block is 0.3.

An input of the multi-level arithmetic coder is syntax elements of an optimal intra prediction mode of the current coding block, and the probability distribution of the intra prediction modes obtained through estimation by using the convolutional neural network module, and an output of the multi-level arithmetic coder is a bitstream of the prediction mode of the current coding block. For example, if the probability distribution of the intra prediction modes of the current coding block output by the convolutional neural network is P, the optimal prediction mode of the current coding block is 5, and a probability that the optimal prediction mode of the current coding block is 5 is 0.3, that is, $P(5)=0.3$, approximately $-\log_2 P(5) \approx 1.73$ $-\log_2 P(5) \approx 1.73$ bits are required for coding the prediction mode.

Figure 6:
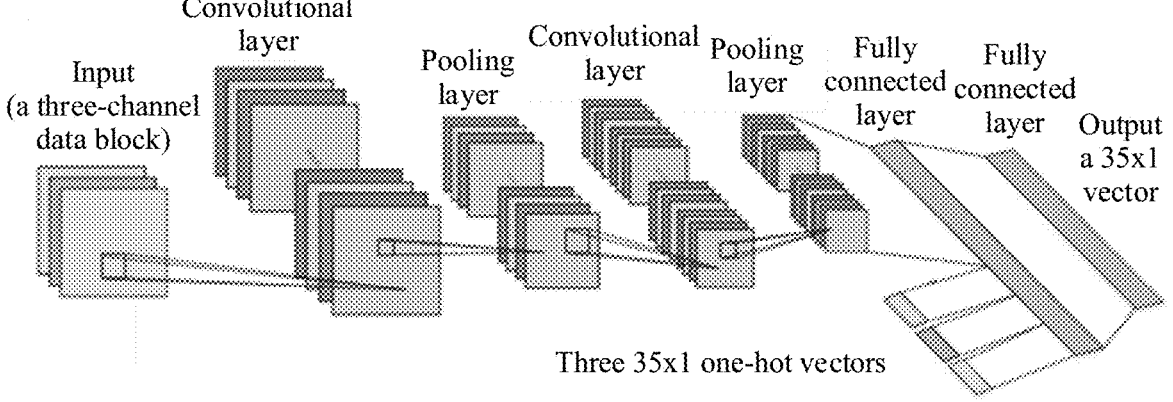
FIG. 6 is a schematic diagram of a network structure of a convolutional neural network according to an embodiment of this application.

FIG. 6 shows a network structure of a convolutional neural network. The convolutional neural network includes two convolutional layers, two pooling layers, and two fully connected layers. Reconstructed blocks on an upper left side, an upper side, and a left side of a current coding block form a three-channel data block as an input of the neural network, and corresponding texture topology information is extracted by sequentially performing two convolution operations, two ReLU calculations, and two pooling operations. Then, the texture topology information is collected by performing one full connection calculation and a 919×1 vector is output. Three MPM values are then converted into three 35×1 one-hot vectors. A specific conversion manner is as follows: A value of the one-hot vector is 1 only at the MPM value, and the value of the one-hot vector is 0 at other locations. For example, if a value of a first MPM in the current coding block is 0, a value of a first element in a first one-hot vector is 1, and the value is 0 at other locations. A function of the one-hot vector is to assist the neural network in analyzing the texture topology information. Then, one 1024×1 vector is formed by concatenating the 919×1 vector output by the convolutional layer and the three one-hot vectors converted from the MPMs. Finally, the texture topology information is integrated and analyzed by using the fully connected layer, to output a 35×1 vector as probability distribution of prediction modes of the current coding block.

In this solution, the neighboring reconstructed pixel blocks of the current coding block and MPM information are used as an input of the convolutional neural network, to obtain the probability distribution of the prediction modes of the current block, and an accurate prediction mode probability model can be obtained, thereby reducing codewords required for entropy coding.

In the entropy coding scheme, when there are a plurality of syntax elements related to an intra prediction mode, the syntax elements related to the intra prediction mode are sequentially coded, which increases hardware implementation complexity.

Based on this, this application provides an encoding method and a decoding method. Values of a plurality of syntax elements (for example, all syntax elements) related to an intra prediction mode are used as an intra prediction mode syntax element value set, and the intra prediction mode syntax element value set corresponds to an index. The index of the intra prediction mode syntax element value set is understood as one syntax element, in other words, performing entropy coding on the values of the plurality of syntax elements is replaced with performing entropy coding on a value of the syntax element. The syntax element may represent a status of the intra prediction mode of a current picture block (for example, the syntax element may indicate values of a plurality of syntax elements related to an intra prediction mode actually used by the current picture block). During entropy coding, entropy coding needs to be performed only once on the index of the intra prediction mode syntax element value set, to replace entropy coding performed on values of syntax element related to many intra prediction modes, thereby reducing hardware implementation complexity, and further improving coding performance.

Figure 7:
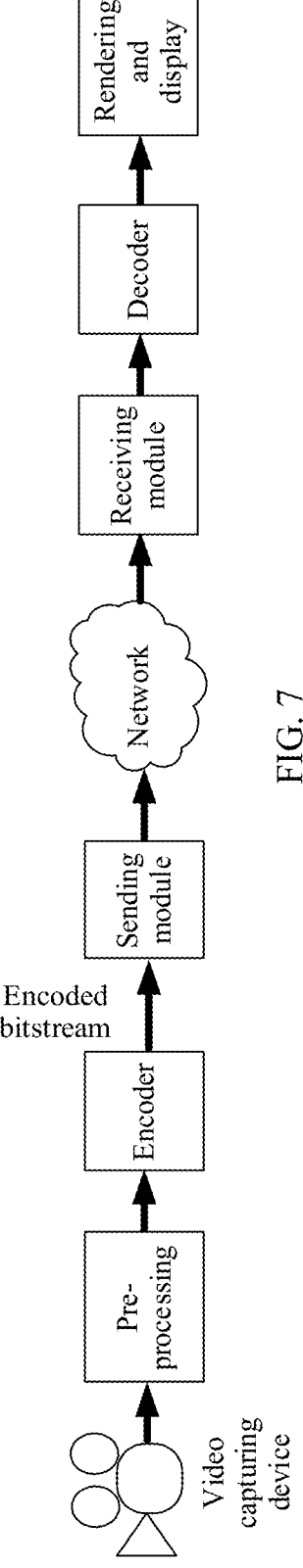
FIG. 7 is a schematic diagram of a video transmission system architecture according to an embodiment of this application.

The solution provided in the present invention may be applied to a video transmission system architecture shown in FIG. 7. In the system architecture shown in FIG. 7, at an encoder side, after a video capturing device captures a video, pre-processing is performed on the captured video. Then, an encoder compresses and encodes a processed video, to obtain an encoded bitstream. Then, a sending module sends the encoded bitstream to a decoder side through a transmission network. After a receiving module at the decoder side receives the encoded bitstream, a decoder decodes the bitstream for rendering and display.

In another possible implementation, the encoded bitstream of the video may alternatively be directly stored. At the decoder side, when necessary, the encoded bitstream is obtained, and the decoder decodes the encoded bitstream for rendering and display.

A working process of the encoder in the application scenario of this application may be the encoding process corresponding to FIG. 2, and a working process of the decoder may be the decoding process shown in FIG. 3. Details are not described herein again. It should be noted that the solutions of this application are mainly used in an intra prediction coding process. This process exists at both the encoder side and the decoder side, and this process exists in most video codecs, for example, codecs corresponding to standards such as H.263, H.264, MPEG-2, MPEG-4, VP8, and VP9.

The solutions of this application may be applied to an apparatus or a product that includes functions of the video encoder and/or the decoder, for example, a video processing software and hardware product or chip, and a product or an apparatus that includes such a chip. A specific product form is not limited in this embodiment of this application. For example, the solutions of this application may be applied to a media product such as a mobile phone.

Figure 8:
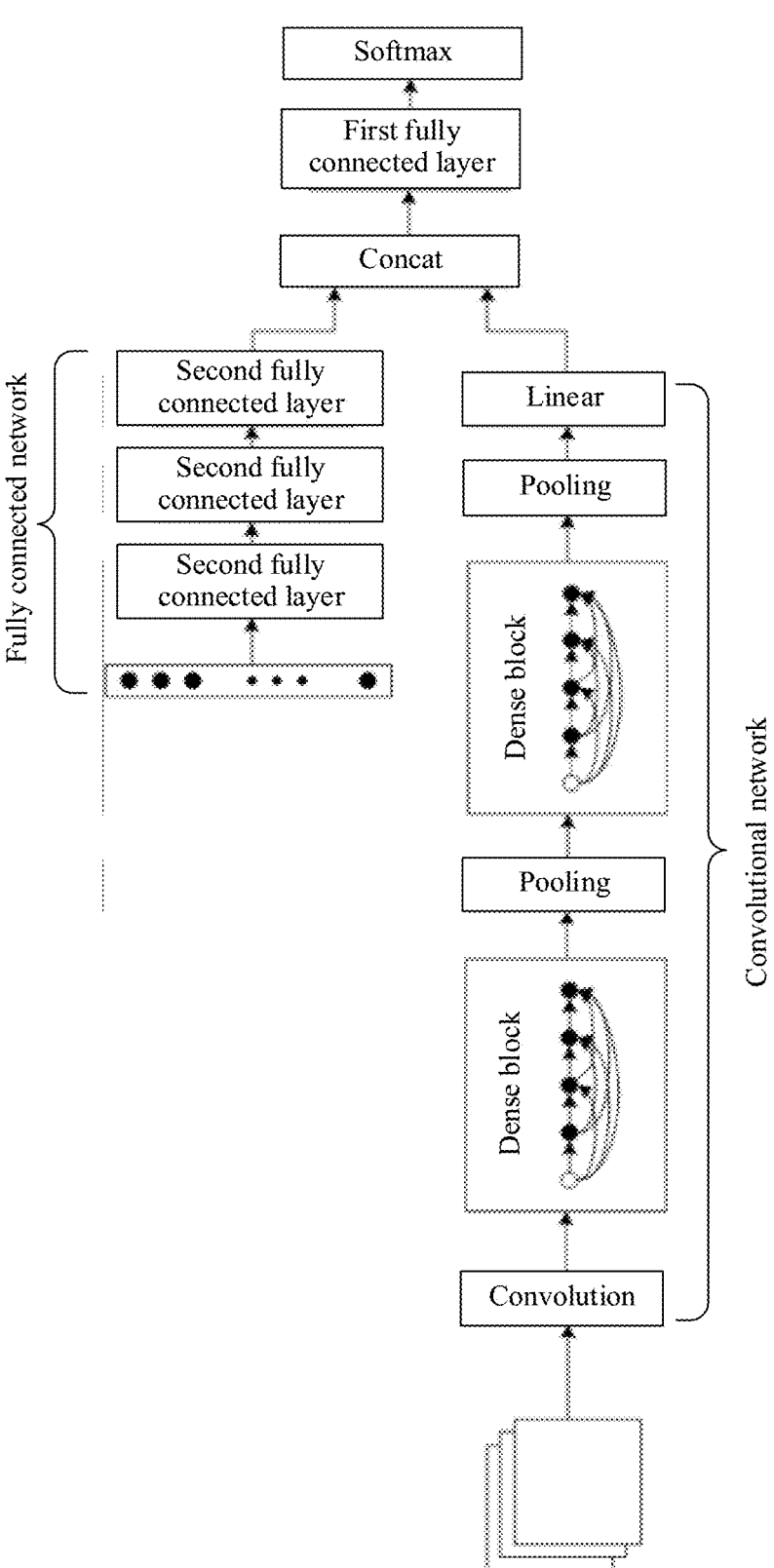
FIG. 8 is a schematic diagram of a structure of a neural network that is used to predict or estimate probability distribution of a plurality of candidate intra prediction mode syntax element value sets according to an embodiment of this application.
Figure 9:
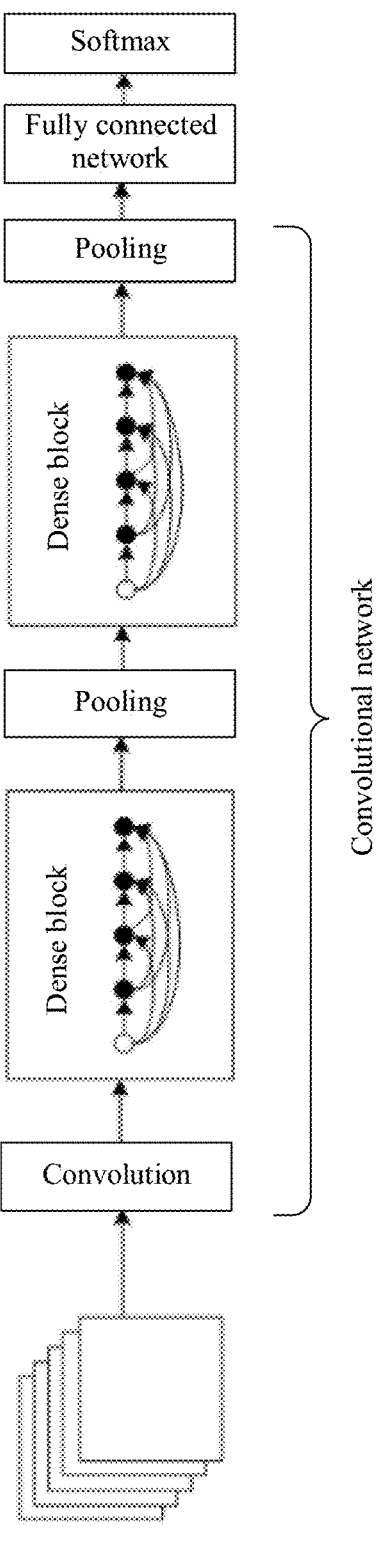
FIG. 9 is a schematic diagram of a structure of another neural network that is used to predict or estimate probability distribution of a plurality of candidate intra prediction mode syntax element value sets according to an embodiment of this application.

Before the solutions provided in this embodiment of this application are described, the following describes in detail, with reference to FIG. 8 and FIG. 9, a neural network that is used to predict probability distribution of a plurality of candidate intra prediction mode syntax element value sets in entropy encoding/entropy decoding. FIG. 8 and FIG. 9 are several example architectures of the neural network that is used to predict the probability distribution of the plurality of candidate intra prediction modes syntax element value sets in entropy encoding/entropy decoding according to embodiments of this application. This constitutes no specific limitation.

A structural body of the neural network provided in this embodiment of this application may be based on a densely connected network (DenseNet) widely used in the computer vision field. For example, for different coding blocks (for example, different sizes), embodiments of this application provide a corresponding neural network input data form and a corresponding neural network structure, to predict or estimate the probability distribution of the plurality of candidate intra prediction mode syntax element value sets, thereby maximizing coding performance.

FIG. 8 shows a structure of a neural network. The structure of the neural network may be used to predict probability distribution of a plurality of candidate intra prediction mode syntax element value sets of a 4×4 coding block. As shown in FIG. 8, the neural network includes a fully connected network, a convolutional network, a concat layer, a first fully connected layer, and a Softmax layer. The fully connected network includes a plurality of second fully connected layers and activation PReLU layers connected to the second fully connected layer one by one, and the fully connected network is used to extract feature information of input data. The convolutional network includes a plurality of dense blocks and a pooling layer between the dense blocks. The dense block includes a convolutional layer, an excitation ReLU layer, and a batch normalization BN layer. The convolutional network is used to extract feature information in the input data. The concat layer is used to concatenate the feature information extracted by using the fully connected network with the feature information extracted by using the convolutional network. The first fully connected layer and the Softmax layer perform probability estimation on feature information concatenated by using the concat layer, to output the probability distribution of the plurality of candidate intra prediction mode syntax element value sets.

In an architecture of the neural network shown in FIG. 8, first-class information in the input data may be an M-channel data block obtained by concatenating information about neighboring picture blocks and information about a current picture block, where M is a quantity of first-class information. Information other than the first-class information in the input data may be a one-dimensional vector obtained by concatenating one-hot vectors converted from the information about the neighboring picture blocks and the information about the current picture block.

The first-class information is picture block pixel-level information. The picture block pixel-level information may be information related to a pixel value of the picture block, for example, a reconstruction value, a predictor, and a residual value.

Based on the neural network shown in FIG. 8, probability estimation may be performed on the input data by using the neural network, to obtain the probability distribution of the plurality of candidate intra prediction mode syntax element value sets. Specific implementation may be: extracting feature information of the first-class information in the input data by using the convolutional network in the neural network shown in FIG. 8; extracting feature information of the information other than the first-class information in the input data by using the fully connected network in the neural network shown in FIG. 8; concatenating, by using the concat layer in the neural network shown in FIG. 8, the feature information extracted by using the fully connected network and the feature information extracted by using the convolutional network; and performing, by using the first fully connected layer and the Softmax layer, probability estimation on feature information concatenated by using the concat layer, to output the probability distribution of the plurality of candidate intra prediction mode syntax element value sets.

In a possible implementation, the neighboring picture blocks of the current picture block may include an upper left neighboring picture block, an upper neighboring picture block, and a left neighboring picture block.

In a possible implementation, the information about the neighboring picture block may include a reconstruction value of the picture block.

In another possible implementation, the information about the neighboring picture block may include one or more items of the following information: the reconstruction value, a predictor, a residual value, an index of an intra prediction mode syntax element value set, and partition information.

For example, based on the neural network shown in FIG. 8, performing probability estimation on the input data by using the neural network, to obtain the probability distribution of the plurality of candidate intra prediction mode syntax element value sets may specifically include: inputting one-dimensional vector converted from indexes of intra prediction mode syntax element value sets and partition information of the neighboring picture blocks of the current picture block into the fully connected network in the neural network; inputting a three-channel data block obtained by concatenating reconstruction values, predictors, and residual values of the neighboring picture blocks with a padded default value of the current picture block into the convolutional network of the neural network; concatenating an output of the fully connected network and an output of the convolutional network; and performing probability estimation on a result obtained through concatenation by using the first fully connected layer and the Softmax layer, to output the probability distribution of the plurality of candidate intra prediction mode syntax element value set used by the current picture block. In this example, in the architecture of the neural network shown in FIG. 8, the fully connected network includes three layers, each layer includes one fully connected layer and one PReLU layer followed by the fully connected layer, and dimensions of the first fully connected layer are respectively 300, 300, and 112. A basic structure of the convolutional network is composed of a DenseNet. An overall structure of the DenseNet is divided into a plurality of dense blocks. In each dense block, a base layer includes a convolutional layer, a ReLU layer, and a batch normalization (BN) layer. Between the dense blocks, a pooling layer is used to downsample a feature map. After a last dense block, a fully connected layer is added to convert the feature map into a multi-dimensional vector.

In a possible implementation, in a neural network used by the 4×4 coding block, a DenseNet includes two dense blocks, and each dense block includes 12 basic layers. The probability distribution of the plurality of candidate intra prediction mode syntax element value sets is one multi-dimensional vector, and a dimension of the probability distribution is a maximum value of the intra prediction mode syntax element value set plus 1. For example, it is assumed that there are 112 values of the index of the intra prediction mode syntax element value set of the 4×4 coding block. In this case, the dimension of the probability distribution of the plurality of candidate intra prediction mode syntax element value sets of the 4×4 coding block may be 112.

FIG. 9 shows a structure of another neural network. The structure of the neural network may be used to predict probability distribution of a plurality of candidate intra prediction mode syntax element value sets of a coding block of a size other than 4×4. As shown in FIG. 9, the neural network may include a convolutional network, a fully connected layer, and a Softmax layer. The convolutional network includes a plurality of dense blocks and a pooling layer between the dense blocks, and the dense block includes a convolutional layer, an excitation ReLU layer, and a BN layer. The convolutional network is used to extract feature information in input data. The fully connected layer and the Softmax layer are used to perform probability estimation on the feature information extracted by using the convolutional network, to output the probability distribution of the plurality of candidate intra prediction mode syntax element value sets.

For example, based on the neural network shown in FIG. 9, the performing probability estimation on the input data by using the neural network, to obtain the probability distribution of the plurality of candidate intra prediction mode syntax element value sets may specifically include: extracting the feature information in the input data by using the convolutional network; and performing, by using the fully connected layer and the Softmax layer, probability estimation on the feature information extracted by using the convolutional network, to output the probability distribution of the plurality of candidate intra prediction mode syntax element value sets.

In the architecture of the neural network shown in FIG. 9, the input data may be an M-channel data block obtained by concatenating information about neighboring current picture blocks and information about a current picture block, where M is an information class in the information about the picture block.

For example, based on the neural network shown in FIG. 9, performing probability estimation on the input data by using the neural network, to obtain the probability distribution of the plurality of candidate intra prediction mode syntax element value sets may specifically include: inputting a 5-channel data block (a reconstruction value, a predictor, a residual value, an index of an intra prediction mode syntax element value set, and partition information) formed by concatenating the information about the neighboring picture blocks and the information about the current picture block into the convolutional network. The convolutional network uses a DenseNet structure that is the same as that of the convolutional network in the neural network shown in FIG. 8. The fully connected layer and the Softmax layer are added after a last dense block, to estimate the probability distribution of the plurality of candidate intra prediction mode syntax element value set used by the current picture block.

When the input data of the neural network is constructed in this embodiment of this application, the concatenated information about the current picture block may be a padded default value. Content of the padded default value is not limited in this embodiment of this application.

For example, for coding blocks of different sizes, quantities of dense blocks included in DenseNets used by the convolutional network included in the neural network, and probability distribution dimensions of a plurality of candidate intra prediction mode syntax element value sets are different, which may be specifically shown in Table 1.

TABLE 1

| Neural network configuration parameters used by coding blocks of different sizes | | |
| --- | --- | --- |
| Coding block size | Quantity of dense blocks | Dimension of probability distribution of a plurality of candidate intra prediction mode syntax element value sets |
| 4 × 4 | 2 | 112 |
| 4 × 8 | 3 | 230 |
| 4 × 16 | 4 | 222 |
| 4 × 32 | 2 | 211 |
| 8 × 4 | 3 | 230 |
| 8 × 8 | 3 | 230 |
| 8 × 16 | 4 | 222 |
| 8 × 32 | 2 | 222 |
| 16 × 4 | 4 | 222 |
| 16 × 8 | 4 | 222 |
| 16 × 16 | 4 | 222 |
| 16 × 32 | 2 | 222 |
| 32 × 4 | 2 | 211 |
| 32 × 8 | 2 | 222 |
| 32 × 16 | 2 | 222 |
| 32 × 32 | 2 | 222 |
| 64 × 64 | 5 | 222 |

It should be noted that Table 1 merely shows, by using an example, neural network configuration parameters used by the coding blocks of different sizes, and is not a specific limitation thereto.

Further, in this embodiment of this application, PyTorch software may be used to train the neural network on an NVIDIA GTX 1080Ti graphics processing unit (GPU).

For example, in this embodiment of this application, the neural network may be trained by using a stochastic gradient descent (SGD) algorithm. Training data is prepared by using an uncompressed color image dataset (UCID) and a DIV2K dataset. VTM-6.0 software is used to compress images in the UCID and the DIV2K, to extract the input data and target data of the neural network. The input data of the neural network is information about the neighboring picture blocks of the current picture block, and the target data is the index of the intra prediction mode syntax element value set of the current picture block. The neural network is trained by minimizing the following loss function:

$$L(\Theta) = -\sum_{i=1}^{m} T_i \cdot \log(Y_i).$$

$\Theta$ represents a parameter of the neural network, $T_i$ represents a one-hot vector of an $i^{th}$ training target, $Y_i$ represents a Softmax output of an $i^{th}$ neural network, · represents inner product multiplication, and m represents a size of batch processing. It can be learned that a larger probability of the current picture block at an index value of the intra prediction mode syntax element value set indicates a smaller loss function value.

In a possible implementation, the neural network described in this application may be a neural network obtained through training and having a probability estimation function.

In another possible implementation, the neural network described in this application is used to receive a training data set, and the neural network is obtained through training based on the training data set.

In a possible implementation, the training data set for training the neural network described in this application may be information about a plurality of neighboring picture blocks of the picture block.

It should be noted that the foregoing content illustrates implementation for training the neural network provided in this embodiment of this application, but is not specifically limited. In actual application, a specific solution for training the neural network may be selected based on an actual requirement. Details are not described in this embodiment of this application again.

It should be noted that FIG. 8 and FIG. 9 show only several example architectures of the neural network that is used to predict the probability distribution of the plurality of candidate intra prediction mode syntax element value sets in this embodiment of this application, and constitute no limitation on the architecture of the neural network. A quantity of layers, a layer structure, processing such as addition, multiplication, or combination included in the neural network, a quantity and a size of input and/or output matrices, and the like may be determined based on an actual situation. This is not specifically limited in this application.

FIG. 10 is a schematic flowchart of an encoding method according to an embodiment of this application. This embodiment may include three steps: determining an index of an intra prediction mode syntax element value set of a current picture block; obtaining information about a neighboring picture block of the current picture block and an index of an intra prediction mode syntax element value set of the neighboring picture block, and obtaining probability distribution of a plurality of candidate intra prediction mode syntax element value sets of the current picture block by using a neural network; and performing arithmetic encoding based on the probability distribution and the index of the intra prediction mode syntax element value set of the current picture block, to obtain a bitstream.

FIG. 11 is a flowchart of an encoding method according to an embodiment of this application. The encoding method may be performed by the video encoder 20, for example, may be performed by the intra prediction unit 254 and the entropy encoding unit 270 in the video encoder 20. The encoding method provided in this embodiment of this application is described as a series of steps or operations. It should be understood that the encoding method may be performed in various sequences and/or simultaneously, and this is not limited to the execution sequence shown in FIG. 11. It is assumed that a video data stream having a plurality of picture frames is using the video encoder. In this case, an encoding method including the following steps is performed to encode a picture or a picture block.

As shown in FIG. 11, the encoding method provided in this embodiment of this application may include the following steps.

S1101: Determine an index of an intra prediction mode syntax element value set of a current picture block.

The intra prediction mode syntax element value set of the current picture block includes values of a plurality of syntax elements related to an intra prediction mode of the current picture block, and the plurality of syntax elements include an index of the intra prediction mode used by the current picture block.

Specifically, the intra prediction mode syntax element value set of the current picture block may be obtained from the intra prediction unit 254 in the encoder 20 shown in FIG. 2.

The index of the intra prediction mode syntax element value set of the current picture block indicates an intra coding status of the current picture block, and corresponds to the intra prediction mode syntax element value set of the current picture block.

In a possible implementation, in S1101, after obtaining the intra prediction mode syntax element value set of the current picture block, the encoder determines the index of the intra prediction mode syntax element value set of the current picture block based on the index of the intra prediction mode used by the current picture block.

For example, the determining the index of the intra prediction mode syntax element value set of the current picture block based on the index of the intra prediction mode used by the current picture block may include: determining a sum of the index of the intra prediction mode used by the current picture block and an additional value of a first class of intra prediction modes as the index of the intra prediction mode syntax element value set of the current picture block. The intra prediction mode used by the current picture block belongs to the first class of intra prediction modes, and there is no intersection between intervals formed by sums of minimum index values of different classes of intra prediction modes and corresponding additional values and sums of maximum index values of the different classes of intra prediction modes and the corresponding additional values.

The additional value of the intra prediction mode is used to determine the index of the intra prediction mode syntax element value set, and the additional values of the different classes of intra prediction modes may be configured based on an actual requirement, as long as it is ensured that there is no intersection between the intervals formed by the sums of the minimum index values of the different classes of intra prediction modes and the corresponding additional values and the sums of the maximum index values of the different classes of intra prediction modes and the corresponding additional values. A method for selecting an additional value of each class of intra prediction modes and a value of the additional value are not limited in this embodiment of this application.

For example, the A class of intra prediction modes includes five intra prediction modes, an index range of the A class of intra prediction modes is 1 to 5, an additional value corresponding to the A class of intra prediction modes is X, a B class of intra prediction modes includes three intra prediction modes, an index range of the B class of intra prediction modes is 1 to 3, and an additional value corresponding to the B class of intra prediction modes is Y. In this case, there is no intersection between an interval [1+X, 5+X] and an interval [1+Y, 3+Y]. "[" and "]" is a closed interval symbol.

In a possible implementation, an additional value of an $N^{th}$ class of intra prediction modes includes a sum of label values of all classes of intra prediction modes before the $N^{th}$ class of intra prediction modes in a preset order. The $N^{th}$ class of intra prediction modes is any class of intra prediction modes.

A label value of an intra prediction mode may be a parameter configured for the intra prediction mode, and may be preconfigured, obtained based on a feature of the intra prediction mode, or obtained in another manner. Content of the label value of the intra prediction mode is not limited in this embodiment of this application.

Optionally, label values of two different classes of intra prediction modes may be the same or different.

For example, the label value of each class of intra prediction modes may include a total quantity of a plurality of intra prediction modes in each class of intra prediction modes. In other words, a label value of a class of intra prediction modes may be a total quantity of indexes in the class of intra prediction modes, or a label value of a class of intra prediction modes may be a maximum index value of the class of intra prediction modes plus 1.

For example, it is assumed that the intra prediction mode used by the current picture block belongs to the first class of intra prediction modes, and the values of the plurality of syntax elements included in the intra prediction mode syntax element value set further include a flag of the first class of intra prediction modes is true, a flag of a second class of intra prediction modes is false, and a flag of a third class of intra prediction modes is false. In this case, a total quantity of a plurality of intra prediction modes in the second class of intra prediction modes is B, and a total quantity of a plurality of intra prediction modes in the third class of intra prediction modes is C. The preset order is an order of the second class of intra prediction modes, the third class of intra prediction modes, and the first class of intra prediction modes. The determining a sum of the index of the intra prediction mode used by the current picture block and an additional value of a first class of intra prediction modes as the index of the intra prediction mode syntax element value set of the current picture block includes: determining a sum of the index of the intra prediction mode used by the current picture block, B, and C as the index of the intra prediction mode syntax element value set of the current picture block.

Specifically, the preset order may be configured based on an actual requirement. This is not limited in this embodiment of this application.

For example, the preset order may be an order from a left branch to a right branch in a tree diagram structure corresponding to an encoding process. Alternatively, the preset order may be a branch order in descending order of priorities in a tree diagram corresponding to an encoding process.

For example, the index of the intra prediction mode syntax element value set of the current picture block may be a sum of value ranges of all leaf nodes in the tree diagram structure corresponding to the encoding process of the current picture block.

The following uses an intra prediction encoding process of a 4×4 picture block as an example to describe a process of S1101. First, an encoding process of syntax elements related to an intra prediction mode of the 4×4 picture block in a VTM-6.0 is described as a tree diagram structure shown in FIG. 12. A value range of an index of an intra prediction mode syntax element value set of the picture block may be a sum of value ranges of all leaf nodes of a tree diagram. As shown in FIG. 12, it may be seen that the syntax elements related to the 4×4 picture block include an MIP flag, an MIP mode, a multi-row reference index, an MPM index, and the intra prediction mode. In the VVC, the MIP mode of the 4×4 picture block has 35 values, the multi-row reference index has 3 values, the MPM index has 5 values, and the prediction mode has 67 values. Therefore, the index of the intra prediction mode syntax element value set of the 4×4 picture block has a total of 35+5+5+67=112 values.

The tree diagram shown in FIG. 12 includes a plurality of chain structure examples from top to bottom. A chain structure example corresponds to a candidate intra prediction mode syntax element value set, and different chain structure examples correspond to different candidate intra prediction mode syntax element value sets. It should be understood that each chain structure example represents or reflects a dependency relationship between values of a plurality of syntax elements.

In one example, a quantity of candidate intra prediction mode syntax element value sets corresponds to a quantity of chain structure examples. For example, as shown in FIG. 12, a maximum quantity of candidate intra prediction mode syntax element value sets may be 112 (or the index of the intra prediction mode syntax element value set of the current picture block has 112 values in total, or the value range of the index is (0, 111).

Specifically, based on the tree diagram structure shown in FIG. 12, in S1101, the index of the intra prediction mode syntax element value set of the current 4×4 picture block may be derived based on the intra prediction mode syntax element value set of the current picture block and a determining condition described in the tree diagram structure in FIG. 12. The following is pseudocode corresponding to a process of determining the index of the intra prediction mode syntax element value set of the current 4×4 picture block:

```
if MIP Flag==1
    PredMode=MIP Mode
else
        if multiRefIdx==0
            PredMode=35+IntraDir
        else if multiRefIdx==1
            PredMode=35+67+MPMIdx
        else if multiRefIdx==3
            PredMode=35+67+5+MPMIdx
        end
    end
```

MIP Flag indicates the MIP flag, the MIPMode indicates the MIP mode, PredMode indicates the index of the intra prediction mode syntax element value set of the current picture block, multiRefIdx indicates the multi-row reference index, IntraDir indicates the intra prediction mode, and MPMIdx indicates the MPM index. When the MIP flag is true, the index of the intra prediction mode syntax element value set of the current picture block is a value of the MIP mode. Otherwise, when a value of the multi-row reference index is 0, the index of the intra prediction mode syntax element value set of the current picture block is 35+value of the intra prediction mode. For example, when the value of the multi-row reference index is 1, the index of the intra prediction mode syntax element value set of the current picture block is 35+67+MPM index. When the value of the multi-row reference index is 3, the index of the intra prediction mode syntax element value set of the current picture block is 35+67+5+MPM index. When a best prediction mode of the 4×4 coding block is 1, the MIP flag is false, and the value of the multi-row reference index is 0, the index of the intra prediction mode syntax element value set of the current picture block is 35. It should be noted that, for a coding block in a first row of a coding tree unit (CTU), a value of a multi-reference index is 0 by default. In this case, an index range of an intra prediction mode syntax element value set of the current picture block is an obtained original range minus 10.

It should be noted that, for a picture block of another size, intra coding tree diagram structure descriptions and a process of deriving an index of an intra prediction mode syntax element value set at an encoder side are basically the same as those of the 4×4 picture block. Specific details are slightly different based on intra prediction coding configurations of coding blocks of different sizes in the VTM-6.0. Details are not described again in this embodiment of this application.

S1102: Perform probability estimation on input data by using a neural network, to obtain probability distribution of a plurality of candidate intra prediction mode syntax element value sets.

The input data is used to represent a feature of the current picture block (for example, a texture feature of the current picture block).

For example, the input data may include information about neighboring picture blocks of the current picture block, or the input data may include preprocessed information about neighboring picture blocks of the current picture block. The neighboring picture blocks include an upper left neighboring picture block, an upper neighboring picture block, and a left neighboring picture block. The information about the neighboring picture block includes a reconstruction value of the neighboring picture block.

In a possible implementation, the preprocessed information about the neighboring picture blocks of the current picture block may include: an M-channel data block obtained by concatenating the information about the neighboring picture blocks and information about the current picture block, where M is greater than or equal to 1.

For example, M may be less than or equal to a class of information included in the information about the picture block.

In a possible implementation, the preprocessed information about the neighboring picture blocks of the current picture block may include a one-dimensional vector obtained by concatenating vectors converted from the information about the neighboring picture blocks and information about the current picture block.

The vector converted from the information about the picture block may be a one-dimensional valid one-hot vector.

When the input data of the neural network is constructed in this embodiment of this application, the concatenated information about the current picture block may be a padded default value. Content of the padded default value is not limited in this embodiment of this application.

In another possible implementation, the information about the neighboring picture block may further include one or more items of the following information: a predictor, a residual value, an index of an intra prediction mode syntax element value set, and partition information.

The partition information indicates a boundary condition of the picture block. For example, the partition information may be a data block whose boundary pixel value is 1 and whose intermediate pixel value is 0.

Further, the probability distribution represents respective probability values of the plurality of candidate intra prediction mode syntax element value sets. In other words, the probability distribution represents a probability that the intra prediction mode syntax element value set obtained when intra prediction is performed on the current picture block is in each of the plurality of candidate intra prediction mode syntax element value sets. The plurality of candidate intra prediction mode syntax element value sets refer to all available (or optional) intra prediction mode syntax element value sets.

Specifically, in S1102, the encoder first obtains the information about the neighboring picture blocks of the current picture block. For example, the encoder may obtain the information about the neighboring picture blocks of the current picture block from the mode selection unit 260 in the encoding process shown in FIG. 2, to perform the operation of S1102.

For example, for the 4×4 coding block in the VVC, reconstruction values, predictors, and residual values of an upper left neighboring block, an upper neighboring block, and a left neighboring block that have a same size as the current picture block may be concatenated with a padded default value of the current picture block, to obtain one 3-channel data block as first-class information in the input data. The 3-channel data block is input into the convolutional network in the neural network shown in FIG. 8. After indexes of intra prediction mode syntax element value sets and partition information of the upper left neighboring block, the upper neighboring block, and the left neighboring block that have the same size as the current picture block are separately converted into one-hot vectors to obtain six one-hot vectors, all the one-hot vectors are concatenated to obtain one one-dimensional vector. A length of a one-hot vector converted from the index of the intra prediction mode syntax element value set is 230, and a length of a one-hot vector converted from the partition information is 17. 17 coding block sizes supported in the VVC are numbered, so that a picture block of each size corresponds to a unique number. Finally, a length of the one-dimensional vector obtained by concatenating the six one-hot vectors is 741. The one-dimensional vector is used as information other than the first-class information in the input data, and is input into the fully connected network in the neural network shown in FIG. 8, to obtain probability distribution of a plurality of candidate intra prediction mode syntax element value sets.

For example, in S1102, the encoder may concatenate reconstruction values, predictors, residual values, indexes of intra prediction mode syntax element value sets, and partition information of the upper left neighboring block, the upper neighboring block, and the left neighboring block that have a same size as the current picture block with the default value of the current picture block, to obtain a five-channel data block as the input data. The five-channel data block is input into the neural network shown in FIG. 9, to obtain the probability distribution of the plurality of candidate intra prediction mode syntax element value sets.

It should be noted that functions and training methods of the neural networks shown in FIG. 8 and FIG. 9 are described in detail in the foregoing content, and details are not described herein again.

It should be understood that the neural network is a neural network obtained through training and having a probability estimation function.

S1103: Perform, based on the probability distribution of the plurality of candidate intra prediction mode syntax element value sets, entropy encoding on a probability value related to the index of the intra prediction mode syntax element value set of the current picture block, to obtain a bitstream.

Entropy encoding may include binary arithmetic encoding or multi-level arithmetic encoding. Certainly, a class of entropy encoding performed in S1103 may be selected based on an actual requirement. This is not limited in this embodiment of this application.

In a possible implementation, the probability value related to the index of the intra prediction mode syntax element value set of the current picture block may be any probability value in a probability interval that corresponds to the intra prediction mode syntax element value set that is in a plurality of probability intervals constructed based on the probability distribution of the plurality of candidate intra prediction mode syntax element value sets (an intra prediction mode syntax element value set actually used by the current picture block) according to an arithmetic coding principle.

For example, it is assumed that the plurality of candidate intra prediction mode syntax element value sets are three sets, which are recorded as a set 1, a set 2, and a set 3 in sequence. When the probability distribution of the plurality of candidate intra prediction mode syntax element value sets obtained in S1102 is {0.2, 0.5, 0.3}, it indicates that a probability that the current picture block uses the set 1 is 20%, a probability that the current picture block uses the set 2 is 50%, and a probability that the current picture block uses the set 3 is 30%. The plurality of probability intervals constructed based on the probability distribution of the plurality of candidate intra prediction mode syntax element value sets according to the arithmetic coding principle are respectively: an interval corresponding to the set 1 is [0, 0.2), an interval corresponding to the set 2 is [0.2, 0.7), and an interval corresponding to the set 3 is [0.7, 1). "[" is a boundary of a closed interval, and ")" is a boundary of an open interval.

It is assumed that the intra prediction mode syntax element value set actually used by the current picture block is the set 2. In this case, the probability value related to the index of the intra prediction mode syntax element value set of the current picture block is any probability value in [0.2, 0.7). In S1103, the any probability value in [0.2, 0.7) may be selected to perform entropy encoding, to obtain the bitstream.

According to the encoding method provided in this embodiment of this application, the values of the plurality of syntax elements (for example, all syntax elements) related to the intra prediction mode of the current picture block are used as the intra prediction mode syntax element value set, and the intra prediction mode syntax element value set corresponds to the index. The index of the intra prediction mode syntax element value set is understood as one syntax element, in other words, performing entropy encoding on the values of the plurality of syntax elements is replaced with performing entropy encoding on a value of the syntax element. The syntax element may represent a status of the intra prediction mode of the current picture block (for example, the syntax element may indicate values of a plurality of syntax elements related to an intra prediction mode actually used by the current picture block). During entropy encoding, entropy encoding needs to be performed only once on the index of the intra prediction mode syntax element value set, to replace entropy encoding performed on values of syntax elements related to many intra prediction modes, thereby reducing hardware implementation complexity, and further improving encoding performance.

Further, the neural network for obtaining the probability distribution provided in this embodiment of this application may obtain the probability distribution of the plurality of candidate intra prediction mode syntax element value sets based on reconstruction value information, predictor information, residual value information, the indexes of the intra prediction mode syntax element value sets, and the partition information of the neighboring picture blocks of the current picture block. Correlation between the neighboring picture blocks of the current picture block and the current picture block is fully used. Because the neighboring picture blocks have been reconstructed, the information about the neighboring picture block may represent a feature of the current picture block, and the probability distribution obtained by inputting the information about the neighboring picture blocks into the neural network has higher accuracy.

Further, as shown in FIG. 13, the encoding method provided in this embodiment of this application may further include S1104.

S1104: Determine, based on network structure differentiation information, the neural network applicable to the current picture block.

The network structure differentiation information includes a size of the current picture block, or the network structure differentiation information depends on a size of the current picture block.

It should be noted that the network structure differentiation information may alternatively be a feature in the picture block for which different neural network structures can be configured. A class of the indication information is not limited in this application.

Correspondingly, in S1102, probability estimation is performed on the input data by using the neural network determined in S1104, to obtain the probability distribution of the plurality of candidate intra prediction mode syntax element value sets.

In this way, different neural networks may be designed for different picture blocks (for example, different sizes), to improve encoding performance to a maximum extent.

FIG. 14 is a flowchart of a decoding method according to an embodiment of this application. The decoding method may be performed by the video decoder 30. Specifically, for example, the decoding method may be performed by the entropy decoding unit 304 and the intra prediction unit 354 in the video decoder 30. The decoding method provided in this embodiment of this application is described as a series of steps or operations. It should be understood that the decoding method may be performed in various sequences and/or simultaneously, and this is not limited to the execution sequence shown in FIG. 14. It is assumed that a video data stream having a plurality of picture frames is using the video decoder. In this case, a decoding method including the following steps is performed to decode a bitstream of a picture or a picture block.

As shown in FIG. 14, the decoding method provided in this embodiment of this application may include the following steps.

S1401: Perform probability estimation on input data by using a neural network, to obtain probability distribution of a plurality of candidate intra prediction mode syntax element value sets.

The probability distribution represents respective probability values of the plurality of candidate intra prediction mode syntax element value sets.

It should be understood that the neural network is a neural network obtained through training and having a probability estimation function.

It should be noted that an operation of the decoder in S1401 is the same as an operation of the encoder in S1102, and details are not described herein again. The plurality of candidate intra prediction mode syntax element value sets have been described in detail in the foregoing content, and details are not described herein again.

S1402: Perform entropy decoding on a received bitstream based on the probability distribution of the plurality of candidate intra prediction mode syntax element value sets, to obtain an index of an intra prediction mode syntax element value set of a current picture block.

Specifically, a process in which the decoder performs entropy decoding on the received bitstream based on the probability distribution of the plurality of candidate intra prediction mode syntax element value sets, to obtain the index of the intra prediction mode syntax element value set of the current picture block in S1402 is as follows:

First, probability intervals corresponding to different candidate intra prediction mode syntax element value sets can be obtained based on the probability distribution of the plurality of candidate intra prediction mode syntax element value sets obtained in S1401. A process of obtaining the probability interval has been described in detail in S1103, and details are not described herein again. Different candidate intra prediction mode syntax element value sets have respective index values. A method for determining the index value is described in S1101, and details are not described herein again.

Second, the decoder performs entropy decoding to obtain a probability value of the bitstream encoded at an encoder side. As described in S1103, the encoder side encodes the probability value related to the index of the intra prediction mode syntax element value set of the picture block into the bitstream, so that a decoder side can obtain the probability value by performing entropy decoding. It should be noted that, in S1402, the decoder performs entropy decoding, and a used decoding scheme corresponds to a scheme in which entropy encoding is performed at the encoder side.

Optionally, the entropy decoding may be binary arithmetic decoding or multi-level arithmetic decoding. Certainly, a class of entropy decoding performed in S1402 may be selected based on an actual requirement. This is not limited in this embodiment of this application.

Then, the decoder side compares the probability value obtained through entropy decoding with the obtained probability intervals corresponding different candidate intra prediction mode syntax element value sets, to determine a probability interval to which the probability value obtained through entropy decoding belongs. In this way, a candidate intra prediction mode syntax element value set corresponding to the probability interval can be obtained. An index of the obtained candidate intra prediction mode syntax element value set is the index of the intra prediction mode syntax element value set of the current picture block. S1403: Determine the intra prediction mode syntax element value set of the current picture block based on the index of the intra prediction mode syntax element value set of the current picture block.

The syntax element value set includes values of a plurality of syntax elements, and the plurality of syntax elements include an index of an intra prediction mode used by the current picture block.

Specifically, an operation of S1403 is a reverse operation of the operation of S1101.

In a possible implementation, that the decoder determines the intra prediction mode syntax element value set of the current picture block based on the index of the intra prediction mode syntax element value set of the current picture block may specifically include: determining a syntax element value set corresponding to a first numerical interval as the intra prediction mode syntax element value set of the current picture block, where the index of the intra prediction mode syntax element value set of the current picture block belongs to the first numerical interval.

A start value of the first numerical interval is a sum of a minimum index value of a first class of intra prediction modes and an additional value of the first class of intra prediction modes, and an end value of the first numerical interval is a sum of a maximum index value of the first class of intra prediction modes and the additional value of the first class of intra prediction modes. The intra prediction mode used by the current picture block belongs to the first class of intra prediction modes, and there is no intersection between intervals formed by sums of minimum index values of different classes of intra prediction modes and corresponding additional values and sums of maximum index values of the different classes of intra prediction modes and the corresponding additional values.

It should be noted that the additional value has been described in detail in S1101, and details are not described herein again.

For example, if a preset order of a plurality of intra prediction modes is a second class of intra prediction modes, a third class of intra prediction modes, and the first class of intra prediction modes, a total quantity of a plurality of intra prediction modes in the first class of intra prediction modes is A, a total quantity of a plurality of intra prediction modes in the second class of intra prediction modes is B, and a total quantity of a plurality of intra prediction modes in the third-class of intra prediction mode is C. The determining a syntax element value set corresponding to a first numerical interval as the intra prediction mode syntax element value set of the current image block may specifically include:

If the first numerical interval is [0, B), the intra prediction mode syntax element value set of the current picture block includes: a flag of the second class of intra prediction modes is true, the index of the intra prediction mode used by the current picture block is the index of the intra prediction mode syntax element value set of the current picture block, a flag of the first class of intra prediction modes is false, and a flag of the third class of intra prediction modes is false.

If the first numerical interval is [B, B+C), the intra prediction mode syntax element value set of the current picture block includes: a flag of the third class of intra prediction modes is true, the index of the intra prediction mode used by the current picture block is the index of the intra prediction mode syntax element value set of the current picture block minus B, a flag of the first class of intra prediction modes is false, and a flag of the second class of intra prediction modes is false.

If the first numerical interval is [B+C, A+B+C), the intra prediction mode syntax element value set of the current picture block includes: a flag of the first class of intra prediction modes is true, the index of the intra prediction mode used by the current picture block is the index of the intra prediction mode syntax element value set of the current picture block minus (B+C), a flag of the second class of intra prediction modes is false, and a flag of the third class of intra prediction modes is false.

The following uses an intra prediction decoding process of a 4×4 picture block as an example to describe a process of S1403. In S1403, an intra prediction mode syntax element value set of the current picture block may be derived based on an index of the intra prediction mode syntax element value set of the current picture block obtained through decoding in S1402 and a determining condition in the tree diagram shown in FIG. 12. The following is pseudocode corresponding to a process of determining the intra prediction mode syntax element value set of the 4×4 current picture block:

```
if PredMode >=0&& PredMode<35
    MIP Flag=1
    MIP Mode= PredMode
else if PredMode >=35&& PredMode<102
    MIP Flag=0
    MultiRefldx=0
    IntraDir= PredMode–35
else if PredMode >=102&& PredMode<107
    MIP Flag=0
    MultiRefldx=1
    MPMIdx= PredMode–35–67
else if PredMode >=107&& PredMode<112
    MIP Flag=0
    MultiRefldx=3
    MPMIdx= PredMode–35–67–5
end
```

It can be seen from the tree diagram structure shown in FIG. 12 that, if the index of the intra prediction mode syntax element value set falls within [0, 35), the MIP flag is true, and a value of the MIP mode is equal to the index of the intra prediction mode syntax element value set. If the index of the intra prediction mode syntax element value set falls within [35, 102), the MIP flag is false, a value of the multi-row reference index is 0, and a value of the intra prediction mode is the index of the intra prediction mode syntax element value set minus 35. If the index of the intra prediction mode syntax element value set falls within [102, 107), the MIP flag is false, a value of the multi-row reference index is 1, and a value of the MPM index is the index of the intra prediction mode syntax element value set -35-67. If the index of the intra prediction mode syntax element value set falls within [107, 112), the MIP flag is false, a value of the multi-row reference index is 3, and a value of the MPM index is the index of the intra prediction mode syntax element value set -35-67-5. For example, when the index of the intra prediction mode syntax element value set of the 4×4 picture block is 35, the decoder side may obtain, through parsing, that the intra prediction mode syntax element value set of the current picture block includes: an MIP flag is false, a value of a multi-row reference index is 0, and an intra prediction mode of the current picture block is 0.

It should be noted that, for a picture block of another size, intra coding tree diagram descriptions and a process of deriving an index of an intra prediction mode syntax element value set at the encoder side are basically the same as those of the 4×4 picture block. Specific details are slightly different based on intra prediction coding configurations of coding blocks of different sizes in a VTM-6.0. Details are not described again in this embodiment of this application.

S1404: Perform intra prediction based on the values of the plurality of syntax elements in the intra prediction mode syntax element value set of the current picture block.

It should be noted that, for a specific process of performing intra prediction in S1404, refer to the intra prediction process described in FIG. 2 or FIG. 3. Details are not described herein again.

According to the decoding method provided in this embodiment of this application, the values of the plurality of syntax elements (for example, all syntax elements) related to the intra prediction mode of the current picture block are used as the intra prediction mode syntax element value set, and the intra prediction mode syntax element value set corresponds to the index. The index of the intra prediction mode syntax element value set is understood as one syntax element, in other words, performing entropy decoding on the values of the plurality of syntax elements is replaced with performing entropy decoding on a value of the syntax element. The syntax element may represent a decoding status of the intra prediction mode of the current picture block (for example, the syntax element may indicate values of a plurality of syntax elements related to an intra prediction mode actually used by the current picture block). During entropy decoding, entropy decoding needs to be performed only once on the index of the intra prediction mode syntax element value set, to replace entropy decoding performed on values of syntax elements related to many intra prediction modes, thereby reducing hardware implementation complexity, and further improving decoding performance.

Further, the neural network for obtaining the probability distribution provided in this embodiment of this application may obtain the probability distribution of the plurality of candidate intra prediction mode syntax element value sets based on reconstruction value information, predictor information, residual value information, the indexes of the intra prediction mode syntax element value sets, and the partition information of the neighboring picture blocks of the current picture block. Correlation between the neighboring picture blocks of the current picture block and the current picture block is fully used. Because the neighboring picture blocks have been reconstructed, the information about the neighboring picture block may represent a feature of the current picture block, and the probability distribution obtained by inputting the information about the neighboring picture blocks into the neural network has higher accuracy.

Further, as shown in FIG. 15, the decoding method provided in this embodiment of this application may further include S1405.

S1405: Determine, based on network structure differentiation information, the neural network applicable to the current picture block.

The network structure differentiation information includes a size of the current picture block, or the network structure differentiation information depends on a size of the current picture block.

It should be noted that the network structure differentiation information may alternatively be a feature in the picture block for which different neural network structures can be configured. A class of the indication information is not limited in this application.

Correspondingly, the performing probability estimation on input data by using a neural network, to obtain probability distribution of a plurality of candidate intra prediction mode syntax element value sets in S1401 includes: performing probability estimation on the input data by using the neural network determined in S1405, to obtain the probability distribution of the plurality of candidate intra prediction mode syntax element value sets.

In this way, different neural networks may be designed for different picture blocks (for example, different sizes), to improve decoding performance to a maximum extent.

Example 1: The encoding and decoding methods provided in embodiments of this application are implemented on a VTM-6.0 platform, and BD-rate performance of coding one frame of all test sequences in an All Intra mode is tested under a VVC standard test condition. Experimental results are shown in Table 2. A test platform of a VTM-6.0 baseline and a test platform of the proposed solution are a same CPU cluster through comparison. Three columns Y, U, and V indicate improvements in coding performance obtained by the encoding and decoding methods provided in embodiments of this application in terms of a luminance component and a chrominance component compared with the VTM-6.0 baseline. Encoding duration and decoding duration indicate changes in encoding and decoding times in embodiments of this application in which the VTM-6.0 is integrated compared with the VTM-6.0 baseline. After neural network-based VVC intra prediction mode encoding and decoding methods proposed in this application are integrated into the VTM-6.0 platform, under a VVC standard test, coding performance is improved by 1.01% compared with the VTM-6.0 baseline.

TABLE 2

| | All Intra Main10 Over VTM-6.0 | | | | |
| | Y | U | V | Encoding duration (EncT) | Decoding duration (DecT) |
| --- | --- | --- | --- | --- | --- |
| Class A1 | −0.89% | −0.92% | −0.91% | 695% | 307723% |
| Class A2 | −0.59% | −0.59% | −0.59% | 348% | 249583% |
| Class B | −0.94% | −0.93% | −0.95% | 335% | 225123% |
| Class C | −0.95% | −0.92% | −0.94% | 236% | 142083% |
| Class E | −1.76% | −1.73% | −1.74% | 388% | 230224% |
| Overall | −1.01% | −1.00% | −1.01% | 361% | 218632% |
| Class D | −1.12% | −1.09% | −1.12% | 239% | 86333% |
| Class F | −0.38% | −0.39% | −0.39% | 289% | 178690% |

Example 2: On the basis of the example 1, a quantity of dense blocks included in a DenseNet in a neural network used by a coding block of each size is set to 2, and a quantity of layers included in each dense block is set to 12. An experiment same as that in the example 1 is performed, and obtained experimental results are shown in Table 3.

TABLE 3

| | All Intra Main10 Over VTM-6.0 | | | | |
| | Y | U | V | Encoding duration (EncT) | Decoding duration (DecT) |
| --- | --- | --- | --- | --- | --- |
| Class A1 | −0.86% | −0.90% | −0.89% | 626% | 255785% |
| Class A2 | −0.55% | −0.54% | −0.54% | 302% | 197152% |
| Class B | −0.92% | −0.91% | −0.93% | 313% | 185200% |
| Class C | −0.91% | −0.88% | −0.90% | 216% | 112620% |
| Class E | −1.72% | −1.70% | −1.71% | 354% | 195370% |
| Overall | −0.98% | −0.97% | −0.98% | 328% | 178404% |
| Class D | −1.15% | −1.11% | −1.14% | 214% | 68316% |
| Class F | −0.33% | −0.34% | −0.34% | 269% | 151242% |

Example 3: On the basis of the example 1, a quantity of dense blocks included in a DenseNet in a neural network used by a coding block of each size is set to 2, and a quantity of layers included in each dense block is set to 6. An experiment same as that in the example 1 is performed, and obtained experimental results are shown in Table 4.

TABLE 4

| | All Intra Main 10 Over VTM-6.0 | | | | |
| | Y | U | V | Encoding duration (EncT) | Decoding duration (DecT) |
| --- | --- | --- | --- | --- | --- |
| Class A1 | −0.55% | −0.55% | −0.54% | 276% | 77621% |
| Class A2 | −0.32% | −0.24% | −0.26% | 164% | 59154% |

TABLE 4-continued

| | All Intra Main 10 Over VTM-6.0 | | | | |
| | Y | U | V | Encoding duration (EncT) | Decoding duration (DecT) |
| --- | --- | --- | --- | --- | --- |
| Class B | −0.62% | −0.691% | −0.62% | 162% | 52971% |
| Class C | −0.72% | −0.70% | −0.71% | 134% | 33339% |
| Class E | −1.32% | −1.31% | −1.31% | 172% | 54803% |
| Overall | −0.70% | −0.68% | −0.68% | 172% | 52175% |
| Class D | −1.00% | −0.97% | −1.00% | 135% | 19787% |
| Class F | −0.07% | −0.09% | −0.09% | 147% | 42942% |

The foregoing mainly describes the solutions provided in embodiments of the present invention from perspectives of working principles of the encoder and the decoder. It may be understood that to implement the foregoing functions, the encoder and the decoder include hardware structures and/or software modules corresponding to the functions. A person of ordinary skill in the art should easily be aware that, in combination with the examples described in embodiments disclosed in this specification, units, algorithms and steps can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In embodiments of the present invention, the encoder/decoder may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in embodiments of the present invention, division into modules is an example and is merely logical function division, and may be other division in actual implementation FIG. 16 shows an encoder 160 according to an embodiment of this application. The encoder 160 is configured to implement functions of the encoder in the foregoing embodiments. As shown in FIG. 16, the encoder 160 may include an intra prediction module 1601 and an entropy encoding module 1602. The intra prediction module 1601 is configured to perform the process S1101 in FIG. 11. The entropy encoding module 1602 is configured to perform processes S1102 and S1103 in FIG. 11. The entropy encoding module 1602 is further configured to perform the process S1104 in FIG. 13. All related content of the steps in the foregoing method embodiments may be cited in function descriptions of the corresponding functional modules. Details are not described herein again. In an example, the intra prediction module 1601 may correspond to the intra prediction unit 254 in FIG. 2. In an example, the entropy encoding module 1602 may correspond to the entropy encoding unit 270 in FIG. 2. For other details of a function of the intra prediction module 1601 in the encoder in FIG. 16, refer to the descriptions in FIG. 2. Details are not described herein again. For other details of a function of the entropy encoding module 1602 in the encoder in FIG. 16, refer to the descriptions in FIG. 2. Details are not described herein again.

As described above, the encoder 160 provided in this embodiment of this application may be configured to implement functions of the encoder in the foregoing methods implemented in embodiments of this application. For ease of description, only a part related to embodiments of this application is shown. For specific technical details that are not disclosed, refer to embodiments of this application.

Figure 17:
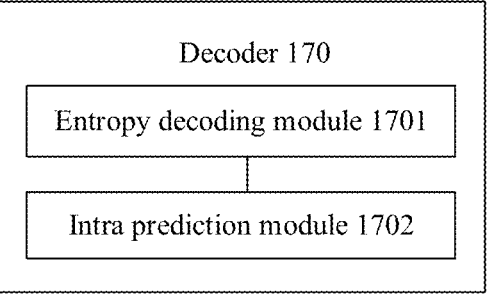
FIG. 17 is a schematic diagram of a structure of a decoder according to an embodiment of this application.

FIG. 17 shows a decoder 170 according to an embodiment of this application. The decoder 170 is configured to implement functions of the processing device in the foregoing embodiments. As shown in FIG. 17, the decoder 170 may include an entropy decoding module 1701 and an intra prediction module 1702. The entropy decoding module 1701 is configured to perform processes S1401 and S1402 in FIG. 14. The entropy decoding module 1701 is configured to perform the process S1405 in FIG. 15. The intra prediction module 1702 is configured to perform processes S1403 and S1404 in FIG. 14. All related content of the steps in the foregoing method embodiments may be cited in function descriptions of the corresponding functional modules. Details are not described herein again. In an example, the intra prediction module 1702 may correspond to the intra prediction unit 354 in FIG. 3. In an example, the entropy decoding module 1701 may correspond to the entropy decoding unit 304 in FIG. 3. For other details of a function of the entropy decoding module 1701 in the decoder in FIG. 17, refer to the descriptions in FIG. 3. Details are not described herein again. For other details of a function of the intra prediction module 1702 in the decoder in FIG. 17, refer to the descriptions in FIG. 3. Details are not described herein again.

As described above, the decoder 170 provided in this embodiment of this application may be configured to implement functions of the decoder in embodiments of this application. For ease of description, only a part related to embodiments of this application is shown. For specific technical details that are not disclosed, refer to embodiments of this application.

An embodiment of this application further provides an encoding and decoding system, including an encoder 160 and a decoder 170.

In another form of this embodiment, a non-transitory computer-readable storage medium is provided, including program code. When the program code is executed, the methods in the foregoing method embodiments are performed.

In another form of this embodiment, a computer program product including instructions is provided. When the computer program product runs on a computer, the computer is enabled to perform the methods in the foregoing method embodiments.

An embodiment of this application further provides a chip system. The chip system includes a processor, configured to implement the technical method according to embodiments of the present invention. In a possible design, the chip system further includes a memory, configured to store program instructions and/or data that are/is necessary for embodiments of the present invention. In a possible design, the chip system further includes a memory, configured to enable the processor to invoke application code stored in the memory. The chip system may include one or more chips, or may include a chip and another discrete component. This is not specifically limited in this embodiment of this application.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, each functional unit in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An encoding method applied to an encoding device, the method comprising:

determining an index of an intra prediction mode syntax element value set of a current picture block, wherein the syntax element value set comprises values of a plurality of syntax elements, and wherein the plurality of syntax elements comprise an index of an intra prediction mode used by the current picture block;

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of the current picture block, wherein each of the plurality of candidate intra prediction mode syntax element value sets comprises values of the plurality of syntax elements related to an intra prediction mode that can be used when intra prediction is performed on the current picture block, wherein there is a dependency relationship between the values of the plurality of syntax elements in the candidate intra prediction mode syntax elements value set, and wherein the intra prediction mode syntax value set of the current picture block is one of the plurality of candidate intra prediction mode syntax element value sets; and performing, based on the probability distribution of the plurality of candidate intra prediction mode syntax element value sets, entropy encoding on a probability value related to the index of the intra prediction mode syntax element value set of the current picture block, to obtain a bitstream.

2. The method according to claim 1, wherein determining the index of the intra prediction mode syntax element value set of the current picture block comprises:

determining the index of the intra prediction mode syntax element value set of the current picture block based on the index of the intra prediction mode used by the current picture block.

3. The method according to claim 2, wherein determining the index of the intra prediction mode syntax element value set of the current picture block based on the index of the intra prediction mode used by the current picture block comprises:

determining a sum of the index of the intra prediction mode used by the current picture block and an additional value of a first class of intra prediction modes as the index of the intra prediction mode syntax element value set of the current picture block, wherein the intra prediction mode used by the current picture block belongs to the first class of intra prediction modes, and wherein there is no intersection between intervals formed by sums of minimum index values of different classes of intra prediction modes and corresponding additional values and sums of maximum index values of the different classes of intra prediction modes and the corresponding additional values.

4. The method according to claim 3, wherein an additional value of an $N^{th}$ class of intra prediction modes comprises a sum of label values of all classes of intra prediction modes before the $N^{th}$ class of intra prediction modes in a preset order, wherein N is greater than or equal to 1.

5. The method according to claim 4, wherein the label value of each class of intra prediction modes comprises a total quantity of a plurality of intra prediction modes in each class of intra prediction modes.

6. The method according to claim 5, wherein the intra prediction mode used by the current picture block belongs to the first class of intra prediction modes, and the values of the plurality of syntax elements further comprise:

a flag of the first class of intra prediction modes is true;

a flag of a second class of intra prediction modes is false;

a flag of a third class of intra prediction modes is false;

wherein a total quantity of a plurality of intra prediction modes in the second class of intra prediction modes is B, and a total quantity of a plurality of intra prediction modes in the third class of intra prediction modes is C; and wherein the preset order is an order of the second class of intra prediction modes, the third class of intra prediction modes, and the first class of intra prediction modes;

wherein determining the sum of the index of the intra prediction mode used by the current picture block and the additional value of the first class of intra prediction modes as the index of the intra prediction mode syntax element value set of the current picture block comprises:

determining a sum of the index of the intra prediction mode used by the current picture block, B, and C as the index of the intra prediction mode syntax element value set of the current picture block.

7. The method according to claim 1, wherein before performing the probability estimation on the input data by using the neural network to obtain the probability distribution of the plurality of candidate intra prediction mode syntax element value sets, the method further comprises:

determining, based on network structure differentiation information, the neural network applicable to the current picture block, wherein the network structure differentiation information comprises a size of the current picture block, or the network structure differentiation information depends on a size of the current picture block; and wherein performing the probability estimation on the input data by using the neural network to obtain the probability distribution of the plurality of candidate intra prediction mode syntax element value sets comprises:

performing probability estimation on the input data by using the determined neural network to obtain the probability distribution of the plurality of candidate intra prediction mode syntax element value sets.

8. The method according to claim 1, wherein the input data comprises information about neighboring picture blocks of the current picture block, or the input data comprises preprocessed information about neighboring picture blocks of the current picture block;

the neighboring picture blocks comprise an upper left neighboring picture block, an upper neighboring picture block, and a left neighboring picture block; and the information about the neighboring picture block comprises a reconstruction value of the neighboring picture block.

9. The method according to claim 1, wherein the input data comprises preprocessed information about neighboring picture blocks of the current picture block, and wherein the preprocessed information comprises:

an M-channel data block obtained by concatenating the preprocessed information about the neighboring picture blocks and information about the current picture block, wherein M is greater than or equal to 1; or a one-dimensional vector obtained by concatenating vectors converted from the preprocessed information about the neighboring picture blocks and information about the current picture block.

10. The method according to claim 8, wherein the information about the neighboring picture block further comprises one or more items of the following information: a predictor, a residual value, an index of an intra prediction mode syntax element value set, and partition information.

11. The method according to claim 8, wherein the neural network comprises a convolutional network, a fully connected layer, and a normalized exponential function Softmax layer and wherein the convolutional network comprises a plurality of dense blocks and a pooling layer between the dense blocks, and the dense block comprises a convolutional layer, an excitation ReLU layer, and a batch normalization (BN) layer;

wherein performing the probability estimation on the input data by using the neural network to obtain the probability distribution of the plurality of candidate intra prediction mode syntax element value sets comprises:

extracting feature information in the input data by using the convolutional network; and performing, by using the fully connected layer and the Softmax layer, probability estimation on the feature information extracted, by using the convolutional network, to output the probability distribution of the plurality of candidate intra prediction mode syntax element value sets.

12. The method according to claim 8, wherein the neural network comprises a fully connected network, a convolutional network, a concat layer, a first fully connected layer, and a Softmax layer, wherein the fully connected network comprises a plurality of second fully connected layers and activation PRELU layers connected to the second fully connected layers one by one, and wherein the convolutional network comprises a plurality of dense blocks and a pooling layer between dense blocks, and the dense block comprises a convolutional layer, an excitation ReLU layer, and a batch normalization BN layer;

wherein performing the probability estimation on the input data, by using the neural network, to obtain the probability distribution of the plurality of candidate intra prediction mode syntax element value sets comprises:

extracting feature information of first-class information in the input data by using the convolutional network;

extracting feature information of information other than the first-class information in the input data by using the fully connected network;

concatenating, by using the concat layer, the feature information extracted by using the fully connected network and the feature information extracted by using the convolutional network; and performing, by using the first fully connected layer and the Softmax layer, probability estimation on feature information concatenated, by using the concat layer, to output the probability distribution of the plurality of candidate intra prediction mode syntax element value sets, wherein the first-class information is picture block pixel-level information.

13. A decoding method applied to a decoding device, the method comprising:

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of a current picture block, wherein each of the plurality of candidate intra prediction mode syntax element value sets comprises values of a plurality of syntax elements related to an intra prediction mode that can be used when intra prediction is performed on the current picture block, and wherein there is a dependency relationship between values of a plurality of syntax elements in the candidate intra prediction mode syntax element value set;

performing entropy decoding on a received bitstream, based on the probability distribution, to obtain an index of an intra prediction mode syntax element value set of the current picture block, wherein the intra prediction mode syntax element value set of the current picture block is one of the plurality of candidate intra prediction mode syntax element value sets;

determining the intra prediction mode syntax element value set of the current picture block based on the index of the intra prediction mode syntax element value set of the current picture block, wherein the syntax element value set comprises values of a plurality of syntax elements, and the plurality of syntax elements comprise an index of an intra prediction mode used by the current picture block; and performing intra prediction based on the values of the plurality of syntax elements.

14. The method according to claim 13, wherein determining the intra prediction mode syntax element value set of the current picture block based on the index of the intra prediction mode syntax element value set of the current picture block comprises:

determining an intra prediction mode syntax element value set corresponding to a first numerical interval as the intra prediction mode syntax element value set of the current picture block, wherein the index of the intra prediction mode syntax element value set of the current picture block belongs to the first numerical interval, wherein a start value of the first numerical interval is a sum of a minimum index value of a first class of intra prediction modes and an additional value of the first class of intra prediction modes, wherein an end value of the first numerical interval is a sum of a maximum index value of the first class of intra prediction modes and the additional value of the first class of intra prediction modes, wherein the intra prediction mode used by the current picture block belongs to the first class of intra prediction modes, and wherein there is no intersection between intervals formed by sums of minimum index values of different classes of intra prediction modes and corresponding additional values and sums of maximum index values of the different classes of intra prediction modes and the corresponding additional values.

15. The method according to claim 14, wherein an additional value of an $N^{th}$ class of intra prediction modes comprises a sum of label values of all classes of intra prediction modes before the N$^{th}$ class of intra prediction modes in a preset order.

16. The method according to claim 15, wherein the label value of each class of intra prediction modes comprises a total quantity of a plurality of intra prediction modes in each class of intra prediction modes.

17. The method according to claim 16, wherein based on the preset order being an order of a second class of intra prediction modes, a third class of intra prediction modes, and the first class of intra prediction modes, a total quantity of a plurality of intra prediction modes in the first class of intra prediction modes is A, a total quantity of a plurality of intra prediction modes in the second class of intra prediction modes is B, and a total quantity of a plurality of intra prediction modes in the third class of intra prediction modes is C; and wherein determining the intra prediction mode syntax element value set corresponding to the first numerical interval as the intra prediction mode syntax element value set of the current picture block comprises:

based on the first numerical interval being [0, B], the intra prediction mode syntax element value set of the current picture block comprises: a flag of the second class of intra prediction modes is true, the index of the intra prediction mode used by the current picture block is the index of the intra prediction mode syntax element value set of the current picture block, a flag of the first class of intra prediction modes is false, and a flag of the third class of intra prediction modes is false;

based on the first numerical interval being [B, B+C], the intra prediction mode syntax element value set of the current picture block comprises: a flag of the third class of intra prediction modes is true, the index of the intra prediction mode used by the current picture block is the index of the intra prediction mode syntax element value set of the current picture block minus B, a flag of the first class of intra prediction modes is false, and a flag of the second class of intra prediction modes is false; or based on the first numerical interval being [B+C, A+B+C], the intra prediction mode syntax element value set of the current picture block comprises: a flag of the first class of intra prediction modes is true, the index of the intra prediction mode used by the current picture block is the index of the intra prediction mode syntax element value set of the current picture block minus (B+C), a flag of the second class of intra prediction modes is false, and a flag of the third class of intra prediction modes is false.

18. The method according to claim 13, wherein before performing the probability estimation on the input data, by using the neural network, to obtain the probability distribution of the plurality of candidate intra prediction mode syntax element value sets, the method further comprises:

determining, based on network structure differentiation information, the neural network applicable to the current picture block, wherein the network structure differentiation information comprises a size of the current picture block, or the network structure differentiation information depends on a size of the current picture block; and wherein performing the probability estimation on the input data, by using the neural network, to obtain the probability distribution of the plurality of candidate intra prediction mode syntax element value sets comprises:

performing probability estimation on the input data by using the determined neural network, to obtain the probability distribution of the plurality of candidate intra prediction mode syntax element value sets.

19. The method according to claim 13, wherein the input data comprises information about neighboring picture blocks of the current picture block, or the input data comprises preprocessed information about neighboring picture blocks of the current picture block, wherein the neighboring picture blocks comprise an upper left neighboring picture block, an upper neighboring picture block, and a left neighboring picture block; and wherein the information about the neighboring picture block comprises a reconstruction value of the neighboring picture block.

20. The method according to claim 19, wherein the preprocessed information about the neighboring picture blocks of the current picture block comprises:

an M-channel data block obtained by concatenating the information about the neighboring picture blocks and information about the current picture block, wherein M is greater than or equal to 1; or a one-dimensional vector obtained by concatenating vectors converted from the information about the neighboring picture blocks and information about the current picture block.

21. The method according to claim 19, wherein the information about the neighboring picture block further comprises one or more items of the following information: a predictor, a residual value, an index of an intra prediction mode syntax element value set, and partition information.

22. The method according to claim 19, wherein the neural network comprises a convolutional network, a fully connected layer, and a normalized exponential function Softmax layer, wherein the convolutional network comprises a plurality of dense blocks and a pooling layer between the dense blocks, and wherein the dense block comprises a convolutional layer, an excitation ReLU layer, and a batch normalization (BN) layer; and wherein performing probability estimation on the input data, by using the neural network, to obtain the probability distribution of the plurality of candidate intra prediction mode syntax element value sets comprises:

extracting feature information in the input data by using the convolutional network; and performing, by using the fully connected layer and the Softmax layer, probability estimation on the feature information extracted, by using the convolutional network, to output the probability distribution of the plurality of candidate intra prediction mode syntax element value sets.

23. The method according to claim 19, wherein the neural network comprises a fully connected network, a convolutional network, a concat layer, a first fully connected layer, and a Softmax layer, wherein the fully connected network comprises a plurality of second fully connected layers and activation PRELU layers connected to the second fully connected layers one by one, wherein the convolutional network comprises a plurality of dense blocks and a pooling layer between dense blocks, and wherein the dense block comprises a convolutional layer, an excitation ReLU layer, and a batch normalization (BN) layer; and wherein performing probability estimation on the input data, by using the neural network, to obtain the probability distribution of the plurality of candidate intra prediction mode syntax element value sets comprises:

extracting feature information of first-class information in the input data by using the convolutional network;

extracting feature information of information other than the first-class information in the input data by using the fully connected network;

concatenating, by using the concat layer, the feature information extracted by using the fully connected network and the feature information extracted by using the convolutional network; and performing, by using the first fully connected layer and the Softmax layer, probability estimation on feature information concatenated, by using the concat layer, to output the probability distribution of the plurality of candidate intra prediction mode syntax element value sets, wherein the first-class information is picture block pixel-level information.

24. An encoder comprising:

one or more processors; and a non-transitory computer-readable storage medium, coupled to the processor and storing a program executed by the processor, wherein when the program is executed by the processor, the encoder is enabled to perform the operations:

determining an index of an intra prediction mode syntax element value set of a current picture block, wherein the syntax element value set comprises values of a plurality of syntax elements, and the plurality of syntax elements comprise an index of an intra prediction mode used by the current picture block;

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of the current picture block, wherein each of the plurality of candidate intra prediction mode syntax element value sets comprises values of a plurality of syntax elements related to an intra prediction mode that can be used when intra prediction is performed on the current picture block, wherein there is a dependency relationship between values of a plurality of syntax elements in the candidate intra prediction mode syntax elements value set, and wherein the intra prediction mode syntax value set of the current picture block is one of the plurality of candidate intra prediction mode syntax element value sets; and performing, based on the probability distribution of the plurality of candidate intra prediction mode syntax element value sets, entropy encoding on a probability value related to the index of the intra prediction mode syntax element value set of the current picture block, to obtain a bitstream.

25. A decoder comprising:

one or more processors; and a non-transitory computer-readable storage medium, coupled to the processor and storing a program executed by the processor, wherein when the program is executed by the processor, the decoder is enabled to perform the operations:

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of a current picture block, wherein each of the plurality of candidate intra prediction mode syntax element value sets comprises values of a plurality of syntax elements related to an intra prediction mode that can be used when intra prediction is performed on the current picture block, and wherein there is a dependency relationship between values of a plurality of syntax elements in the candidate intra prediction mode syntax element value set;

performing entropy decoding on a received bitstream, based on the probability distribution, to obtain an index of an intra prediction mode syntax element value set of the current picture block, wherein the intra prediction mode syntax element value set of the current picture block is one of the plurality of candidate intra prediction mode syntax element value sets;

determining the intra prediction mode syntax element value set of the current picture block based on the index of the intra prediction mode syntax element value set of the current picture block, wherein the syntax element value set comprises values of a plurality of syntax elements, and the plurality of syntax elements comprise an index of an intra prediction mode used by the current picture block; and performing intra prediction based on the values of the plurality of syntax elements.

26. A non-transitory computer-readable storage medium comprising program code and a bitstream, wherein when the program code is executed by a computer device, an encoding method is performed, and the encoding method comprises:

determining an index of an intra prediction mode syntax element value set of a current picture block, wherein the syntax element value set comprises values of a plurality of syntax elements, and the plurality of syntax elements comprise an index of an intra prediction mode used by the current picture block;

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of the current picture block, wherein each of the plurality of candidate intra prediction mode syntax element value sets comprises values of a plurality of syntax elements related to an intra prediction mode that can be used when intra prediction is performed on the current picture block, wherein there is a dependency relationship between values of a plurality of syntax elements in the candidate intra prediction mode syntax elements value set, and wherein the intra prediction mode syntax value set of the current picture block is one of the plurality of candidate intra prediction mode syntax element value sets; and performing, based on the probability distribution of the plurality of candidate intra prediction mode syntax element value sets, entropy encoding on a probability value related to the index of the intra prediction mode syntax element value set of the current picture block, to obtain the bitstream.

27. A non-transitory computer-readable storage medium comprising a bitstream and program code, wherein when the program code is executed by a computer device, a decoding method is performed, and the decoding method comprises:

performing probability estimation on input data, using a neural network, to obtain probability distribution of a plurality of candidate intra prediction mode syntax element value sets, wherein the probability distribution represents respective probability values of the plurality of candidate intra prediction mode syntax element value sets, and the input data is used to represent a feature of a current picture block, wherein each of the plurality of candidate intra prediction mode syntax element value sets comprises values of a plurality of syntax elements related to an intra prediction mode that can be used when intra prediction is performed on the current picture block, and wherein there is a dependency relationship between values of a plurality of syntax elements in the candidate intra prediction mode syntax element value set;

performing entropy decoding on the bitstream, based on the probability distribution, to obtain an index of an intra prediction mode syntax element value set of the current picture block, wherein the intra prediction mode syntax element value set of the current picture block is one of the plurality of candidate intra prediction mode syntax element value sets;

determining the intra prediction mode syntax element value set of the current picture block based on the index of the intra prediction mode syntax element value set of the current picture block, wherein the syntax element value set comprises values of a plurality of syntax elements, and the plurality of syntax elements comprise an index of an intra prediction mode used by the current picture block; and performing intra prediction based on the values of the plurality of syntax elements.

* * * * *